(12) United States Patent
Song et al.

(10) Patent No.: US 9,565,141 B2
(45) Date of Patent: Feb. 7, 2017

(54) METHOD FOR PROVIDING MESSENGER SERVICE AND ELECTRONIC DEVICE THEREOF

(71) Applicant: Samsung Electronics Co., Ltd., Gyeonggi-do (KR)

(72) Inventors: Se-Jun Song, Seoul (KR); Jae-Hyeon Kang, Gyeonggi-do (KR); Kwang-Tai Kim, Gyeonggi-do (KR); Ji-Hea Park, Seoul (KR); Kang-Hwan Oh, Gyeonggi-do (KR); Da-Som Lee, Seoul (KR); Yo-Han Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 401 days.

(21) Appl. No.: 14/015,177

(22) Filed: Aug. 30, 2013

(65) Prior Publication Data

US 2014/0067976 A1 Mar. 6, 2014

(30) Foreign Application Priority Data

Sep. 5, 2012 (KR) .................. 10-2012-0098067

(51) Int. Cl.
| | |
|---|---|
| *G06F 15/16* | (2006.01) |
| *H04L 12/58* | (2006.01) |
| *G06Q 10/10* | (2012.01) |
| *G06F 3/0488* | (2013.01) |

(52) U.S. Cl.
CPC ............ *H04L 51/00* (2013.01); *G06F 3/0488* (2013.01); *G06Q 10/10* (2013.01); *G06Q 10/107* (2013.01); *H04L 51/18* (2013.01); *H04L 51/10* (2013.01)

(58) Field of Classification Search
CPC ........... H04L 51/00; H04L 51/10; H04L 51/18
See application file for complete search history.

(56) References Cited

U.S. PATENT DOCUMENTS

| | | | | |
|---|---|---|---|---|
| 7,369,862 | B2 * | 5/2008 | Kim ...................... | H04L 12/66 455/435.1 |
| 7,426,398 | B2 * | 9/2008 | Reisgies ......... | H04M 1/274516 455/414.1 |
| 8,351,587 | B2 * | 1/2013 | Levy ...................... | H04M 3/56 370/260 |
| 9,009,654 | B1 * | 4/2015 | Webster ................ | G06F 9/4443 717/105 |

(Continued)

FOREIGN PATENT DOCUMENTS

| | | |
|---|---|---|
| GB | 2 431 831 A | 5/2007 |
| KR | 2003-0067649 A | 8/2003 |

(Continued)

OTHER PUBLICATIONS

European Search Report dated Sep. 12, 2016.

*Primary Examiner* — Moustafa M Meky
(74) *Attorney, Agent, or Firm* — Cha & Reiter, LLC

(57) ABSTRACT

An apparatus and a method for providing a messenger service in an electronic device are provided. In the method, the messenger service with at least one counterpart electronic device is provided. First application setting information is determined during the messenger service. The first application setting information is transmitted to the at least one counterpart electronic device through the messenger service.

18 Claims, 58 Drawing Sheets

(56) References Cited

U.S. PATENT DOCUMENTS

| | | | |
|---|---|---|---|
| 2004/0185874 A1* | 9/2004 | Kim | H04L 12/66 455/456.3 |
| 2006/0223553 A1* | 10/2006 | Reisgies | H04M 1/274516 455/466 |
| 2008/0220797 A1 | 9/2008 | Meiby et al. | |
| 2009/0006567 A1 | 1/2009 | Williams et al. | |
| 2009/0210778 A1 | 8/2009 | Kulas et al. | |
| 2009/0318171 A1 | 12/2009 | Backholm et al. | |
| 2010/0125801 A1 | 5/2010 | Shin | |
| 2013/0210418 A1* | 8/2013 | Cannon | H04W 4/001 455/420 |

FOREIGN PATENT DOCUMENTS

| | | |
|---|---|---|
| KR | 10-2005-0111950 A | 11/2005 |
| KR | 10-2011-0092124 A | 8/2011 |
| WO | 2008/050622 A1 | 5/2008 |

* cited by examiner

METHOD FOR PROVIDING MESSENGER SERVICE AND ELECTRONIC DEVICE THEREOF

CLAIM OF PRIORITY

This application claims the benefit of priority under 35 U.S.C. §119(a) from a Korean patent application filed in the Korean Intellectual Property Office on Sep. 5, 2012 and assigned Serial No. 10-2012-0098067, the entire disclosure of which is hereby incorporated by reference.

BACKGROUND

1. Field of the Invention

The present disclosure relates to an electronic device. More particularly, the present invention relates to an apparatus and a method for providing a messenger service in an electronic device.

2. Description of the Related Art

With easiness in portability, portable electronic devices have become a necessity for modern people. Furthermore, with development of a communication technology, a portable electronic device evolves into a multimedia device, providing not only a voice communication service, but also various multimedia services using a data communication service.

As described above, since a portable electronic device provides a multimedia service with development of a communication technology, the portable electronic device may provide not only a voice communication and a message transmission/reception function, but also a messenger service for exchanging a message and contents between users.

As a data service of a communication business expands and distribution of a smart phone increases, use of a messenger service using a portable electronic device increases. Accordingly, a user of a portable electronic device may require various services using a messenger service.

However, a messenger service using a portable electronic device may provide a simple service sharing character information and contents information between users. Accordingly, an alternative for providing various additional services for user convenience via the messenger service using an electronic device may be required.

SUMMARY

An aspect of the present disclosure is to address at least the above-mentioned problems and/or disadvantages and to provide at least the advantages described below. Accordingly, an aspect of the present invention is to provide an apparatus and a method for providing a messenger service in an electronic device.

Another aspect of the present disclosure is to provide an apparatus and a method for providing various additional services using a messenger service in an electronic device.

Still another aspect of the present disclosure is to provide an apparatus and a method for sharing application setting information using a messenger service in an electronic device.

Yet another aspect of the present disclosure is to provide an apparatus and a method for sharing real-time data using a messenger service in an electronic device.

Still yet another aspect of the present disclosure is to provide an apparatus and a method for sharing application execution information using a messenger service in an electronic device.

In accordance with an aspect of the present disclosure, a method for providing a messenger service in an electronic device is provided. The method preferably includes providing the messenger service through an I/O controller of the electronic device to interact with one or more counterpart electronic devices, determining first application setting information through an input of the electronic device during the messenger service, the first application setting information comprising instructions for setting a function of an application in the at least one counterpart electronic device, and transmitting through a communication unit of the electronic device the first application setting information to the at least one counterpart electronic device using the messenger service.

In accordance with another aspect of the present disclosure, a method for providing a messenger service in an electronic device is provided. The method includes providing a messenger service with at least one counterpart electronic device, receiving first application setting information through the messenger service with a communication unit of the electronic device, the first application setting information comprising instructions for setting a function of an application in the electronic device, and setting the function of the application with a processor of the electronic device according to the received application setting information during the message service.

In accordance with still another aspect of the present disclosure, a method for providing a messenger service in an electronic device is provided. The method includes providing a messenger service through an I/O controller of the electronic device to interact with at least one counterpart electronic device, determining first application execution information during the messenger service, the first application executing information comprising instructions for executing an application in the at least one counterpart electronic device, and transmitting the first application execution information to the at least one counterpart electronic device using the messenger service.

In accordance with yet another aspect of the present disclosure, a method for providing a messenger service in an electronic device is provided. The method includes communicatively connecting the electronic device via the messenger service through a communication unit with at least one counterpart electronic device, receiving in a processor of the electronic device first application execution information through the messenger service, the first application execution information comprising instructions for executing an application in the electronic device, and executing a first application according to the first application execution information.

In accordance with further another aspect of the present disclosure, a method for providing a messenger service in an electronic device is provided. The method includes providing the messenger service with at least one counterpart electronic device, displaying a data sharing screen during the messenger service, and transmitting data collected through the data sharing screen to the at least one counterpart electronic device through the messenger service.

In accordance with still further another aspect of the present disclosure, an electronic device is provided. The electronic device includes one or more processors, a memory, and a program stored in the memory and driven by the one or more processors, wherein the processor provides a messenger service with at least one counterpart electronic device, determines first application setting information during the messenger service, and transmits the first application setting information to the at least one counterpart electronic device using the messenger service.

In accordance with yet further another aspect of the present disclosure, an electronic device is provided. The electronic device includes one or more processors, a memory, and a program stored in the memory and driven by the one or more processors, wherein the processor provides a messenger service with at least one counterpart electronic device, receives first application setting information through the messenger service, and sets a function of the application according to the received first application setting information during the messenger service.

In accordance with still yet further another aspect of the present disclosure, an electronic device is provided. The electronic device includes one or more processors, a memory, and a program stored in the memory and driven by the one or more processors, wherein the processor provides a messenger service with at least one counterpart electronic device, determines first application execution information during the messenger service, and transmits the first application execution information to the at least one counterpart electronic device using the messenger service.

In accordance with still another aspect of the present disclosure, an electronic device is provided. The electronic device includes one or more processors, a memory, and a program stored in the memory and driven by the one or more processors, wherein the processor provides a messenger service with at least one counterpart electronic device, receives first application execution information through the messenger service, and execute a first application according to the first application execution information.

In accordance with still further another aspect of the present disclosure, an electronic device is provided. The electronic device includes one or more processors, a memory, and a program stored in the memory and driven by the one or more processors, wherein the processor provides a messenger service with at least one counterpart electronic device, displays a data sharing screen during the messenger service, and transmits data collected through the data sharing screen to the at least one counterpart electronic device through the messenger service.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide a technology for providing various additional services for a messenger service in an electronic device.

In the description below, an electronic device may include a portable electronic device, a portable terminal, a mobile terminal, a mobile communication terminal, a Personal Digital Assistant (PDA), a laptop computer, a desktop computer, a smart phone, a netbook, a television, a Mobile Internet Device (MID), a Ultra Mobile Personal Computer (UMPC), a table PC, a navigation, a desktop, a smart TV, a mobile pad, a media player, a wrist watch, a camera, an MP3 layer, etc. that may provide a messenger service.

Figure 1:
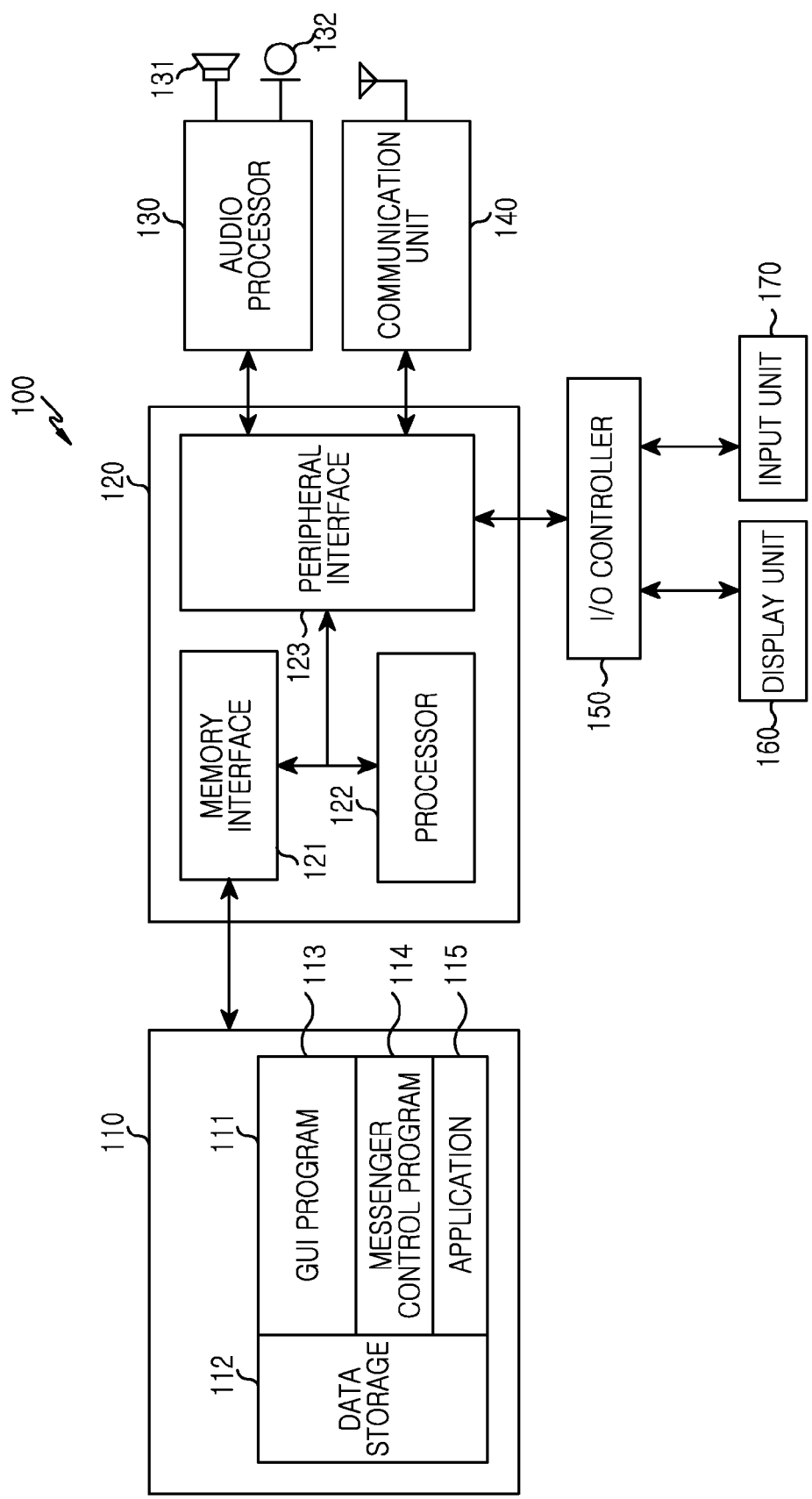
FIG. 1 is a detailed block diagram illustrating an electronic device according to the present invention.

FIG. 1 is a block diagram illustrating an electronic device according to the present invention.

As illustrated in FIG. 1, the electronic device 100 includes a memory 110, a processor unit 120, an audio processor 130, a communication unit 140, an input/output (I/O) controller 150, a display unit 160, and an input unit 170, or any combination thereof.

The memory 110 may include a plurality of sub-memory units 110. The memory 110 may include a program storage 111 for storing a program for controlling an operation of the electronic device 100, and a data storage 112 for storing data occurring or generated during execution of a program.

The program storage 111 may include a Graphic User Interface (GUI) program 113, a messenger control program 114, and at least one application 115. Typically, a program included in the program storage 111 is a set of instructions, and may be expressed as an instruction set.

As used throughout the specification and claims, a messenger service can be any type of communication system between multiple electronic devices 100. Typical messenger services have the capability of transmitting, in real-time, textual information from a first device to a second device. Many messenger services have the ability to include non-textual information (e.g., photographs or other images, audio, video or other types of data). Examples of typical messenger services include, but are not limited to SMS, MMS, and electronic mail systems.

The GUI program 113 may include at least one software element for providing a user interface on the display unit 160 using graphics. For example, the GUI program 113 may control to display a messenger service screen and a messenger additional service screen on the display unit 160.

The messenger control program 114 may include at least one software element for providing a messenger service. For example, the messenger control program 114 interact with other elements of the device 100 to transmit a message provided via the input unit 170 to a counterpart electronic device via the communication unit 140, and display a message provided via the communication unit 140 on the display unit 160 via the GUI program 113.

Figure 3:
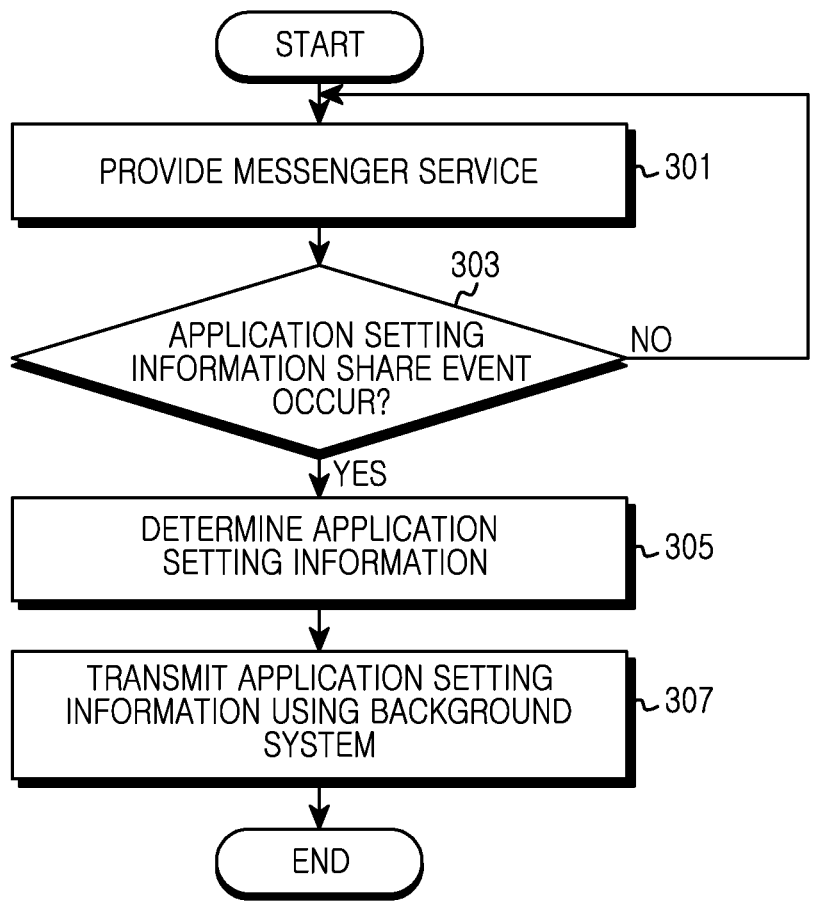
FIG. 3 is a flowchart illustrating a procedure for transmitting application setting information using a messenger service in an electronic device according to an embodiment of the present invention.
Figure 4:
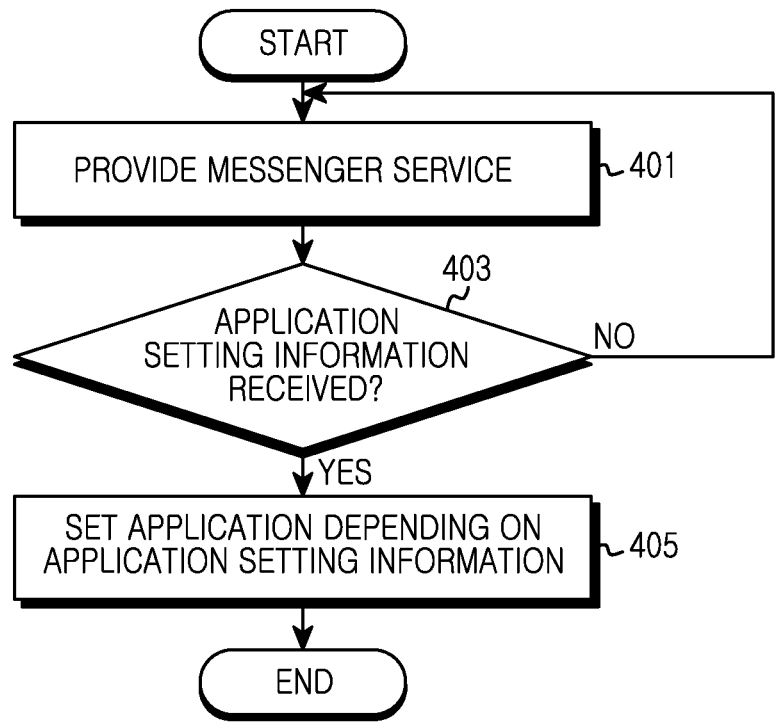
FIG. 4 is a flowchart illustrating a procedure for setting application setting information using a messenger service in an electronic device according to an embodiment of the present invention.
Figure 5:
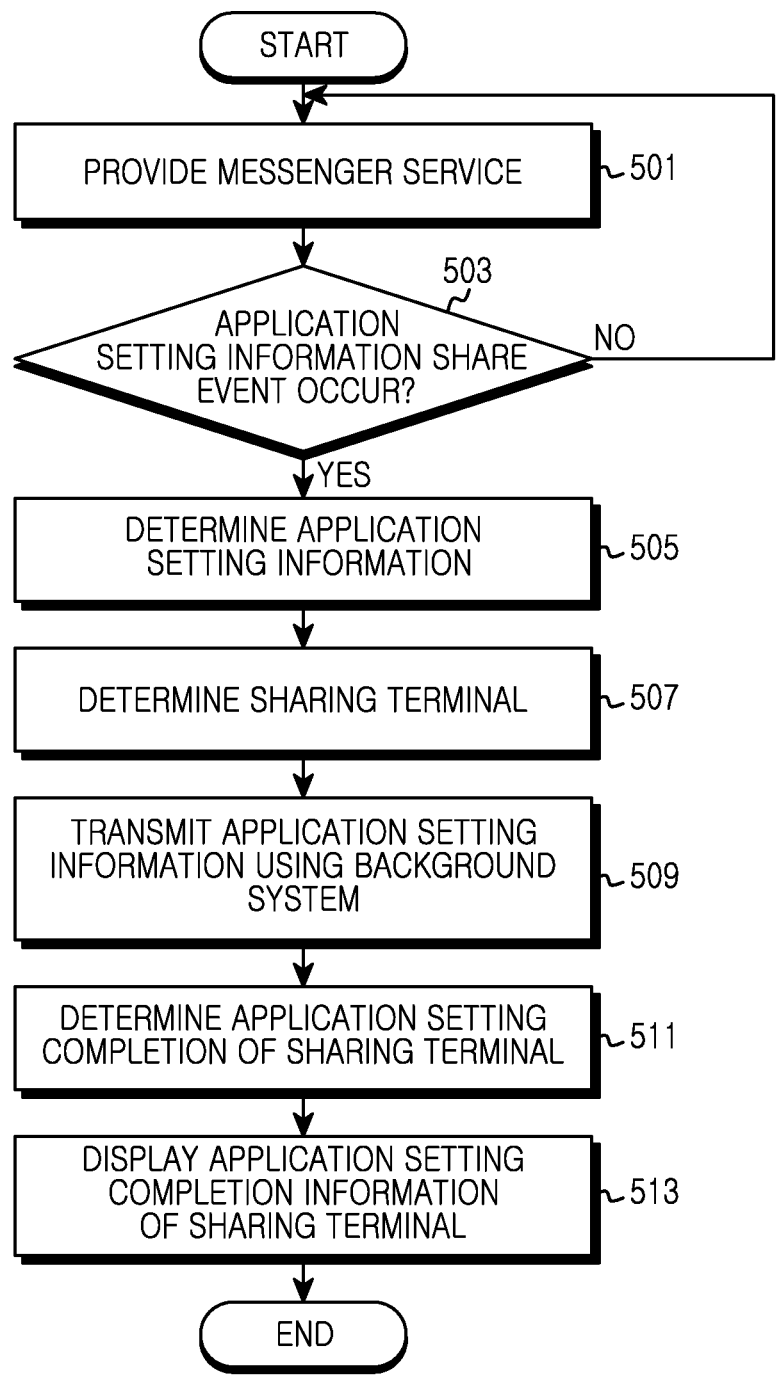
FIG. 5 is a flowchart illustrating a procedure for transmitting application setting information using a messenger service in an electronic device according to another embodiment of the present invention.
Figure 6:
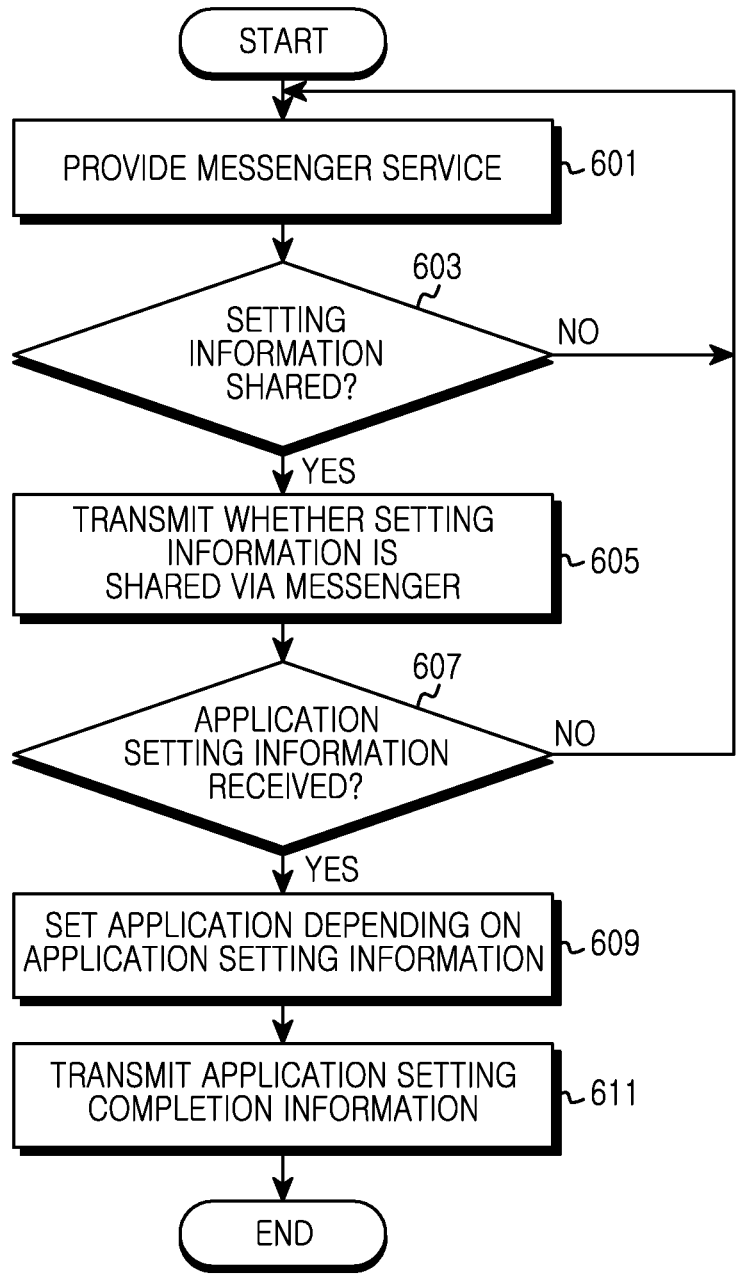
FIG. 6 is a flowchart illustrating a procedure for setting application setting information using a messenger service in an electronic device according to another embodiment of the present invention.

The messenger control program 114 may include at least one software element for providing an additional service for a messenger service. For example, the messenger control program 114 may interact with other elements of the device 100 to share application setting information using a messenger service. Specifically, the messenger control program 114 may control to transmit the application setting information to a counterpart electronic device during the messenger service as illustrated in FIG. 3 or 5. Meanwhile, the messenger control program 114 may set or execute an application depending on the application execution information provided from a counterpart electronic device using a background system during the messenger service as illustrated in FIG. 4 or 6.

Figure 12:
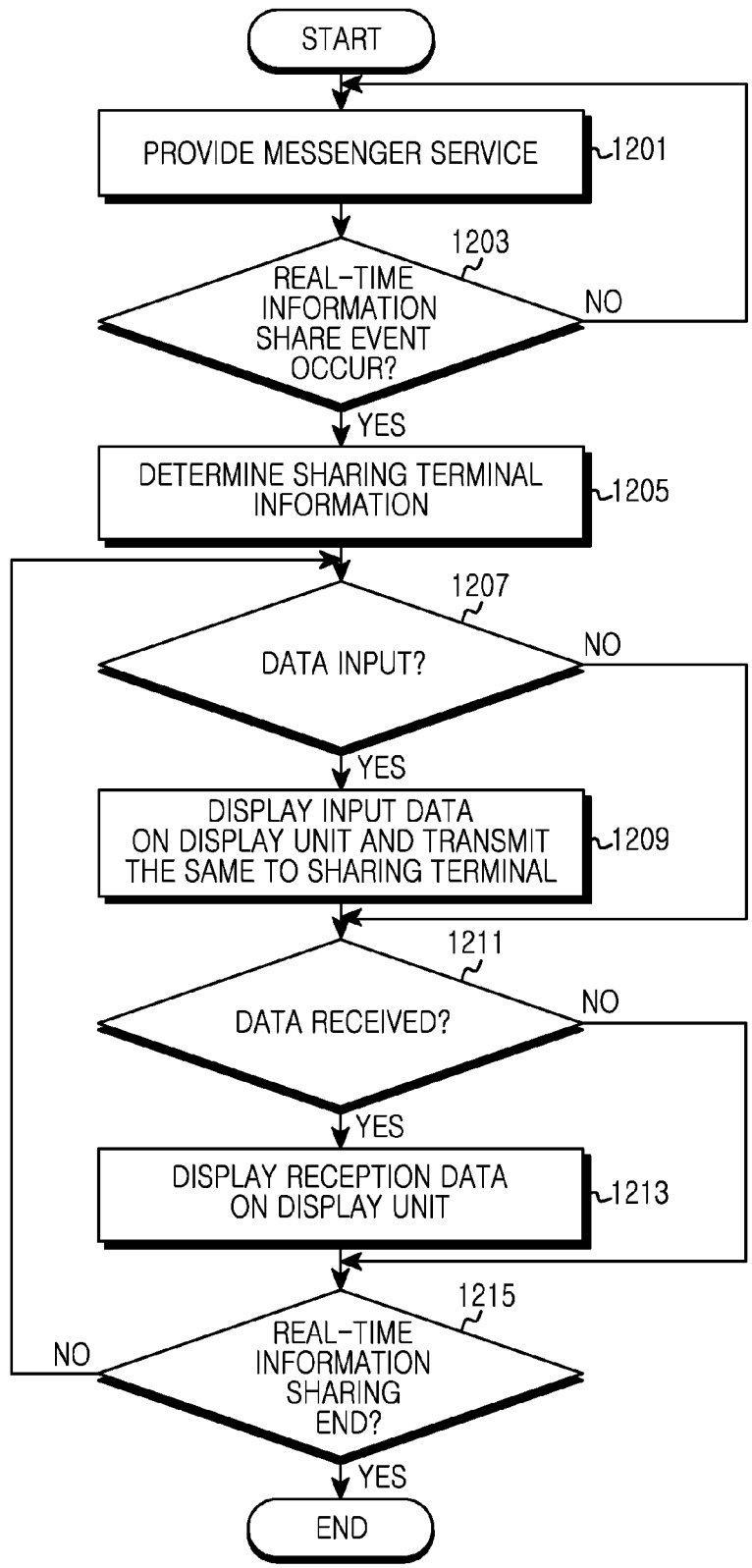
FIG. 12 is a flowchart illustrating a procedure for sharing real-time data using a messenger service in an electronic device according to an embodiment of the present invention.

Additionally, the messenger control program 114 may share real-time data using the messenger service. For example, the messenger control program 114 may control to transmit data input via the input unit 170 to a counterpart electronic device using the messenger service in real-time as illustrated in FIG. 12.

Figure 17:
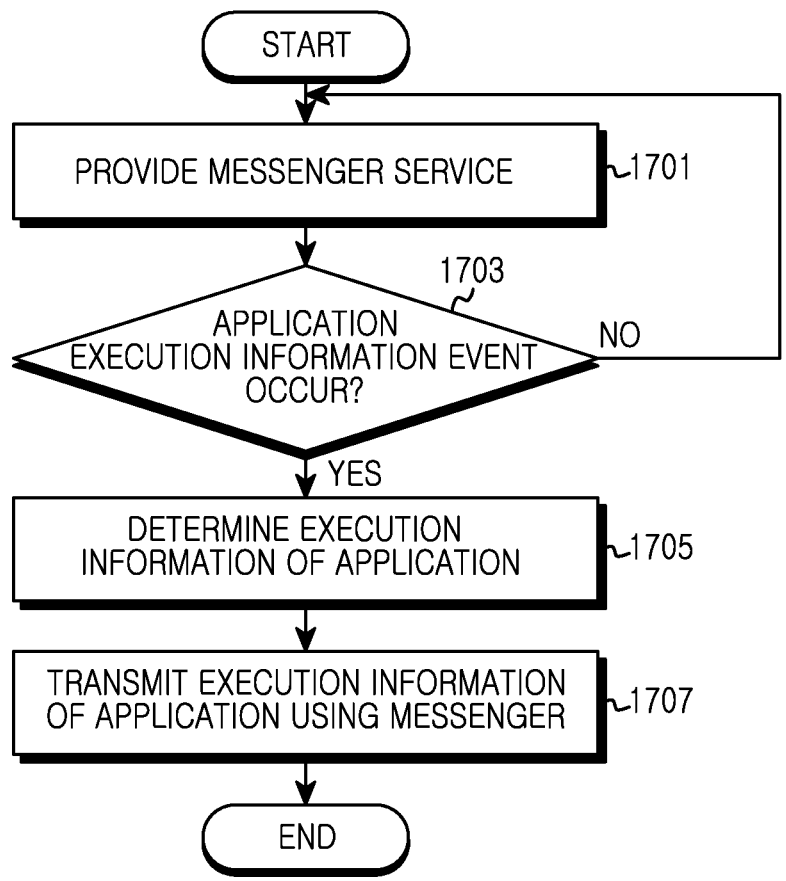
FIG. 17 is a flowchart illustrating a procedure for transmitting application execution information using a messenger service in an electronic device according to an embodiment of the present invention.
Figure 18:
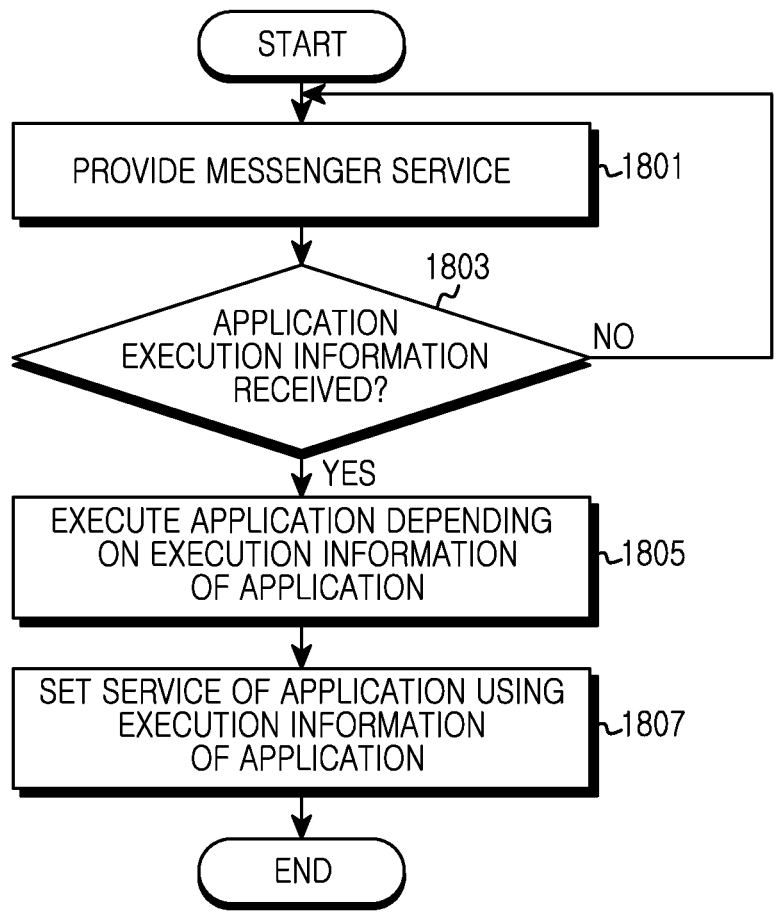
FIG. 18 is a flowchart illustrating a procedure for executing an application using a messenger service in an electronic device according to an embodiment of the present invention.

For still another example, the messenger control program 114 may share application execution information using the messenger service. For example, the messenger control program 114 may control to transmit application execution information using the messenger service to a counterpart electronic device using the messenger service as illustrated in FIG. 17. Meanwhile, the messenger control program 114 may execute an application depending on application execution information provided from a counterpart electronic device using the messenger service as illustrated in FIG. 18.

The application 115 may include a software element for at least one application installed in the electronic device 100.

The processor unit 120 may include a memory interface 121, at least one processor 122, and a peripheral interface 123. The memory interface 121, the at least one processor 122, and the peripheral interface 123 included in the processor unit 120 may be integrated in at least one integrated circuit or realized as separate elements.

The memory interface 121 may control memory access of an element such as the processor 122 or the peripheral interface 123.

The peripheral interface 123 may control connection between I/O peripherals of the electronic device 100 and the processor 122 and the memory interface 121.

The processor 122 may provide various multimedia services in the device 100 using at least one software program. For example, the processor 122 may execute at least one program stored in the memory 110 and provide a service corresponding to the relevant program.

The audio processor 130 may function as an audio interface between a user and the electronic device 100 via a speaker 131 and a microphone 132.

The communication unit 140 may process a signal transmitted/received for voice communication and data communication. For example, the communication unit 140 may be divided into a plurality of communication submodules supporting different communication networks. For example, though not limited thereto, the communication network may include one or more of a Global System for Mobile Communication (GSM) network, an Enhanced Data GSM Environment (EDGE) network, a Code Division Multiple Access (CDMA) network, a W (Wideband)-CDMA network, a Long Term Evolution (LTE) network, an Orthogonal Frequency Division Multiple Access (OFDMA) network, a wireless Local Area Network (LAN), a Bluetooth network, a Near Field Communication (NFC), etc. However, the present invention is not limited by the number or type of submodules or communications.

The I/O controller 150 may function as an interface between the various I/O units of the device, e.g., display unit 160, the input unit 170, and the peripheral interface 123.

The display unit 160 may display status information of the electronic device 100, a character input by a user, a moving picture, a still picture, etc.

The input unit 170 may provide input data generated by a user's selection to the processor unit 120 via the I/O controller 150. For example, the input unit 170 may include at least one hardware button, a touch pad for detecting touch information, a separate input unit, etc.

Figure 2:
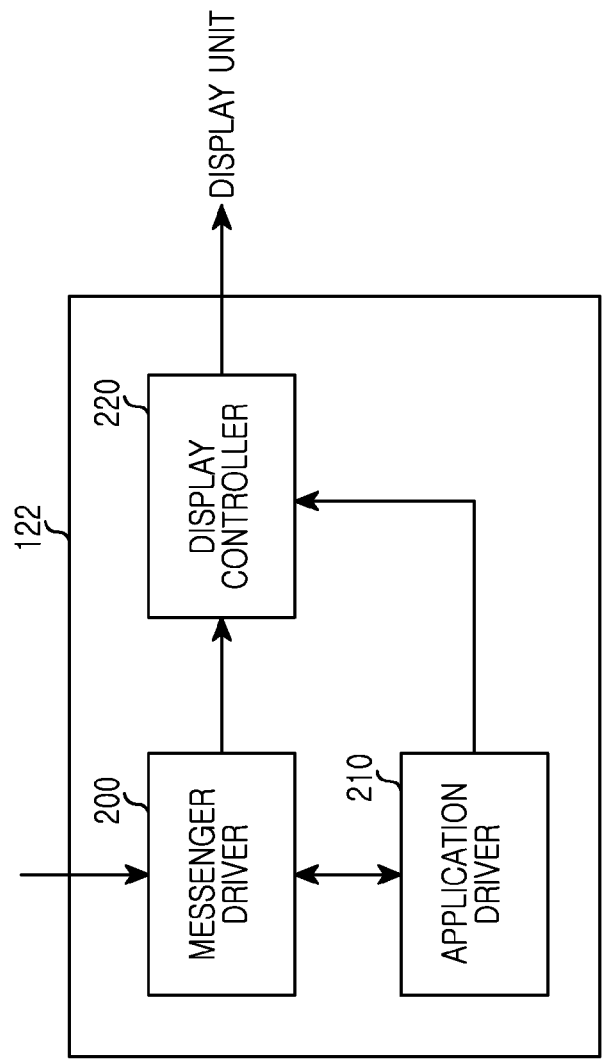
FIG. 2 is a detailed block diagram illustrating a processor according to the present invention.

FIG. 2 is a detailed block diagram illustrating a processor according to the present invention.

The processor 122 may include a messenger driver 200, an application driver 210, and a display controller 220.

The messenger driver 200 may execute the messenger control program 114 stored in the program storage 111 to provide a messenger service. For example, the messenger driver 200 may control to transmit a message provided via the input unit 170 to a counterpart electronic device via the communication unit 140, and display a message provided via the communication unit 140 on the display unit 160 via the GUI program 113.

The messenger driver 200 may execute the messenger control program 114 to provide an additional service for the messenger service. For example, the messenger control program 114 may share application setting information using the messenger service. Specifically, the messenger driver 200 may control to transmit application setting information provided via the input unit 170 to a counterpart electronic device using background system during the messenger service as illustrated in FIG. 3 or 5. Meanwhile, the messenger driver 200 may control to set an application during the messenger service depending on application setting information provided from a counterpart electronic device using background system as illustrated in FIG. 4 or 6.

In another example, the messenger driver 200 may share real-time data using the messenger service. Specifically, the messenger driver 200 may control to transmit data input via the input unit 170 to a counterpart electronic device in real-time using the messenger service as illustrated in FIG. 12.

For still another example, the messenger driver 200 may share application execution information using the messenger service. More particularly, the messenger driver 200 may control to transmit application execution information to a counterpart electronic device using the messenger service as illustrated in FIG. 17. Meanwhile, the messenger driver 200 may control to execute an application depending on application execution information provided from a counterpart electronic device as illustrated in FIG. 18.

The application driver 210 may execute at least one application among one or more applications 115 stored in the program storage 111 to provide a service corresponding to the relevant application. For example, the application driver 210 may execute at least one application among one or more applications 115 stored in the program storage 111 depending on a user's input information provided via the input unit 170 to provide a service corresponding to the relevant application. For example, the application driver 210 may execute at least one application among one or more applications 115 stored in the program storage 111 under control of the messenger driver 200 to provide a service corresponding to the relevant application. For still another example, the application driver 210 may set or update the function of at least one application among one or more applications 115 stored in the program storage 111 while providing the messenger service under control of the messenger driver 200.

Figure 7A:
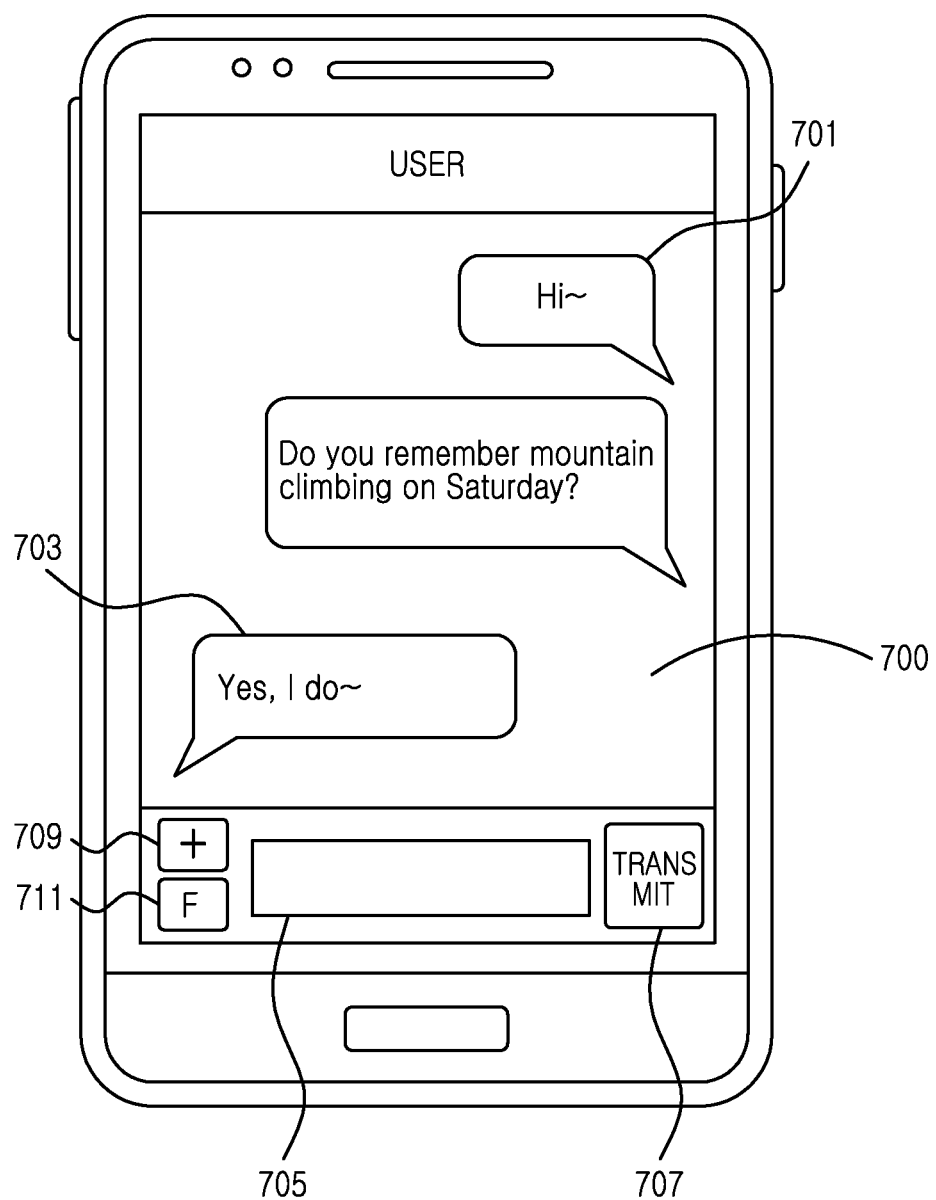
FIGS. 7A, 7B, 7C and 7D are views illustrating screen configuration for a messenger service in an electronic device according to an embodiment of the present invention.
Figure 7B:
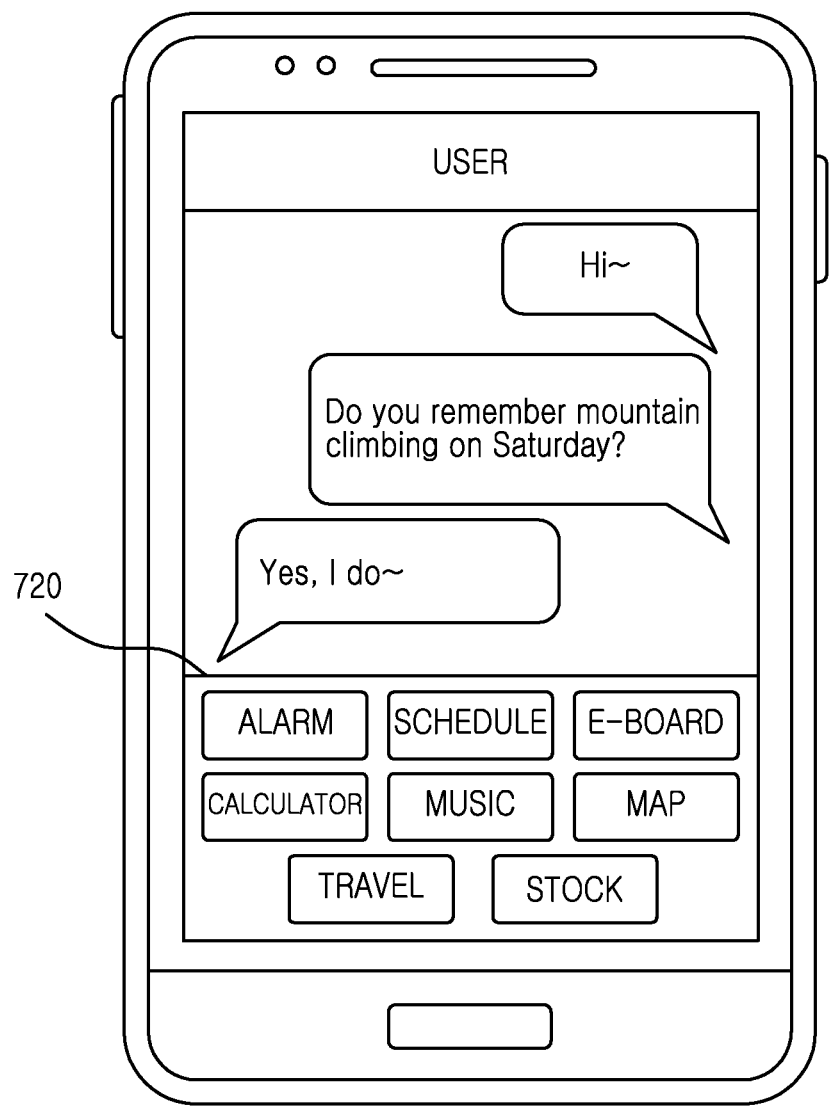
Figure 7C:
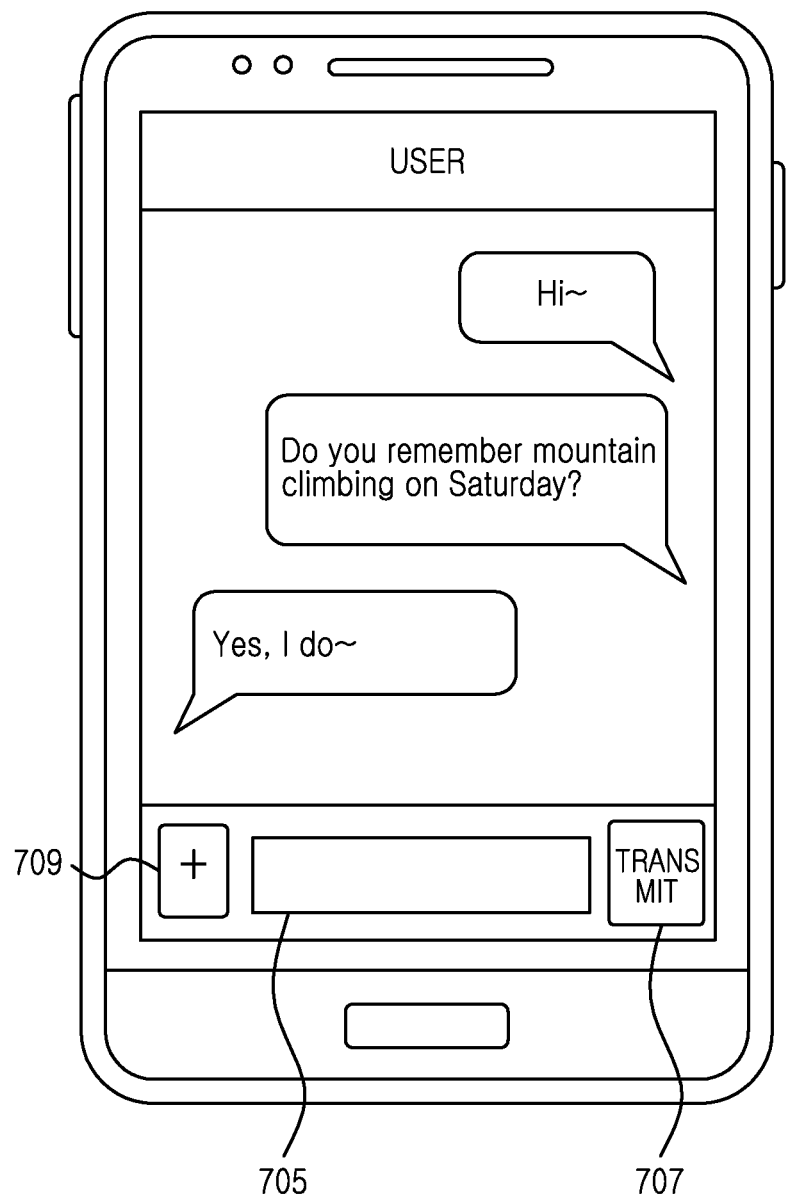

The display controller 220 execute the GUI program 113 of the program storage 111 and display status information of the electronic device 100, a character input by a user, a moving picture, and a still picture on the display unit 160. For example, the display controller 220 may control to display a messenger service screen by the messenger driver 200 on the display unit 160. At this point, the display controller 220 may be configured as illustrated in FIG. 7A or 7C. For another example, the display controller 220 may control to display application setting information on the display unit 160 during the messenger service by the messenger driver 200. For still another example, the display controller 220 may control to display information of an application driven by the application driver 210 under control of the messenger driver 200. In another example, the display controller 220 may display data transmitted in real-time by the messenger driver 200 on the display unit 160.

In the above embodiment, the processor 122 of the electronic device 100 may include an element for providing an additional service for the messenger service as separate modules such as the messenger driver 200, the application driver 210, and the display controller 220.

In another embodiment, the processor 122 of the electronic device 100 may execute the GUI program 113, the messenger control program 114, and the application 115 inside one module to provide an additional service for the messenger service.

FIG. 3 illustrates a procedure for transmitting application setting information using a messenger service in an electronic device according to an embodiment of the present invention.

Referring to FIG. 3, the electronic device 100 may provide the messenger service in step 301. For example, the electronic device 100 may display a messenger service screen 700 illustrated in FIG. 7A or 7C on the display unit 160 to display messages transmitted/received to/from at least one counterpart electronic device. At this point, the electronic device 100 may display the messenger service screen 700 such that a message 701 written by a user of the electronic device 100 and a message 703 received from a counterpart electronic device are shown as illustrated in FIGS. 7A and 7C. In a preferred embodiment messages 701 and 703 are displayed differently to permit a user to quickly differentiate between sent messages and received messages. Typically, this accomplished by separating such messages 701 and 703 into different visual cues, e.g., bubbles or columns, or otherwise shading, coloring or highlighting the types of messages differently. Additionally, the messenger service screen 700 may include a region 705 for input of messages by a user, a message transmission button 707, a first additional service button 709, and a second additional service button 711 at its lower end as illustrated in FIG. 7A. Meanwhile, the messenger service screen may include a region 705 for message writing, a message transmission button 707, and an additional service button 709 at its lower end as illustrated in FIG. 7C.

Figure 7D:
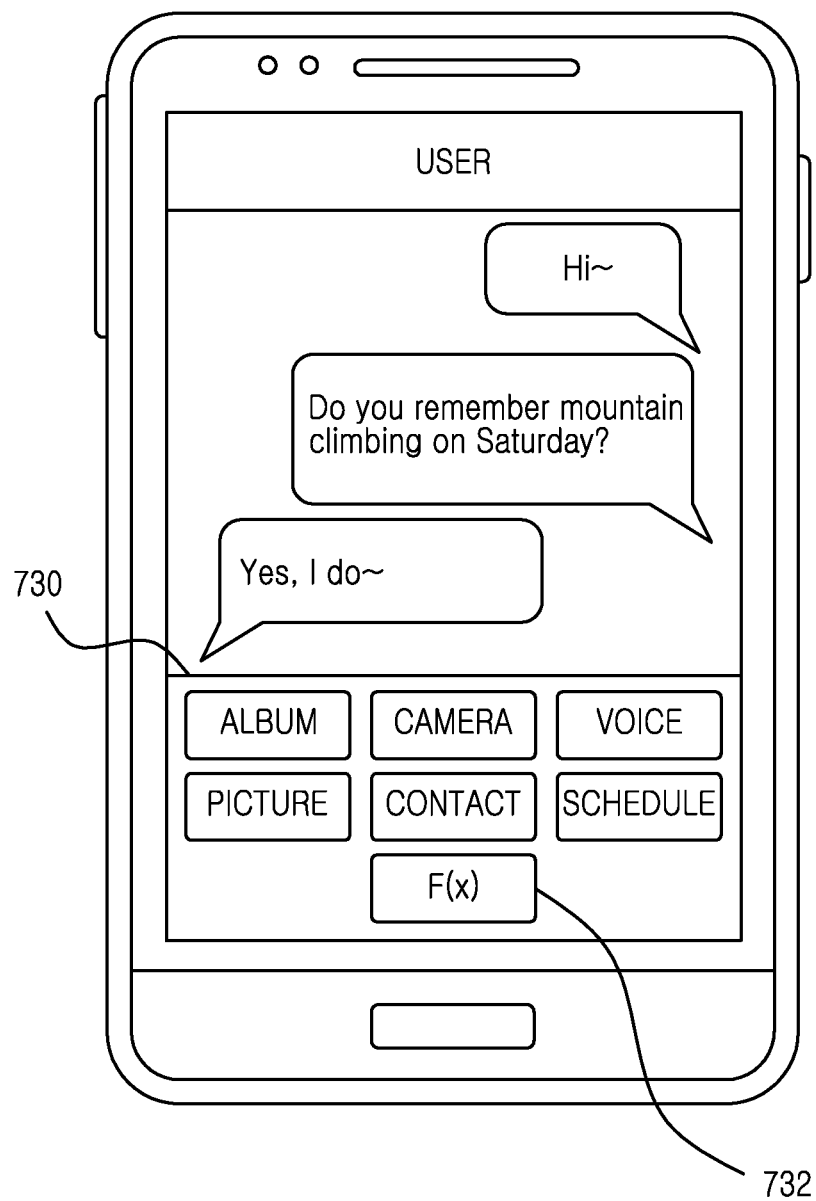

In case of providing a messenger service, the electronic device 100 may proceed to step 303 to determine whether an application setting information share event occurs. At this point, the electronic device 100 may determine whether an application setting information share event occurs with consideration of touch information detected via a touchscreen. For example, in the case where a touch of the second additional service button 711 (FIG. 7A) is detected via touch information in the messenger service screen 700, the electronic device 100 may display an additional service list 720 as illustrated in FIG. 7B. The particular items displayed as part of the additional service list 720 are merely examples, and can be added to, subtracted from or substituted to correspond to any number of functions capable of being executed by a mobile device, for example, a book store application. Thereafter, the electronic device 100 may determine whether an application for sharing setting information is selected from the additional service list. In another example, when an additional service button 709 is selected by the user, the electronic device 100 may display an additional service list 730 as illustrated in FIG. 7D. In the case where a supplemental list button 732 is selected from the additional service list, the electronic device 100 may display the supplemental additional service list 720 as illustrated in FIG. 7B. After that, the electronic device 100 may determine whether an application for sharing setting information is selected from the additional service list. Here, an application for sharing setting information may include an alarm application, a schedule application, etc. As used throughout the specification and claims, the "application setting information" refers to the content of the message or the message itself to be transmitted and the "share event" is the instruction by the user to transmit the "application setting information" to the counterpart device.

In the case where an application setting information share event does not occur, the electronic device 100 may proceed to step 301 to provide a messenger service.

In contrast, in the case where an application setting information share event occurs, the electronic device 100 may proceed to step 305 to determine setting information of an application selected by a user. For example, the electronic device 100 may display an application setting screen using a portion of a messenger service screen. After that, the electronic device 100 may determine application setting information input via the application setting screen.

After determining the application setting information, the electronic device 100 may proceed to step 307 to transmit the application setting information to at least one counterpart electronic device using the messenger service. For example, the electronic device 100 may transmit application setting information to a counterpart electronic device connected via the messenger service during the messenger service using background system. Here, the application setting information may include application identify information and input information for each setting item.

In the above embodiment, the electronic device 100 may determine whether an application setting information share event occurs with consideration of touch information detected via a touchscreen.

In another embodiment, the electronic device 100 may determine whether an input of a hardware button for sharing application setting information is detected.

In still another embodiment, the electronic device 100 may determine whether a physical movement of the electronic device, e.g., shaking, for sharing application setting information is detected.

In further another embodiment, the electronic device 100 may determine whether a user's gesture for sharing application setting information is detected. Such gestures typically are user interactions with the device 100 and can include one or more swipes of a finger on the touchscreen, or a combination of finger swipes, e.g., pinch-out, pinch-in.

As described above, in the case where the electronic device transmits application setting information using the background system during the messenger service, a counterpart electronic device 100 may set a function of a relevant application during the messenger service depending on the application setting information as illustrated in FIG. 4.

FIG. 4 illustrates a procedure for setting application setting information using a messenger service in an electronic device according to an embodiment of the present invention.

Referring to FIG. 4, in step 401, the electronic device 100 may provide a messenger service. For example, the electronic device 100 may display a messenger service screen 700 on the display unit 160 to display a message transmitted/received to/from at least one counterpart electronic device.

After that, the electronic device 100 may proceed to step 403 to determine whether application setting information is received from a counterpart electronic device during the messenger service. For example, the electronic device 100 may determine whether the application setting information is received from the counterpart electronic device using the background system during the messenger service.

In the case where the application setting information is not received during the messenger service, the electronic device 100 may proceed to step 401 to provide the messenger service.

In contrast, in the case where the application setting information is received through the messenger service, the electronic device 100 may proceed to step 405 to set the function of a relevant application during the messenger service depending on the application setting information received using the background system.

FIG. 5 illustrates a procedure for transmitting application setting information using a messenger service in an electronic device 100 according to another embodiment of the present invention.

Referring to FIG. 5, the electronic device 100 may provide a messenger service in step 501. For example, the electronic device 100 may display the messenger service screen 700 illustrated in FIG. 7A or 7C on the display unit 160 to display a message transmitted/received to/from at least one counterpart electronic device. At this point, the electronic device 100 may display the messenger service screen 700 such that a message 701 written by a user of the electronic device and a message 703 received from a counterpart electronic device are differently displayed as illustrated in FIGS. 7A and 7C.

In case of providing the messenger service, the electronic device 100 may proceed to step 503 to determine whether an application setting information share event occurs. For example, the electronic device 100 may determine whether an application setting information share event occurs as detected via a touchscreen. For another example, the electronic device 100 may determine whether an input of a hardware button for sharing application setting information is detected. For still another example, the electronic device 100 may determine whether a movement of the electronic device 100 for sharing application setting information is detected. For further another example, the electronic device 100 may determine whether a user's gesture for sharing application setting information is detected.

In the case where an application setting information share event does not occur, the electronic device 100 may proceed to step 501 to provide the messenger service.

In contrast, in the case where an application setting information share event does occur, the electronic device 100 may proceed to step 505 to determine setting information of an application selected by a user. For example, the electronic device 100 may display an application setting screen using a portion of a messenger service screen. After that, the electronic device 100 may determine application setting information input via the application setting screen.

After determining the application setting information, the electronic device 100 may proceed to step 507 to determine or identifying a sharing terminal, i.e., the electronic device to which the application setting information is sent. Here, the sharing terminal may be at least one counterpart electronic device that has accepted sharing of application setting information among one or more counterpart electronic devices providing the messenger service. For example, the electronic device 100 may transmit a request signal for determining whether to share application setting information to the at least one counterpart electronic device providing the messenger service. After that, the electronic device 100 may determine a sharing terminal with consideration of a response signal provided from a counterpart electronic device. For another example, the electronic device 100 may determine a sharing terminal with consideration of control information provided from the at least one counterpart electronic device providing the messenger service. At this point, the electronic device 100 may display whether to share application setting information with each counterpart electronic device providing the messenger service. In one embodiment, the electronic device 100 determines the sharing terminal by first sending a "sharing request" to the sharing terminal, and only after receiving a positive response from the sharing terminal (which response can be automatic or require a response by a user).

After determining or identifying the sharing terminal, the electronic device 100 may proceed to step 509 to transmit the application setting information to a sharing terminal during the messenger service. More particularly, the electronic device 100 may transmit application setting information to the sharing terminal using the background system during the messenger service. Here, the application setting information may include application identify information and input information for each setting item.

Thereafter, the electronic device 100 may proceed to step 511 to determine whether application setting of a sharing terminal is completed. For example, the electronic device 100 may determine whether application setting complete information is received from the sharing terminal. In the case where the sharing terminal has not set an application, the electronic device 100 may retransmit the application setting information. In one embodiment, the electronic device 100 waits for a response from the sharing terminal, which response indicates that the application setting information has been received correctly. This can be accomplished by including a simple variable in the application setting information and having the sharing terminal process the variable according to a set algorithm, and returning the result as a check function to the electronic device 100.

When determining application setting completion of the sharing terminal, the electronic device 100 may proceed to step 513 to display whether the sharing terminal has set the application on the display unit 160. For example, the electronic device 100 may provide a dialog box or other audio or visual indication to the user that the application setting information has been correctly received by the sharing terminal.

As described above, in the case where the electronic device 100 has transmitted the application setting information using the background system during the messenger service, a counterpart electronic device or sharing terminal may set the function of the relevant application during the messenger service as illustrated in FIG. 6.

FIG. 6 illustrates a procedure for setting application setting information using a messenger service in an electronic device according to another embodiment of the present invention.

Referring to FIG. 6, the electronic device 100 may provide the messenger service in step 601. For example, the electronic device 100 may display a messenger service screen 700 on the display unit 160 to display a message transmitted/received to/from at least one counterpart electronic device, similar to similar steps 301, 401 and 501.

Thereafter, the electronic device 100 may proceed to step 603 to determine whether to share application setting information. For example, the electronic device 100 may determine or collect application setting information for application setting information sharing among setting information for the messenger service. In another example, in the case where a request signal for determining whether to share application setting information is received from a counterpart electronic device of the messenger service, the electronic device 100 may display a popup window for determining whether to share application setting on the display unit 160. After that, the electronic device 100 may determine whether to share the application setting information with consideration of a user's input information detected via the popup window.

In the case where the electronic device 100 does not share the application setting information, the electronic device 100 may proceed to step 601 to provide the messenger service. At this point, the electronic device 100 may provide an audio or visual alert that the application setting information has not been shared to a counterpart electronic device of the messenger service.

In contrast, in the case where the electronic device 100 shares the application setting information, the electronic device 100 may proceed to step 605 to transmit shared information of the application setting information to the counterpart electronic device of the messenger service. More particularly, the electronic device 100 indicates to the user that the application setting information has been transmitted to the counterpart electronic device.

After that, the electronic device 100 may proceed to step 607 to determine whether the application setting information is received from a counterpart electronic device during the messenger service. For example, the electronic device 100 may determine whether the application setting information is received from the counterpart electronic device using the background system during the messenger service.

In the case where the application setting information is not received, the electronic device 100 may proceed to step 601 to provide the messenger service.

In contrast, in the case where the application setting information is received with the messenger service, the electronic device 100 may proceed to step 609 to set or operate a relevant application during the messenger service depending on the application setting information received using the background system.

After setting the application, the electronic device 100 may proceed to step 611 to transmit application setting completion information to a counterpart electronic device.

As described above, the electronic device 100 may share the application setting information using the background system during the messenger service. For example, the electronic device 100 may share setting information of an alarm application or setting information of a schedule application. In the case where the electronic device 100 shares the setting information of the alarm application, the electronic device 100 may transmit alarm setting information to the counterpart electronic device as illustrated in FIGS. 8A to 8C.

Figure 8A:
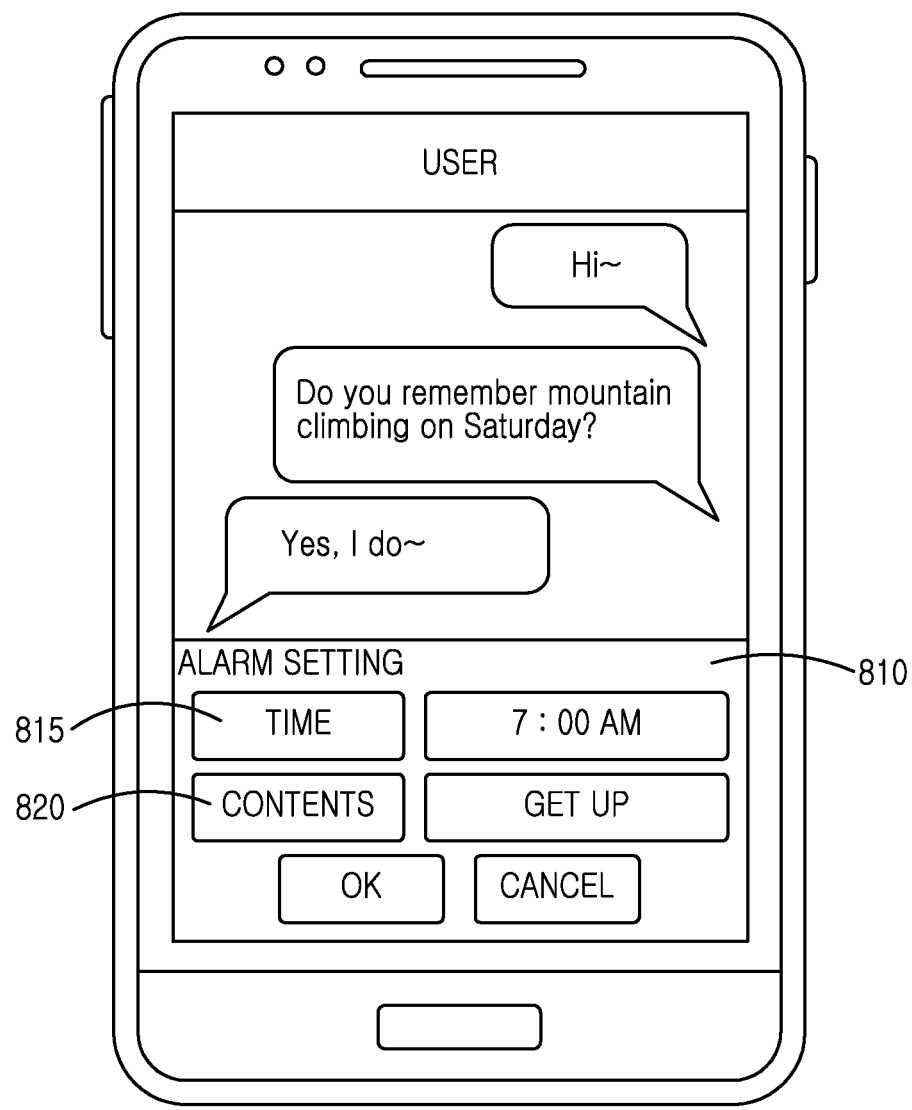
FIGS. 8A, 8B and 8C are views illustrating screen configuration for transmitting alarm setting information using a messenger service in an electronic device according to an embodiment of the present invention.
Figure 8B:
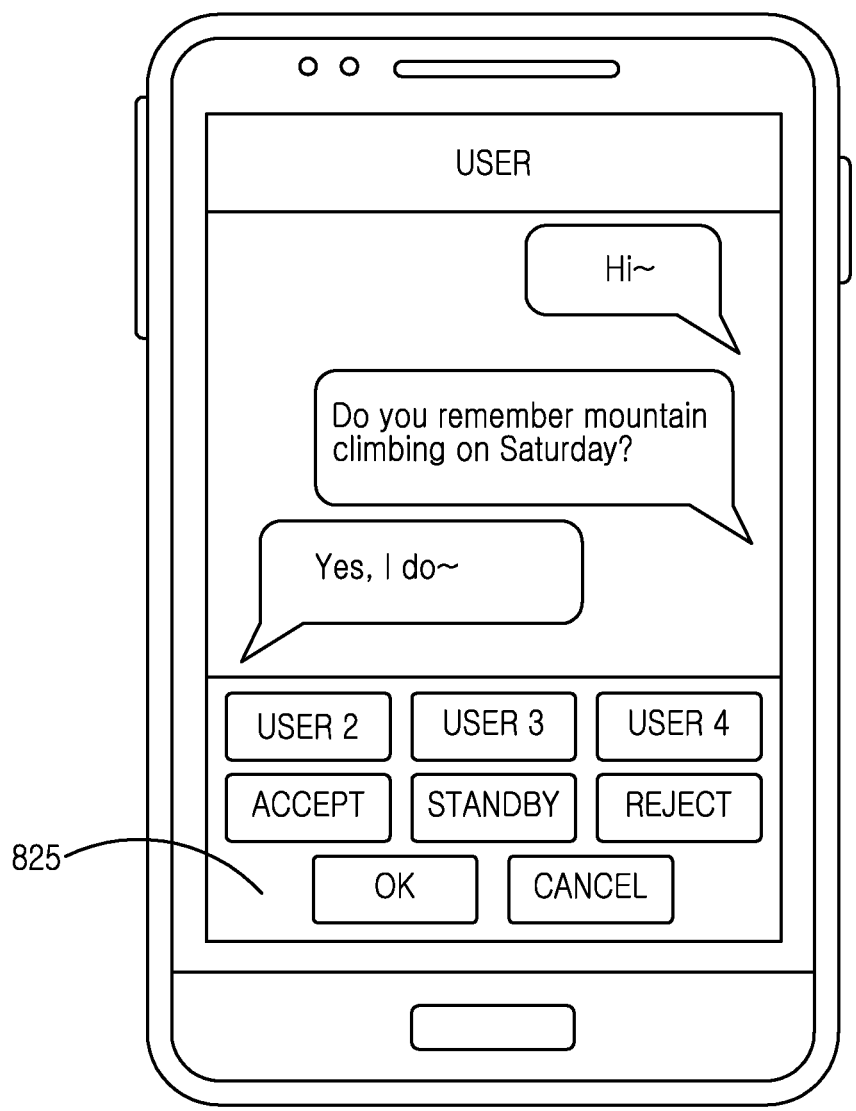
Figure 8C:
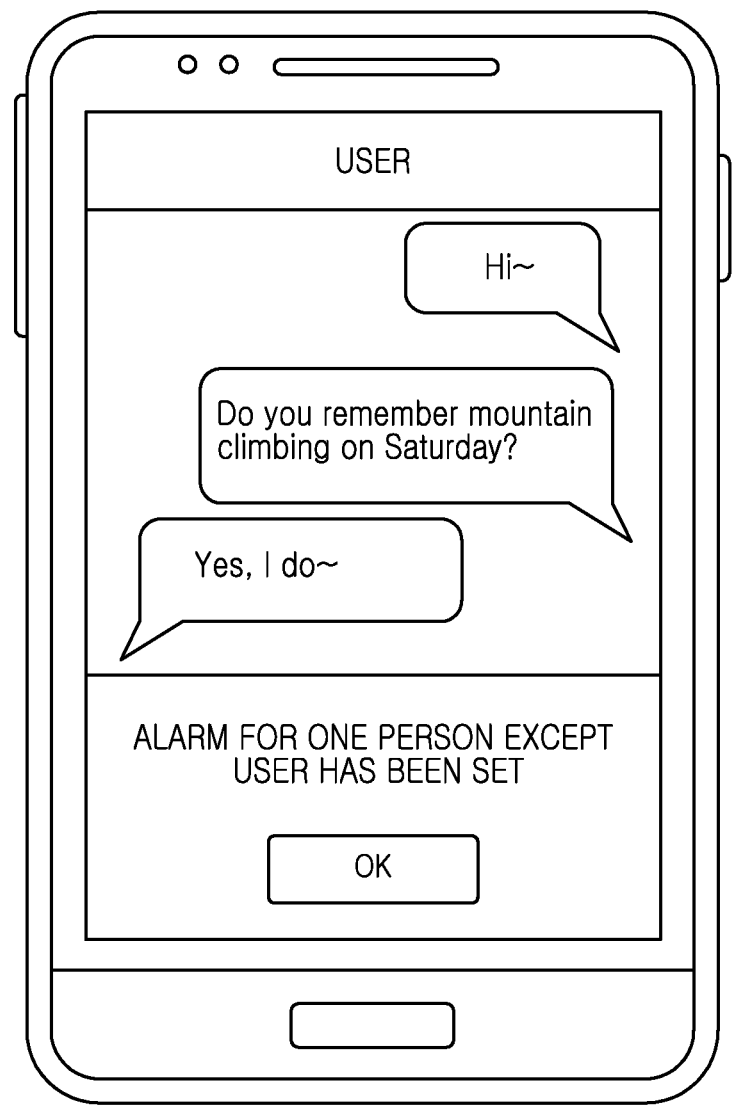

FIGS. 8A to 8C illustrate screen configurations for transmitting alarm setting information using a messenger service in an electronic device according to an embodiment of the present invention.

In the case where selection of "alarm" is detected in the additional service list 720 illustrated in FIG. 7B, the electronic device 100 may recognize that setting information of an alarm application is shared. Accordingly, the electronic device 100 may display an alarm setting screen 810 on the display unit 160 as illustrated in FIG. 8A. At this point, the alarm setting screen 810 may include a time item 815 and a contents item 820.

In case of detecting an input of each item for setting an alarm via the input unit 170, the electronic device 100 may display input information on each setting item of the alarm setting screen 810. For example, the electronic device 100 may display "7:00 AM" on the time item and "get up" on the contents item depending on a user's input for setting an alarm as illustrated in FIG. 8A.

As described above, after displaying input information of each item for setting an alarm, in the case where an input of an "OK" button is detected in the alarm setting screen 810, the electronic device 810 may recognize alarm setting has been completed. In this case, the electronic device 100 may transmit alarm setting information to a counterpart electronic device connected via the messenger service using the background system as illustrated in FIG. 3 (step 307).

Meanwhile, in case of recognizing the alarm setting has been completed, the electronic device 100 may determine shared terminal information as illustrated in FIG. 5 (step 507). For example, the electronic device 100 may display only information of at least one counterpart electronic device that has accepted alarm setting information shared among counterpart electronic devices providing the messenger service. In another example, the electronic device 100 may display whether each counterpart electronic device shares alarm setting information providing the messenger service as illustrated in FIG. 8B.

In case of displaying sharing terminal information, when detecting an input of an "OK" button in the sharing terminal information display screen 825 of FIG. 8B, the electronic device 100 may transmit alarm setting information to a sharing terminal using the background system through the messenger service.

Additionally, after transmitting the alarm setting information, the electronic device 100 may display the alarm setting completion information of a counterpart electronic device that has set an alarm depending on alarm setting information transmitted using the background system as illustrated in FIG. 8C.

Figure 9A:
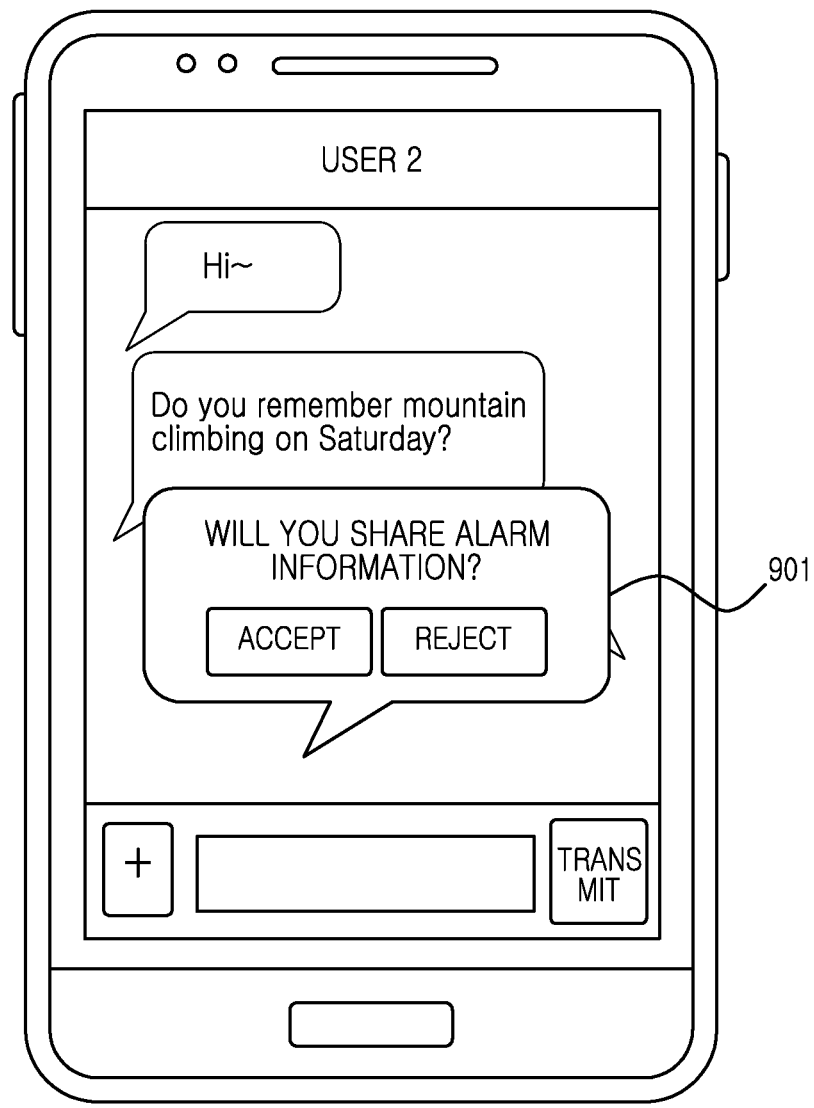
FIGS. 9A and 9B are views illustrating screen configuration for setting alarm information using a messenger service in an electronic device according to an embodiment of the present invention.
Figure 9B:
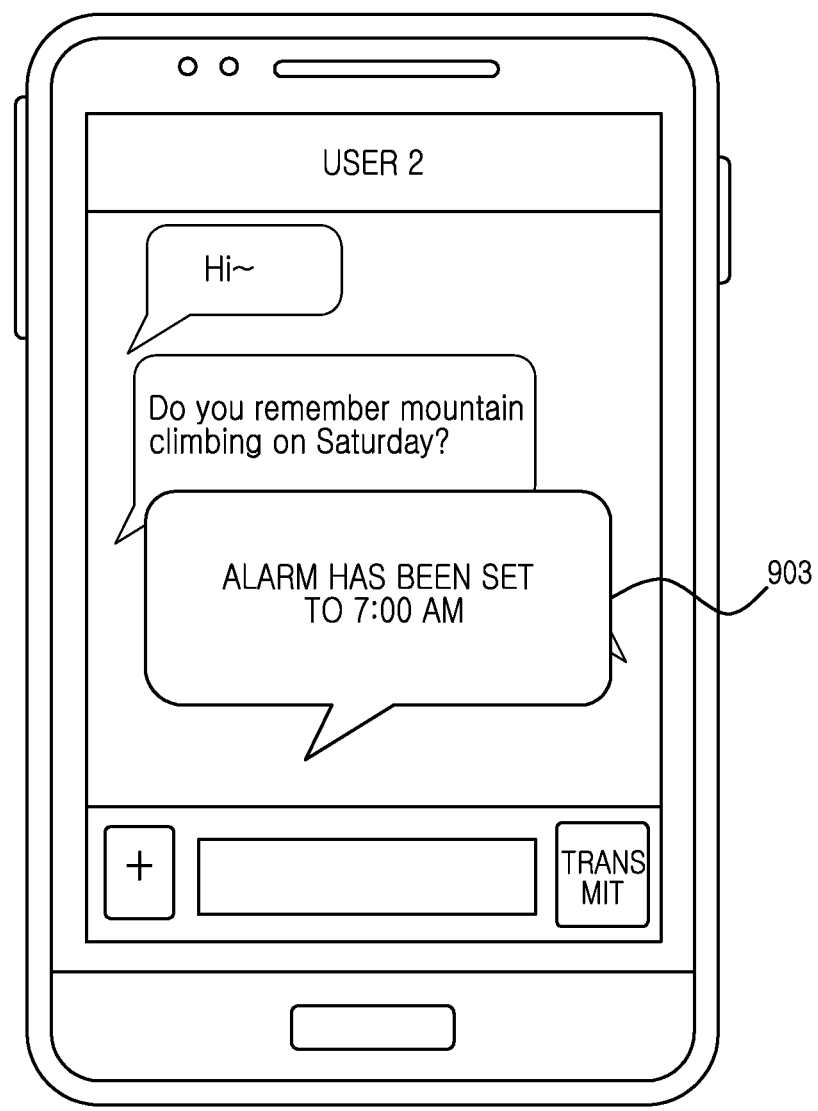

As described above, in the case where the electronic device has transmitted the alarm setting information using the background system during the messenger service, the counterpart electronic device 100 may set an alarm using the background system through the messenger service as illustrated in FIGS. 9A and 9B.

FIGS. 9A and 9B illustrate screen configuration for setting alarm information using a messenger service in an electronic device according to an embodiment of the present invention.

In the case where the electronic device provides the messenger service, the electronic device 100 may determine whether to share alarm setting information with a counterpart electronic device providing the messenger service as illustrated in FIG. 6 (step 603). For example, in the case where a request signal for determining whether to share alarm setting information is received from a counterpart electronic device of the messenger service, the electronic device 100 may display a popup window 901 for determining whether to accept the alarm setting information on the display unit 160 as illustrated in FIG. 9A. In the case where an input of "accept" is detected in the popup window 901 of FIG. 9A, the electronic device 100 may recognize or confirm that the alarm setting information is shared with the counterpart electronic device providing the messenger service. In contrast, in the case where an input of "reject" is detected in the popup window 901 of FIG. 9A, the electronic device 100 may recognize or acknowledge that the alarm setting information is not shared with the counterpart electronic device providing the messenger service. At this point, the electronic device informs the counterpart electronic device providing the messenger service of whether the alarm setting information is shared. For example, upon receiving a request to share alarm setting information from a counterpart device (utilizing the messenger service), the popup window 901 provides the user of the electronic device to accept or deny the sharing of the alarm setting information. In one embodiment, upon accepting the sharing of alarm information from a particular counterpart device, an indication of this acceptance can be stored in the messenger control program memory 114, such that the electronic device remembers this selection and does not require user interaction in the future.

In the case where the electronic device shares the alarm setting information, the electronic device 100 may set an alarm time depending on the alarm setting information provided from the counterpart electronic device using the background system during the messenger service. At this point, the electronic device 100 may display the alarm setting information 903 using a popup window in the messenger service screen as illustrated in FIG. 9B.

In another embodiment, once a user of the electronic device 100 accepts the sharing of alarm information, a second popup window can be displayed showing the particular item or information to be shared. More particularly, popup window 901 only indicates that the user has accepted sharing of alarm information generally, but has not accepted the setting of any particular alarm setting by the counterpart device.

Figure 10A:
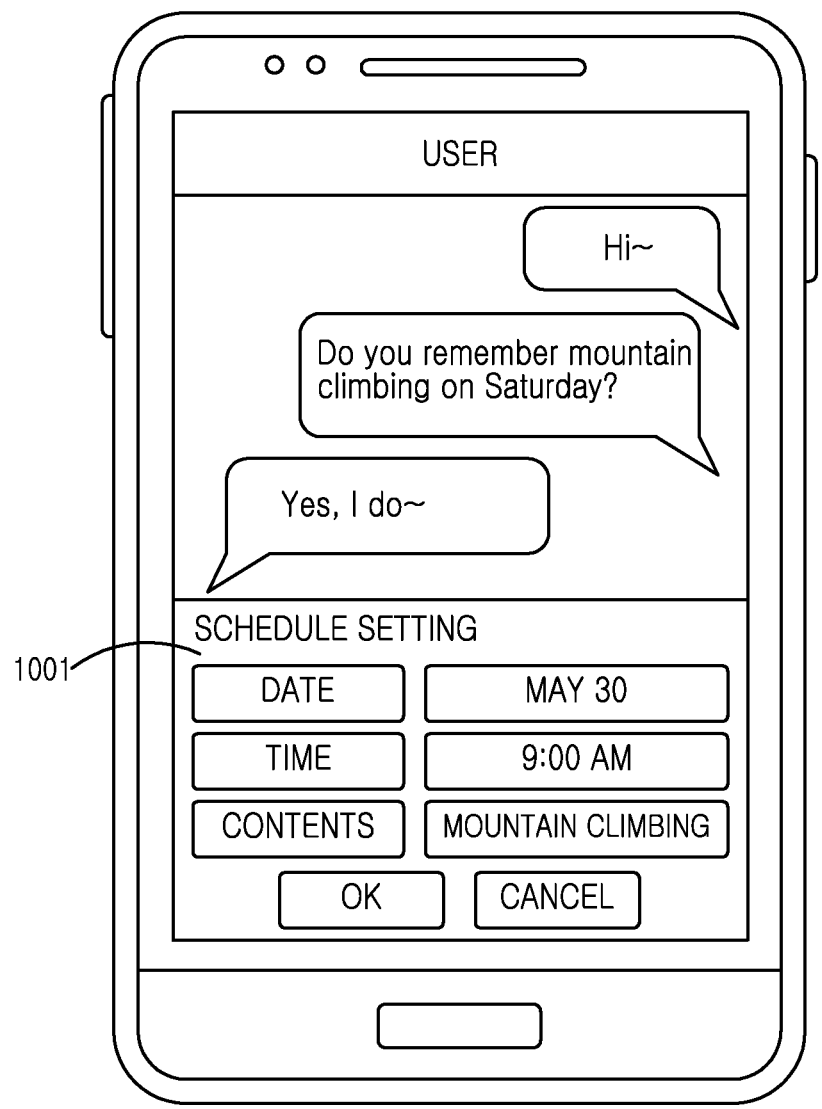
FIGS. 10A, 10B and 10C are views illustrating screen configuration for transmitting schedule setting information using a messenger service in an electronic device according to an embodiment of the present invention.
Figure 10B:
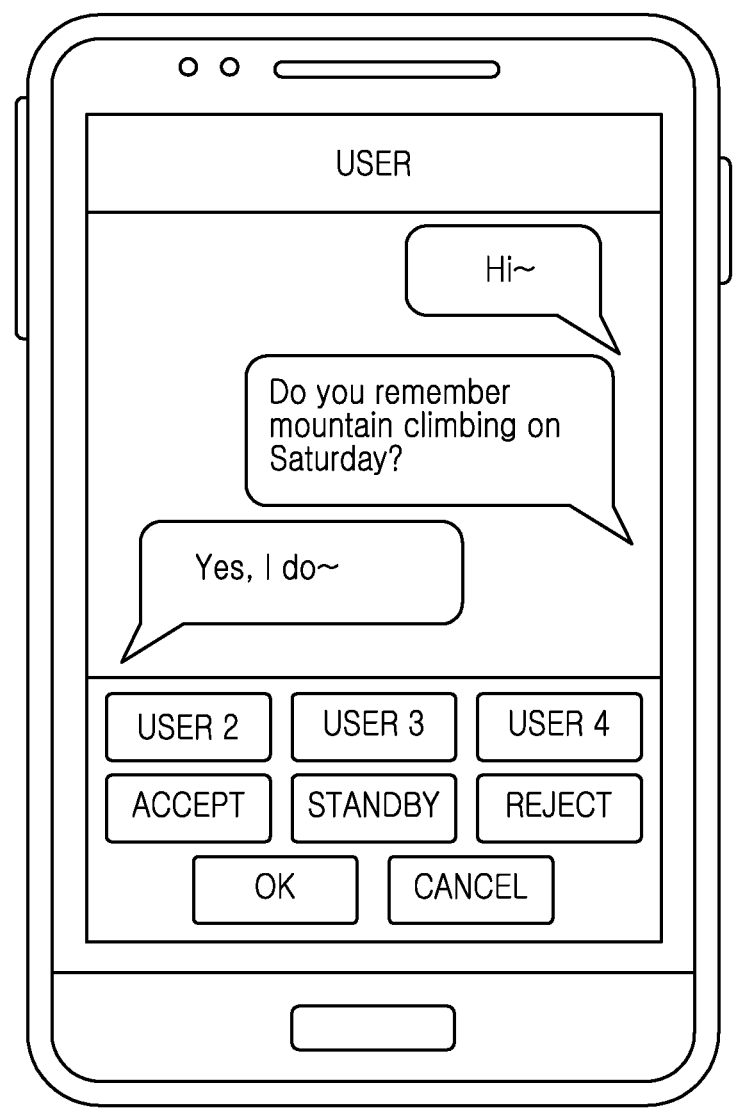
Figure 10C:
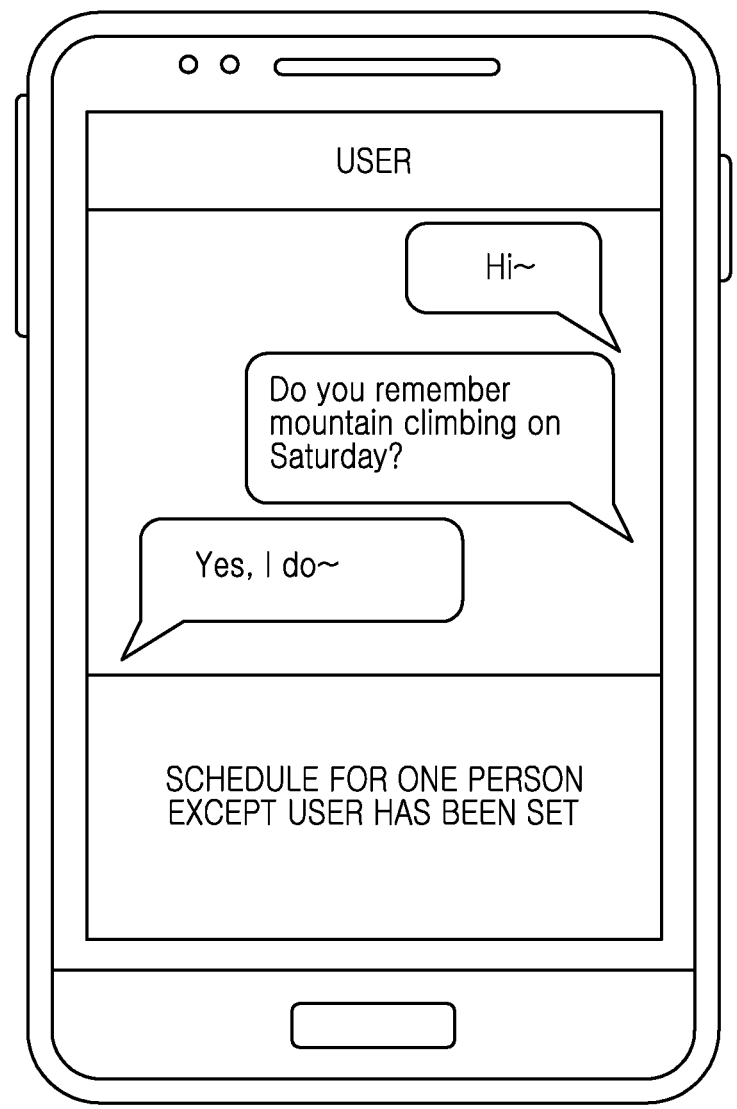

In the case where setting information of a schedule application is shared, the electronic device 100 may transmit schedule setting information to a counterpart electronic device as illustrated in FIGS. 10A to 10C.

FIGS. 10A to 10C illustrate a screen configuration for transmitting schedule setting information using a messenger service in an electronic device according to an embodiment of the present invention.

In the case where selection of "schedule" is detected in the additional service list 720 of FIG. 7B, the electronic device 100 may recognize setting information of a schedule application is shared. Accordingly, the electronic device 100 may display a schedule setting screen 1001 on the display unit 160 as illustrated in FIG. 10A. At this point, the schedule setting screen 1001 may include a date item, a time item, and a contents item.

In case of detecting an input of each item for setting a schedule via the input unit 170, the electronic device 100 may display input information for each setting item of the schedule setting screen 1001. For example, the electronic device 100 may display "May 30" for a date item, "9:00 AM" for a time item, and "mountain climbing" for a contents item depending on a user's input information for setting a schedule as illustrated in FIG. 10A.

As described above, after displaying input information of each item for setting a schedule, when detecting an input of an "OK" button in the schedule setting screen 1001, the electronic device 100 may recognize schedule setting has been completed. In this case, the electronic device 100 may transmit schedule information to a counterpart electronic device connected via the messenger service during the messenger service using the background system as illustrated in FIG. 3 (step 307).

Meanwhile, in case of recognizing schedule setting is completed, the electronic device 100 may display sharing terminal information as illustrated in FIG. 5 (step 507). For example, the electronic device 100 may display only information of at least one counterpart electronic device that has accepted schedule information sharing among one or more counterpart electronic devices providing the messenger service. For another example, the electronic device 100 may display whether each counterpart electronic device providing the messenger service shares schedule information as illustrated in FIG. 10B.

In case of displaying sharing terminal information, when detecting an input of an "OK" button in the sharing terminal information display screen of FIG. 10B, the electronic device 100 may transmit schedule information to a sharing terminal using the background system during the messenger service.

Additionally, after transmitting schedule information, the electronic device 100 may display information of a counterpart electronic device that has set a schedule depending on the schedule information transmitted using the background system as illustrated in FIG. 10C.

Figure 11A:
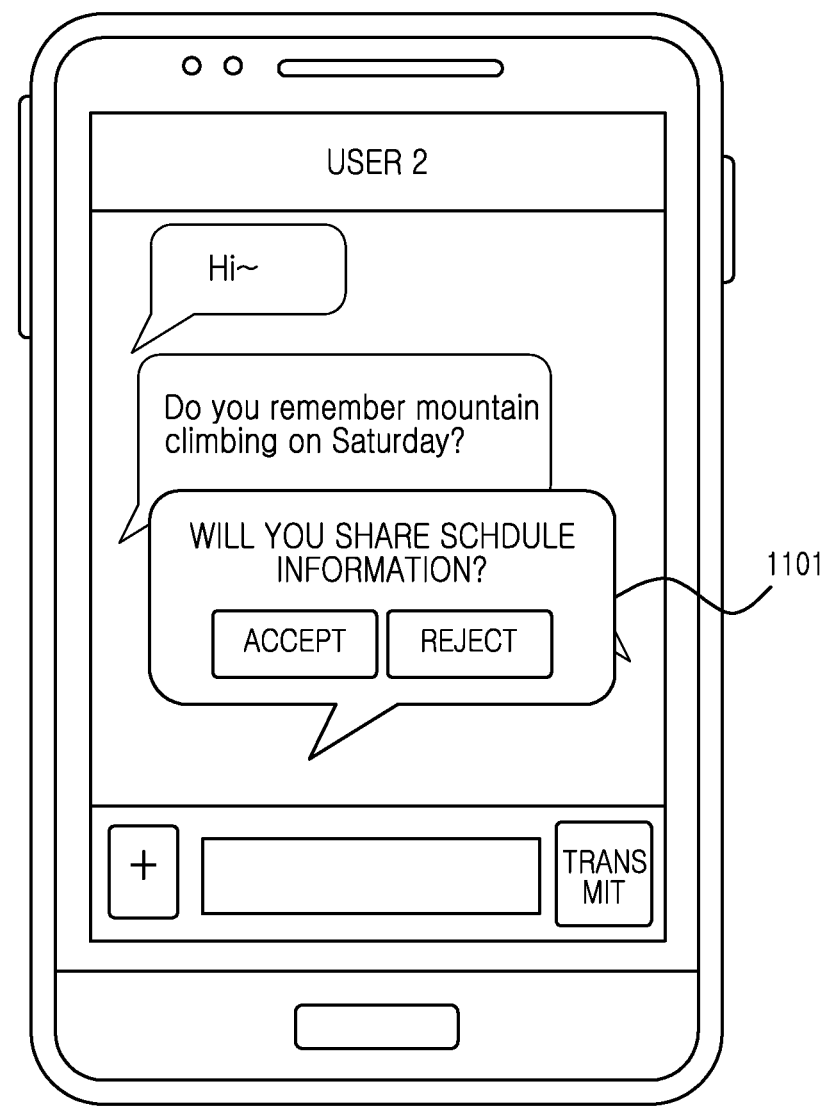
FIGS. 11A and 11B are views illustrating screen configuration for setting schedule information using a messenger service in an electronic device according to an embodiment of the present invention.
Figure 11B:
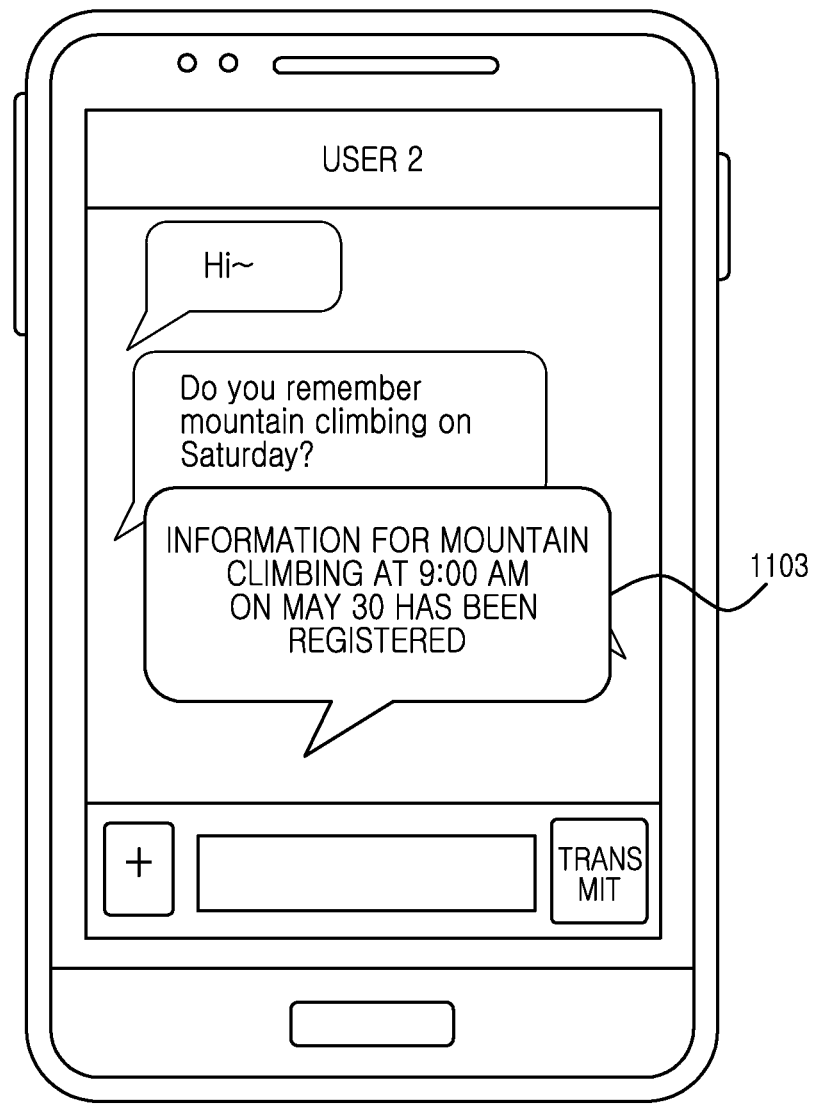

As described above, in the case where the electronic device 100 has transmitted schedule information using the background system during the messenger service, the counterpart electronic device 100 may set a schedule using the background system during the messenger service as illustrated in FIGS. 11A and 11B.

FIGS. 11A and 11B illustrate screen configuration for setting schedule information using a messenger service in an electronic device according to an embodiment of the present invention.

In the case where the electronic device provides the messenger service, the electronic device 100 may determine whether to share schedule information with a counterpart electronic device providing the messenger service as illustrated in FIG. 6 (step 603). For example, when a request signal for determining whether to share schedule information is received from a counterpart electronic device, the electronic device 100 may display a popup window 1101 for determining whether to share schedule information on the display unit 160 as illustrated in FIG. 11A. When the user selects "accept", the electronic device 100 may share the schedule information with the counterpart electronic device providing the messenger service. In contrast, in the case where an input of "reject" is detected from the popup window 1101 of FIG. 11A, the electronic device 100 may not share the schedule information with the counterpart electronic device providing the messenger service. At this point, the electronic device informs the counterpart electronic device providing the messenger service of whether the schedule information is accepted or rejected.

In the case where the electronic device accepts the schedule information, the electronic device 100 may add the schedule by adding or amending an appointment, meeting, reminder or other schedule information depending on schedule information provided from the counterpart electronic device. At this point, the electronic device 100 may display schedule addition information 1103 using a popup window in the messenger service screen as illustrated in FIG. 11B.

FIG. 12 illustrates a procedure for sharing real-time data using a messenger service in an electronic device according to an embodiment of the present invention.

Referring to FIG. 12, the electronic device 100 may provide the messenger service in step 1201. For example, the electronic device 100 may display the messenger service screen illustrated in FIG. 7A or 7C on the display unit 160 to display a message transmitted/received to/from at least one counterpart electronic device. At this point, the electronic device 100 may display such that a message 701 written by a user of the electronic device and a message 703 received from a counterpart electronic device are displayed differently as illustrated in FIGS. 7A and 7C.

In case of providing the messenger service, the electronic device 100 may proceed to step 1203 to determine whether a real-time data share event occurs. For example, in the case where the electronic device includes a touchscreen, the electronic device 100 may determine whether a real-time data share event occurs with consideration of touch information detected via the touchscreen. For another example, the electronic device 100 may determine whether an input of a hardware button for real-time data sharing is detected. For still another example, the electronic device 100 may determine whether movement of the electronic device for real-time data sharing is detected. For further another example, the electronic device 100 may determine whether a user's gesture for real-time data sharing is detected.

In the case where a real-time data share event does not occur, the electronic device 100 may proceed to step 1201 to provide the messenger service.

Figure 13A:
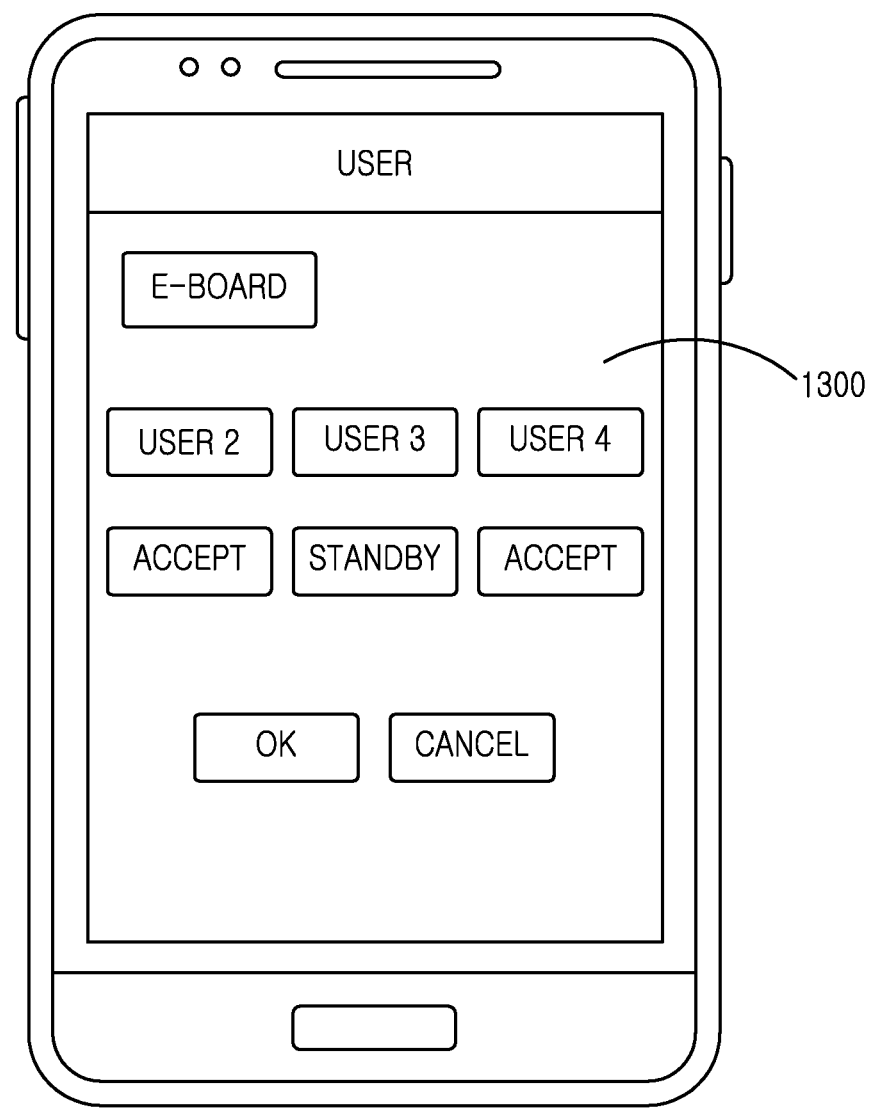
FIGS. 13A and 13B are views illustrating screen configuration for providing an electronic bulletin board service using a messenger service in an electronic device according to an embodiment of the present invention.
Figure 15A:
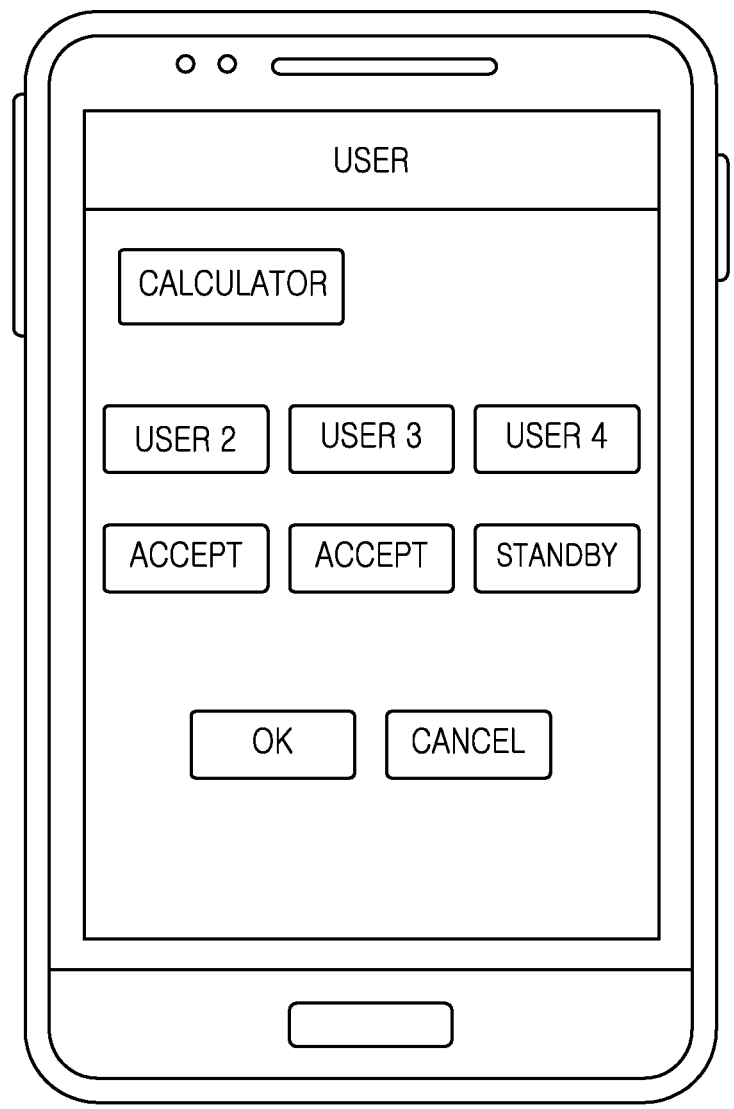
FIGS. 15A and 15B are views illustrating screen configuration for providing an electronic calculator service using a messenger service in an electronic device according to an embodiment of the present invention.

In contrast, in the case where a real-time data share event occurs, the electronic device 100 may proceed to step 1205 to determine a sharing terminal for sharing real-time data. Here, the sharing terminal may represent at least one counterpart electronic device that has accepted sharing of real-time data among one or more counterpart electronic devices providing the messenger service. For example, the electronic device 100 may transmit a request signal for determining whether to accept real-time data sharing to at least one electronic device providing the messenger service. After that, the electronic device 100 may determine a sharing terminal with consideration of a response signal provided from a counterpart electronic device. For another example, the electronic device 100 may determine a sharing terminal with consideration of control information provided from at least one counterpart electronic device providing the messenger service. At this point, the electronic device 100 may display whether each counterpart electronic device providing the messenger service shares real-time data as illustrated in FIGS. 13A and 15A.

Figure 13B:
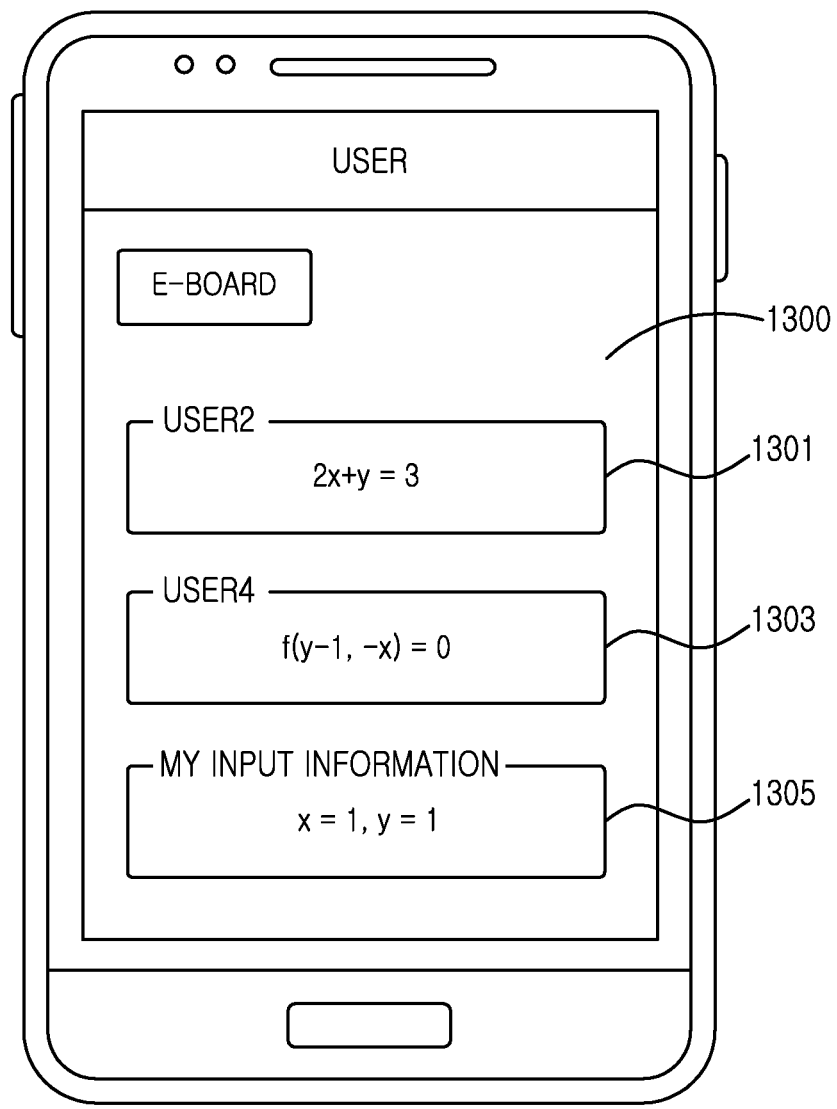

After that, the electronic device 100 may proceed to step 1207 to determine whether data for real-time data sharing is input. For example, in case of sharing real-time data using an electronic bulletin board, the electronic device 100 may display an electronic bulletin board service screen 1300 on the display unit 160 as illustrated in FIG. 13B. At this point, the electronic bulletin board service screen 1300 may include input information display regions 1301 and 1303 corresponding to each sharing terminal and a user's input information display region 1305. More particularly, the electronic bulletin board service screen can contain one input information display region for each sharing terminal. As shown in FIG. 13B, input information display region 1301 shows the information provided by USER2, and input information display region 1303 shows the information provided by USER4, while input information display region 1305 shows the information provided by the user of the electronic device 100.

Figure 15B:
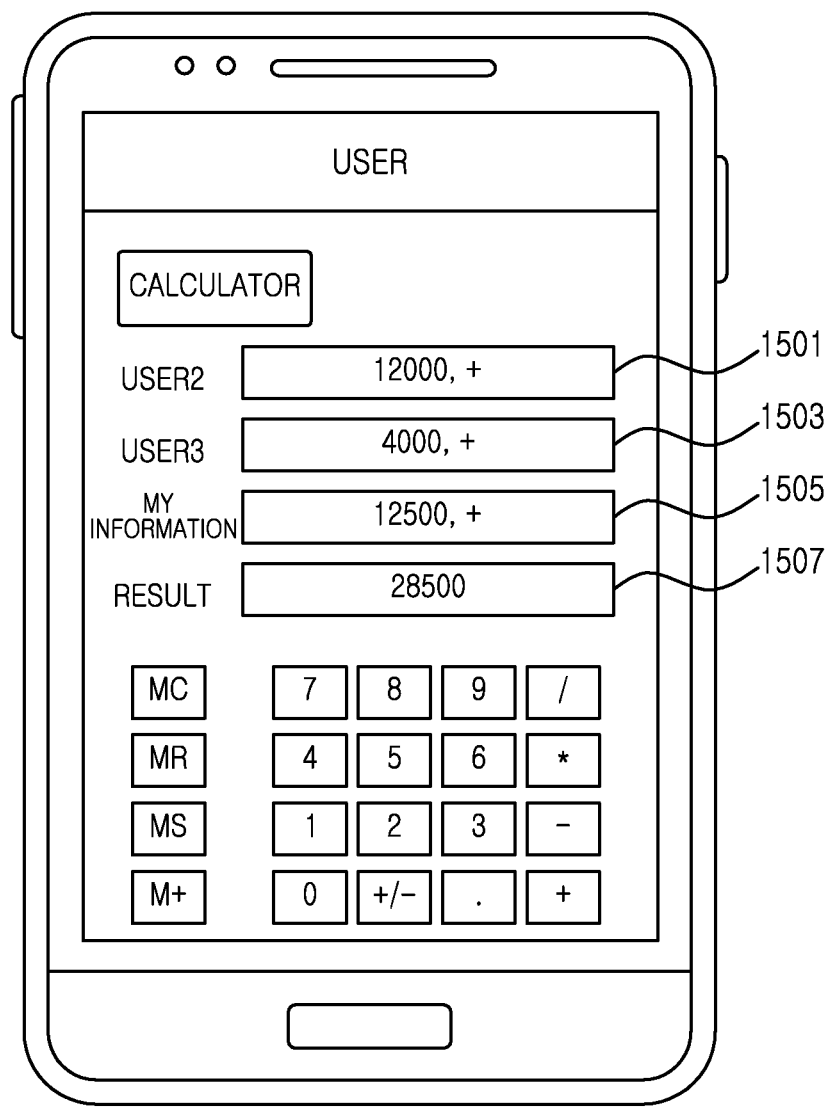

After that, the electronic device 100 may determine whether an input of data is detected via the user's input information display region 1305. For another example, in case of sharing real-time data using a calculator, the electronic device 100 may display a calculator screen on the display unit 160 as illustrated in FIG. 15B. At this point, the calculator screen may include input information display regions 1501 and 1503 of each sharing terminal, a user's input information display region 1505, and a sum region 1507. After that, the electronic device 100 may determine whether an input of data is detected via the user's input information display region 1505.

In the case where data for real-time data sharing is not input, the electronic device 100 may proceed to step 1211 to determine whether reception data exists.

In contrast, in the case where data for real-time data sharing is input, the electronic device 100 may proceed to step 1209 to display the input data on a real-time data sharing screen 1300 and transmit the same to a sharing terminal. At this point, the electronic device 100 may transmit the input data to the sharing terminal even when a separate transmission command is not detected. For example, in the case where a user inputs "x=1, y=1" using the input unit 170, the electronic device 100 may display "x=1, y=1" on the user's input information display region 1305 illustrated in FIG. 13B, and transmit information of "x=1, y=1" to the sharing terminal. In another example, if the user inputs "12500, +" using the input unit 170, the electronic device 100 may display "12500, +" on the user's input information display region 1505 illustrated in FIG. 15B, and transmit information of "12500, +" to the sharing terminal.

After that, the electronic device 100 may proceed to step 1211 to determine whether reception data exists.

In the case where reception data does not exist, the electronic device 100 may proceed to step 1215 to determine whether a real-time information sharing service ends.

In contrast, in the case where reception data exists, the electronic device 100 may proceed to step 1213 to display the reception data on the real-time data sharing screen. For example, in the case where data of "2x+y=3" is received from a user 2 sharing the electronic bulletin board service and data of "f(x−1, −x)=0" is received from a user 4, the electronic device 100 may display "2x+y=3" in an input information display region 1301 of the user 2 and display "f(x−1, −x)=0" in an input information display region 1303 of the user 4 illustrated in FIG. 13B. In another example, in the case where data of "12000, +" is received from the user 2 sharing a calculator service and data of "4000, +" is received from a user 3, the electronic device 100 may display "12000, +" in an input information display region 1501 of the user 2 and display "4000, +" in an input information display region 1503 of the user 3 illustrated in FIG. 15B. Additionally, the electronic device 100 may display sum 1507 of data provided from the user and the counterpart electronic device.

After that, the electronic device 100 may proceed to step 1215 to determine whether the real-time information sharing service ends.

In the case where the real-time information sharing service does not end, the electronic device 100 may proceed to step 1207 to determine whether data for real-time data sharing is input.

In contrast, in the case where the real-time information sharing service ends, the electronic device 100 may end the present algorithm.

Figure 14A:
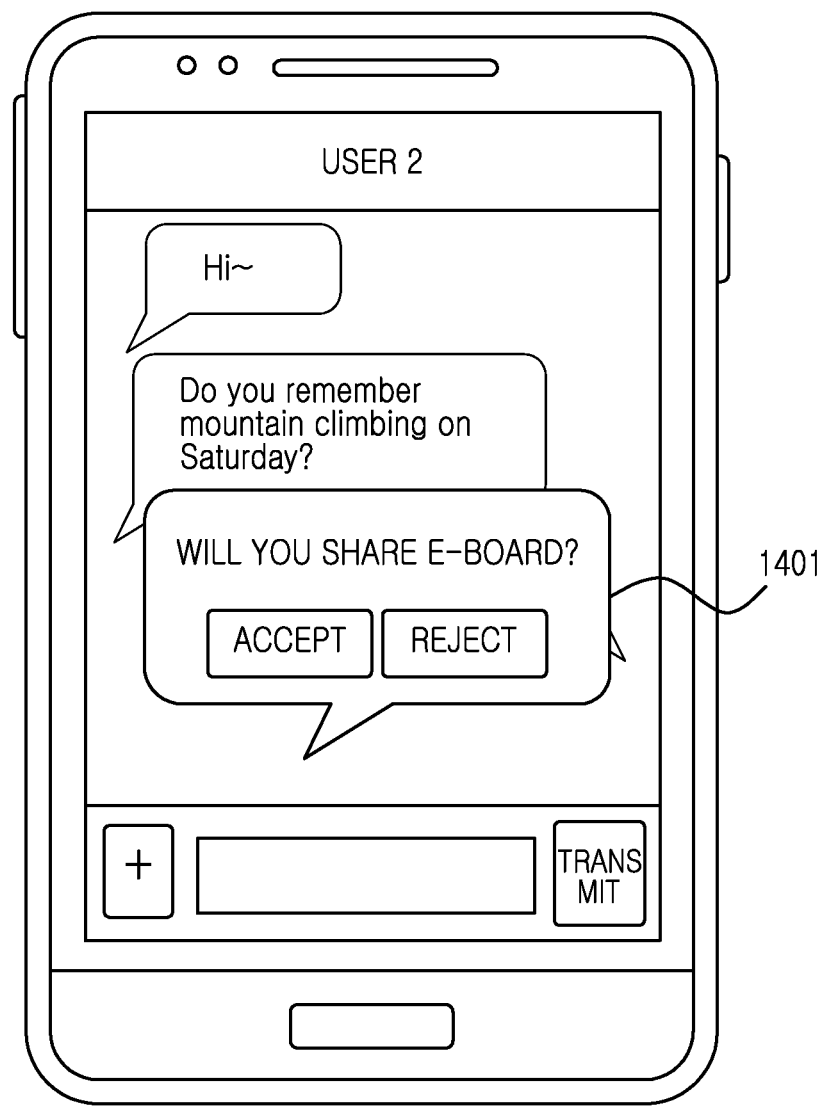
FIGS. 14A and 14B are views illustrating screen configuration for providing an electronic bulletin board service using a messenger service in an electronic device according to another embodiment of the present invention.
Figure 14B:
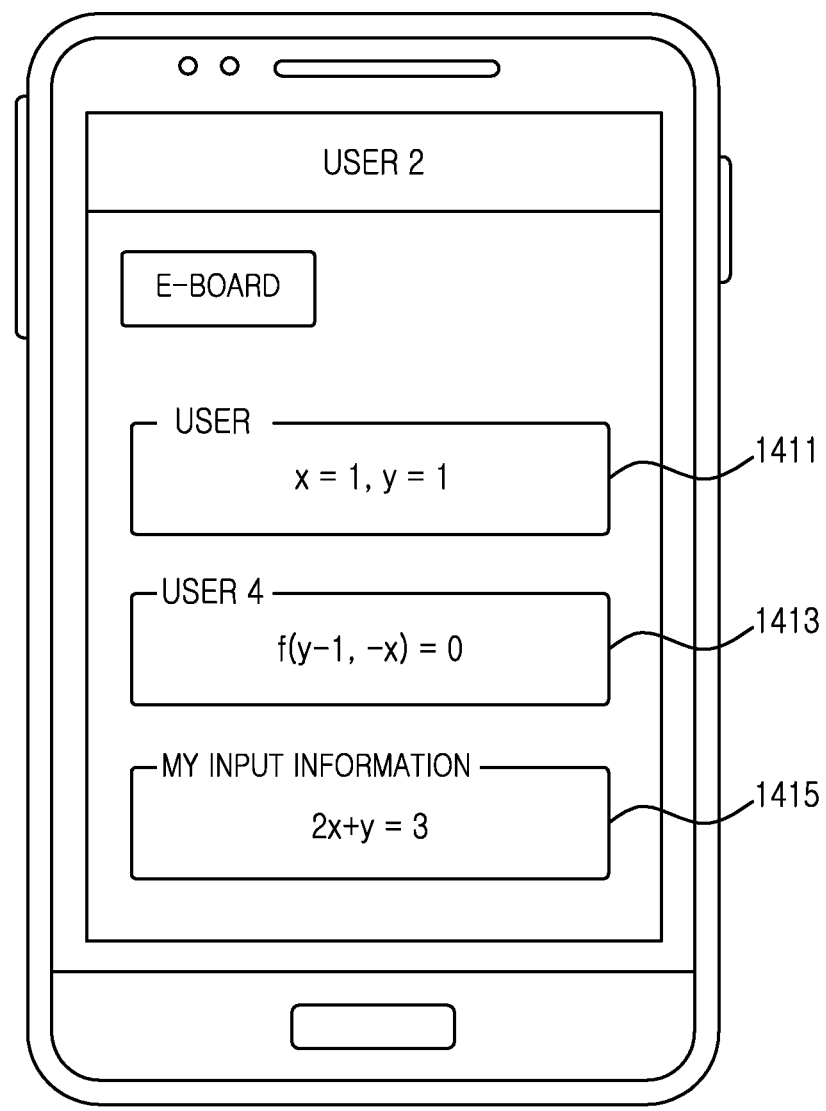

As described above, in the case where the electronic device provides the real-time data sharing service via the electronic bulletin board service during the messenger service as illustrated in FIGS. 13A and 13B, a counterpart electronic device 100 may provide the electronic bulletin board service as illustrated in FIGS. 14A and 14B.

FIGS. 14A and 14B illustrate screen configuration for providing an electronic bulletin board service using a messenger service in an electronic device according to another embodiment of the present invention.

In the case where the electronic device provides the messenger service, the electronic device 100 may determine whether to share real-time data with a counterpart electronic device providing the messenger service as illustrated in FIG. 12 (step 1203). For example, in the case where a request signal for determining whether to accept the electronic bulletin board service is received from a counterpart electronic device of the messenger service, the electronic device 100 may display a popup window 1401 for determining whether to accept the electronic bulletin board service on the display unit 160 as illustrated in FIG. 14A. In the case where an input of "accept" is detected in the popup window 1401 of FIG. 14A, the electronic device 100 may recognize it shares data in real-time via the electronic bulletin board service with the counterpart electronic device providing the messenger service. In contrast, in the case where an input of "reject" is detected in the popup window 1401 of FIG. 14A, the electronic device 100 may recognize it does not use the electronic bulletin board service. At this point, the electronic device 100 may inform the counterpart electronic device providing the messenger service of whether to accept the electronic bulletin board service.

In the case where the electronic device accepts the electronic bulletin board service, the electronic device 100 may display data 1411 and 1413 provided from counterpart electronic devices and data 1415 input by a user on an electronic bulletin board service screen as illustrated in FIG. 14B.

Figure 16A:
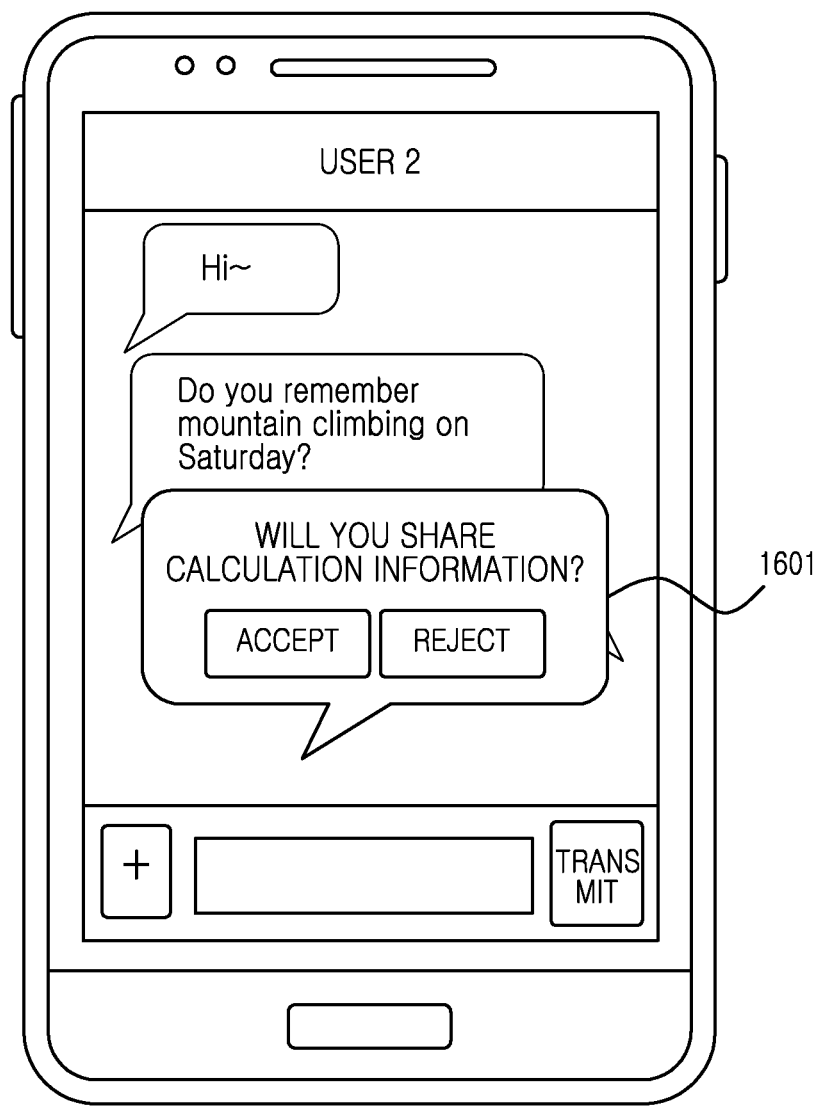
FIGS. 16A and 16B are views illustrating screen configuration for providing an electronic calculator service using a messenger service in an electronic device according to another embodiment of the present invention.
Figure 16B:
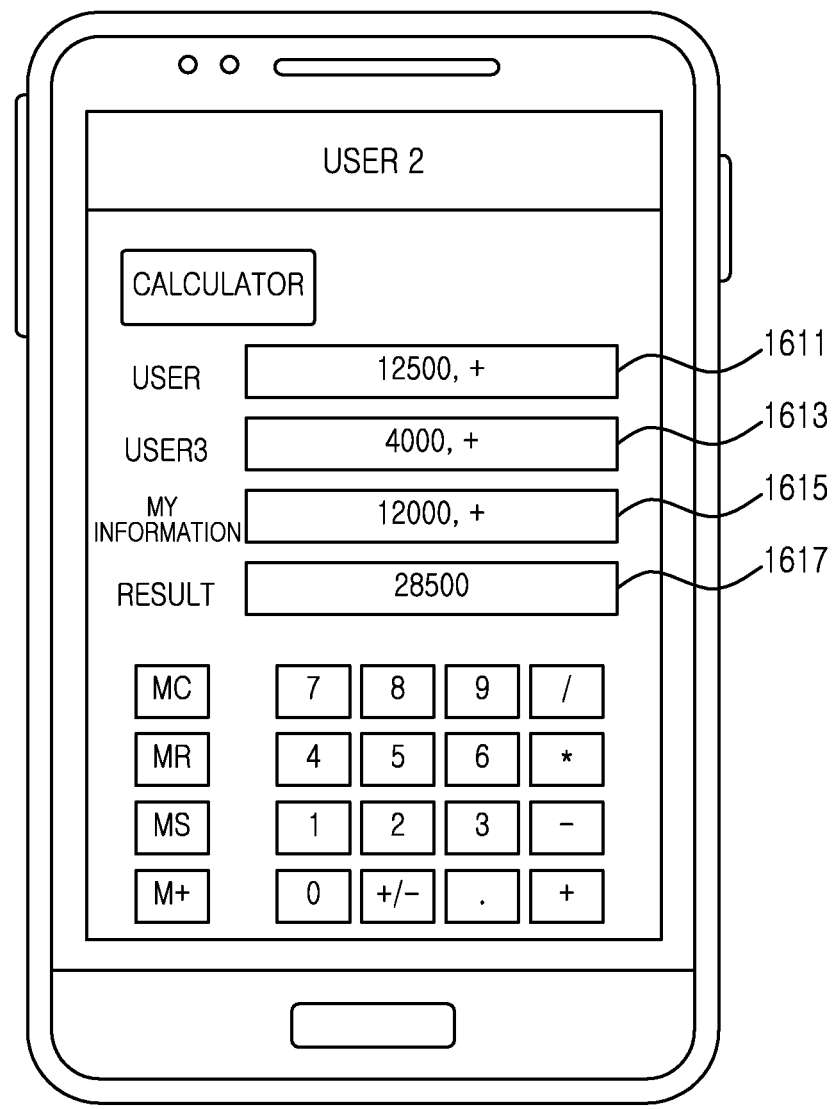

In the case where the electronic device provides a real-time data share service via a calculator service through the messenger service as illustrated in FIGS. 15A and 15B, a counterpart electronic device 100 may provide the calculator service as illustrated in FIGS. 16A and 16B. In this embodiment, although multiple users are utilizing the same calculator service, only one of the electronic device and the counterpart electronic devices actually performs the calculator service and the remaining devices merely display a calculator service screen, mirroring the screen of the device that actually performing the calculator service.

FIGS. 16A and 16B illustrate screen configuration for providing an electronic calculator service using a messenger service in an electronic device according to another embodiment of the present invention.

In the case where the electronic device provides a messenger service, the electronic device 100 may determine whether to share real-time data with a counterpart electronic device providing the messenger service as illustrated in FIG. 12 (step 1203). For example, in the case where a request signal for determining whether to accept the calculator service is received from the counterpart electronic device of the messenger service, the electronic device 100 may display a popup window 1601 for determining whether to accept the calculator service on the display unit 160 as illustrated in FIG. 16A. In the case where an input of "accept" is detected in the popup window 1601 of FIG. 16A, the electronic device 100 may recognize it shares data in real-time via the calculator service with the counterpart electronic device providing the messenger service. In contrast, in the case where an input of "reject" is detected in the popup window 1601 of FIG. 16A, the electronic device 100 may recognize it does not use the calculator service. At this point, the electronic device 100 may inform the counterpart electronic device providing the messenger service of whether to accept the calculator service.

In the case where the electronic device accepts the calculator service, the electronic device 100 may display data 1611 and 1613 provided from the counterpart electronic device and data 1615 input by a user on the calculator service screen as illustrated in FIG. 16B. Additionally, the electronic device 100 may display sum 1617 of data provided from the user and the counterpart electronic device.

FIG. 17 illustrates a procedure for transmitting application execution information using a messenger service in an electronic device according to an embodiment of the present invention.

Referring to FIG. 17, the electronic device 100 may provide the messenger service in step 1701. For example, the electronic device 100 may display the messenger service screen illustrated in FIG. 7A or 7C on the display unit 160 to display a message transmitted/received to/from at least one counterpart electronic device. At this point, the electronic device 100 may display the messenger service screen such that a message 701 written by a user of the electronic device and a message 703 received from a counterpart electronic device are discriminated as illustrated in FIGS. 7A and 7C.

In case of providing the messenger service, the electronic device 100 may proceed to step 1703 to determine whether an application execution information share event occurs. For example, in the case where the electronic device includes a touchscreen, the electronic device 100 may determine whether an application execution information share event occurs with consideration of touch information detected via the touchscreen. In another example, the electronic device 100 may determine whether an input of a hardware button for application execution information sharing is detected. In still another example, the electronic device 100 may determine whether movement of the electronic device for application execution information sharing is detected. In further another example, the electronic device 100 may determine whether a user's gesture for application execution information sharing is detected.

In the case where an application execution information share event does not occur, the electronic device 100 may proceed to step 1701 to provide the messenger service.

In contrast, in the case where an application execution information share event occurs, the electronic device 100 may proceed to step 1705 to determine execution information of an application selected by the user. For example, the electronic device 100 may display an application execution information setting screen using a portion of the messenger service screen. After that, the electronic device 100 may determine application execution information input via the application execution information setting screen.

After determining the application execution information, the electronic device 100 may proceed to step 1707 to transmit the application execution information to at least one counterpart electronic device via the messenger service. At this point, the electronic device 100 may transmit the application execution information in the same form as a message for the messenger service. Here, the application execution information may include application identify information and execution service information. The execution service information may include a path of a service to execute and input information of each setting item.

After that, the electronic device 100 may end the present algorithm.

As described above, in the case where the electronic device transmits the application execution information via a background system during the messenger service, a counterpart electronic device 100 may execute a relevant application during the messenger service as illustrated in FIG. 18.

FIG. 18 is a flowchart illustrating a procedure for executing an application using a messenger service in an electronic device according to an embodiment of the present invention.

Referring to FIG. 18, the electronic device 100 may provide the messenger service in step 1801. For example, the electronic device 100 may display the messenger service screen on the display unit 160 to display a message transmitted/received to/from at least one counterpart electronic device.

After that, the electronic device 100 may proceed to step 1803 to determine whether application execution information is received from a counterpart electronic device via the messenger service.

In the case where the application execution information is not received during the messenger service, the electronic device 100 may proceed to step 1801 to provide the messenger service.

In contrast, in the case where the application execution information is received via the messenger service, the electronic device 100 may proceed to step 1805 to execute the relevant application during the messenger service. For example, the electronic device 100 may display the application execution information received via the messenger service on the display unit 160. At this point, the electronic device 100 may display the application execution information in the same form as a message provided from the counterpart electronic device for the messenger service on the display unit 160, or display the application execution information on the display unit 160 using a separate popup window. In the case where the application execution information displayed on the display unit 160 is selected by a user, the electronic device 100 may execute the relevant application. At this point, the electronic device 100 may control the application to provide a service included in the application execution information.

As described above, the electronic device 100 may share the application execution information using the messenger service. For example, in the case where the electronic device shares execution information of a music application, the electronic device 100 may transmit the execution information of the music application via the messenger service as illustrated in FIGS. 19A and 19B.

Figure 19A:
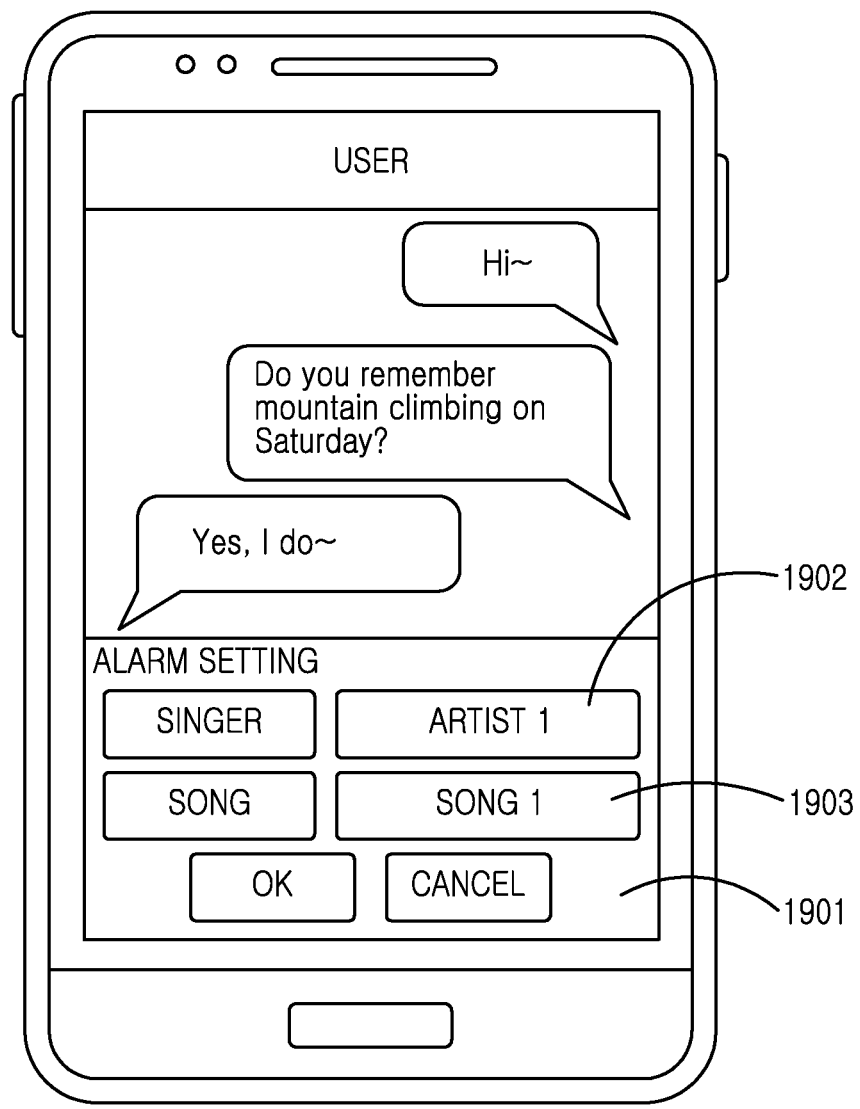
FIGS. 19A and 19B are views illustrating screen configuration for transmitting music information using a messenger service in an electronic device according to an embodiment of the present invention.
Figure 19B:
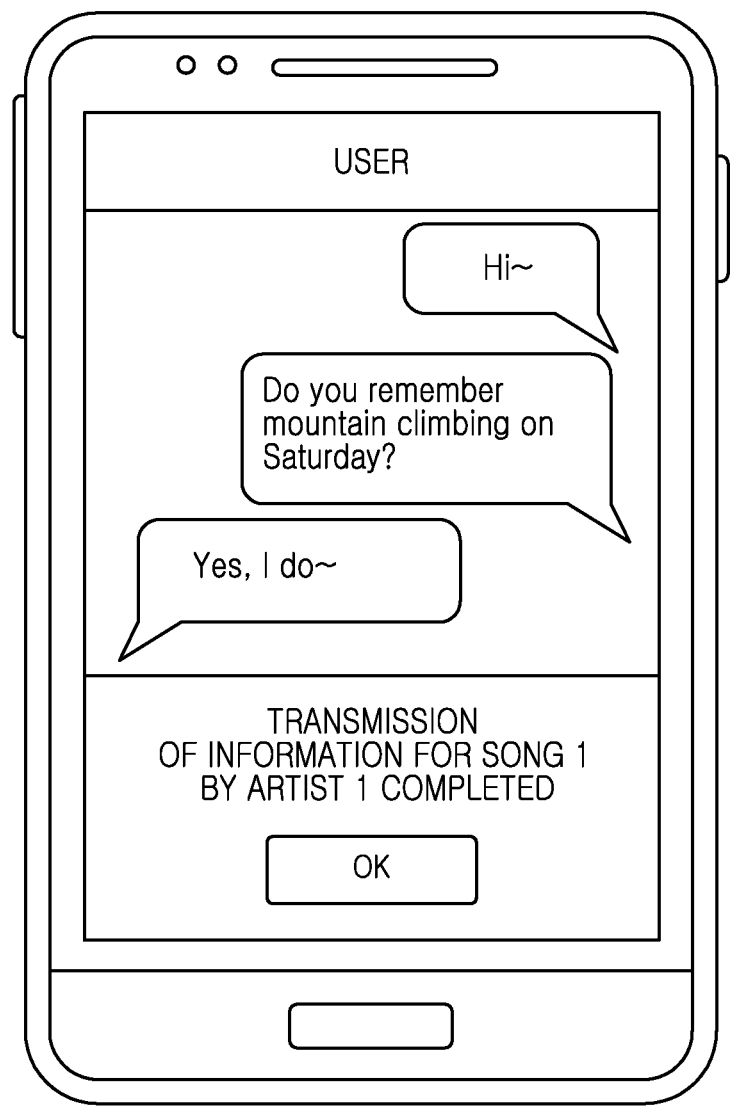

FIGS. 19A and 19B illustrate screen configuration for transmitting music information using a messenger service in an electronic device according to an embodiment of the present invention.

In the case where selection of "music" is selected from the additional service list 720 illustrated in FIG. 7B, the electronic device 100 may share execution information of the music application. Accordingly, the electronic device 100 may display a music setting screen 1901 on the display unit 160 as illustrated in FIG. 19A. At this point, the music setting screen may include a singer item 1902 and a song item 1903.

In the case where an input of each item for application execution setting is detected via the input unit 170, the electronic device 100 may display input information on each setting item of the music setting screen 1901. For example, the electronic device 100 may display "Artist #1" which is a singer name for the singer item 1902, and display "Song #1" which is a song title for the song item 1903 as illustrated in FIG. 19A.

As described above, after displaying input information of each item for executing setting of the music application execution, in the case where an input of an "OK" button is detected in the music setting screen 1901, the electronic device 100 may recognize execution setting of the music application has been completed. Accordingly, the electronic device 100 may transmit execution information for reproducing "Song #1 by Artist #1" in the music application to at least one counterpart electronic device via the messenger service. At this point, the electronic device 100 may transmit the execution information of the music application in the same form as a message for the messenger service.

Additionally, after transmitting execution information for the music application, the electronic device 100 may display a transmission completion message for "Song #1 by Artist #1" which is execution information of the music application on the display unit 160 as illustrated in FIG. 19B.

Figure 20A:
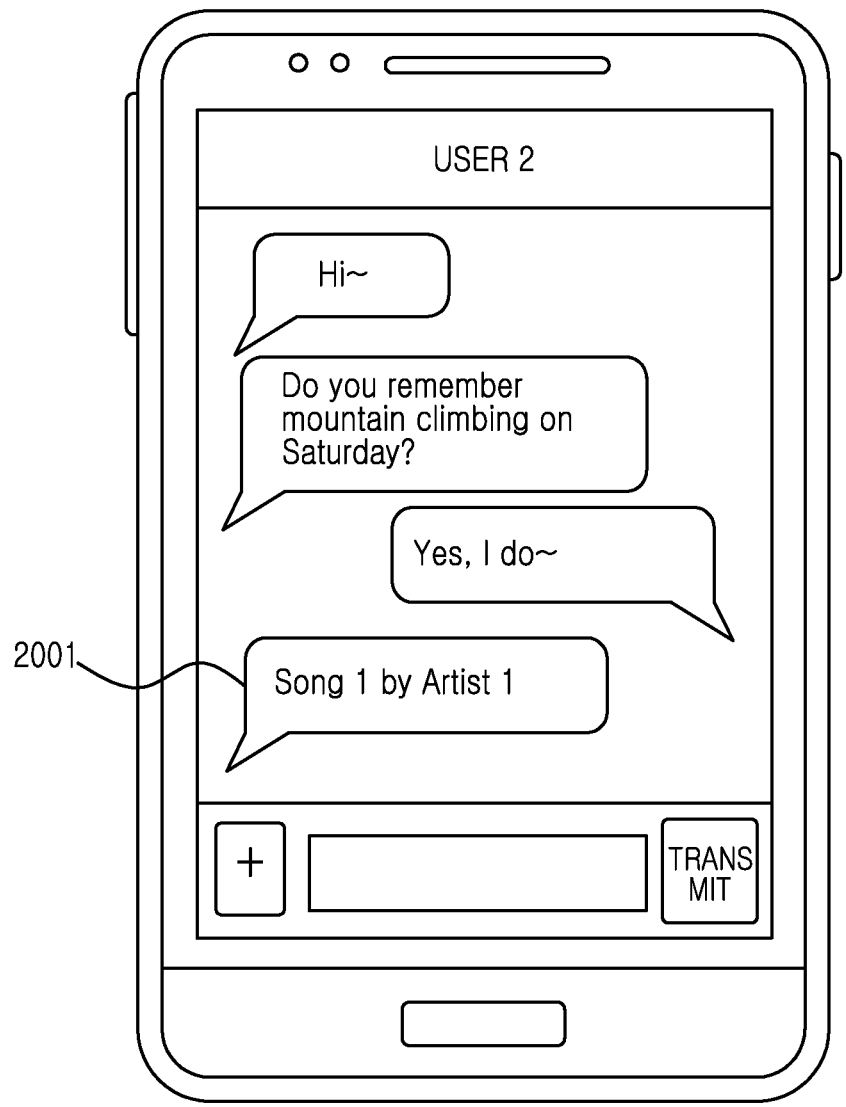
FIGS. 20A and 20B are views illustrating screen configuration for executing a music application using a messenger service in an electronic device according to an embodiment of the present invention.
Figure 20B:
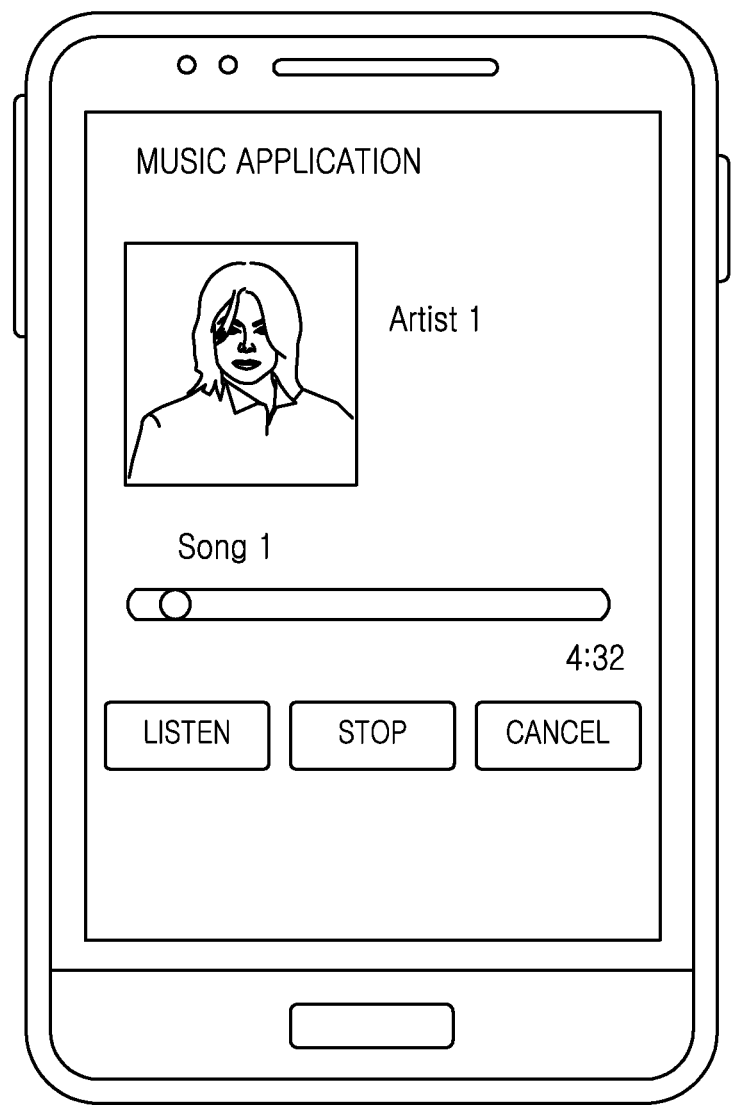

As described above, in the case where the electronic device transmits execution information of the music reproduce application, a counterpart electronic device 100 may execute the music application as illustrated in FIGS. 20A and 20B.

FIGS. 20A and 20B illustrate screen configuration for executing a music application using a messenger service in an electronic device according to an embodiment of the present invention.

In case of providing the messenger service, the electronic device 100 may display the messenger service screen on the display unit 160 to display a message transmitted/received to/from at least one counterpart electronic device as illustrated in FIG. 20A. At this point, the electronic device 100 may display the messenger service screen such that a message written by a user of the electronic device and a message received from a counterpart electronic device are displayed differently as illustrated in FIG. 20A.

In case of receiving application execution information from a counterpart electronic device via the messenger service, the electronic device 100 may display "Song #1 by Artist #1" which is the application execution information on the display unit 160. For example, the electronic device 100 may display "Song #1 by Artist #1" on the display unit 160 in the same form as a message provided from the counterpart electronic device for the messenger service as illustrated in FIG. 20A (2001). In another example, the electronic device 100 may display "Song #1 by Artist #1" on the display unit 160 using a popup window.

In the case where "Song #1 by Artist #1" displayed on the display unit 160 is selected by the user, the electronic device 100 may play the song "Song #1 by Artist #1" by executing a music application as illustrated in FIG. 20B. In another example, in the case where "Song #1 by Artist #1" displayed on the display unit 160 is selected by the user, the electronic device 100 may execute an Internet application for accessing a music server. After that, the electronic device 100 may access the music server according to a service path included in application execution information to reproduce "Song #1 by Artist #1". In this embodiment, the electronic device 100 can determine if the particular song to be played is currently stored in the memory 110. If the song is not currently stored in the memory 110, the device 100 can access the music server to play the song, by streaming and/or downloading the song. Alternatively, the song itself can be part of the application execution information sent from the counterpart device.

Figure 21A:
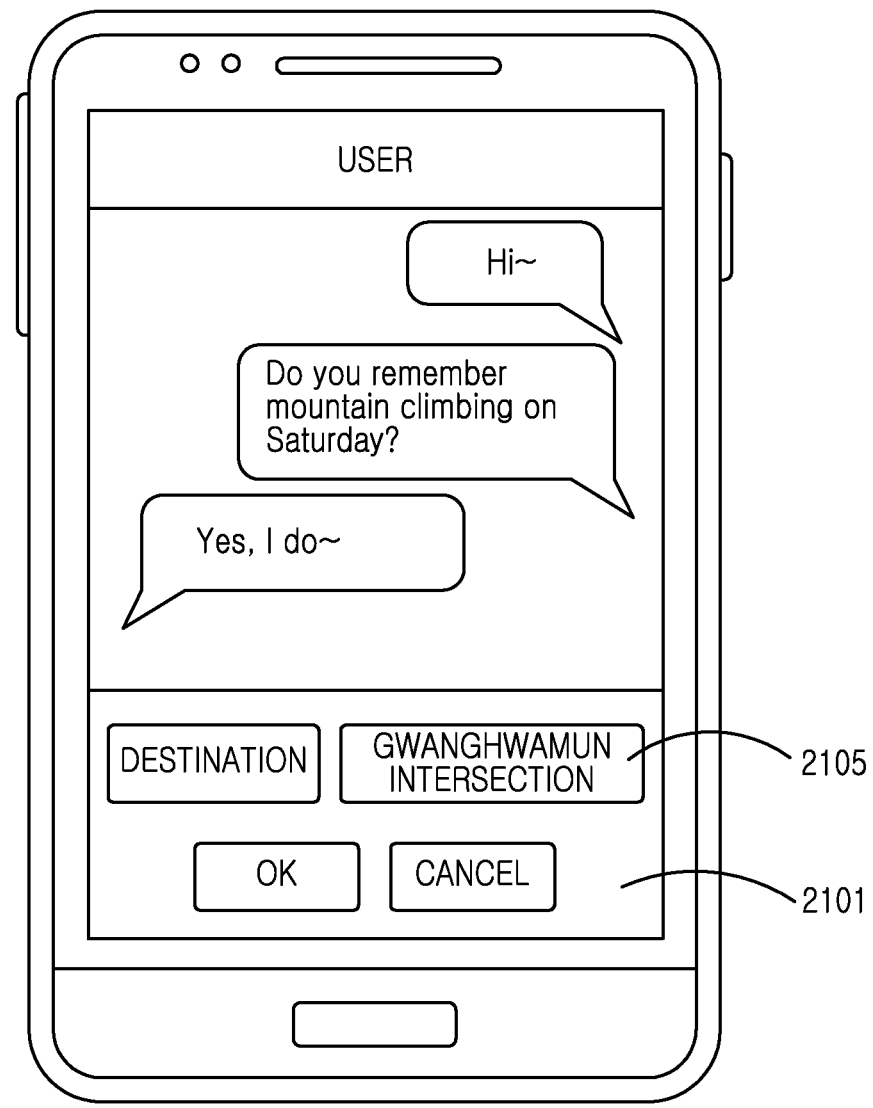
FIGS. 21A and 21B are views illustrating screen configuration for transmitting position information using a messenger service in an electronic device according to an embodiment of the present invention.
Figure 21B:
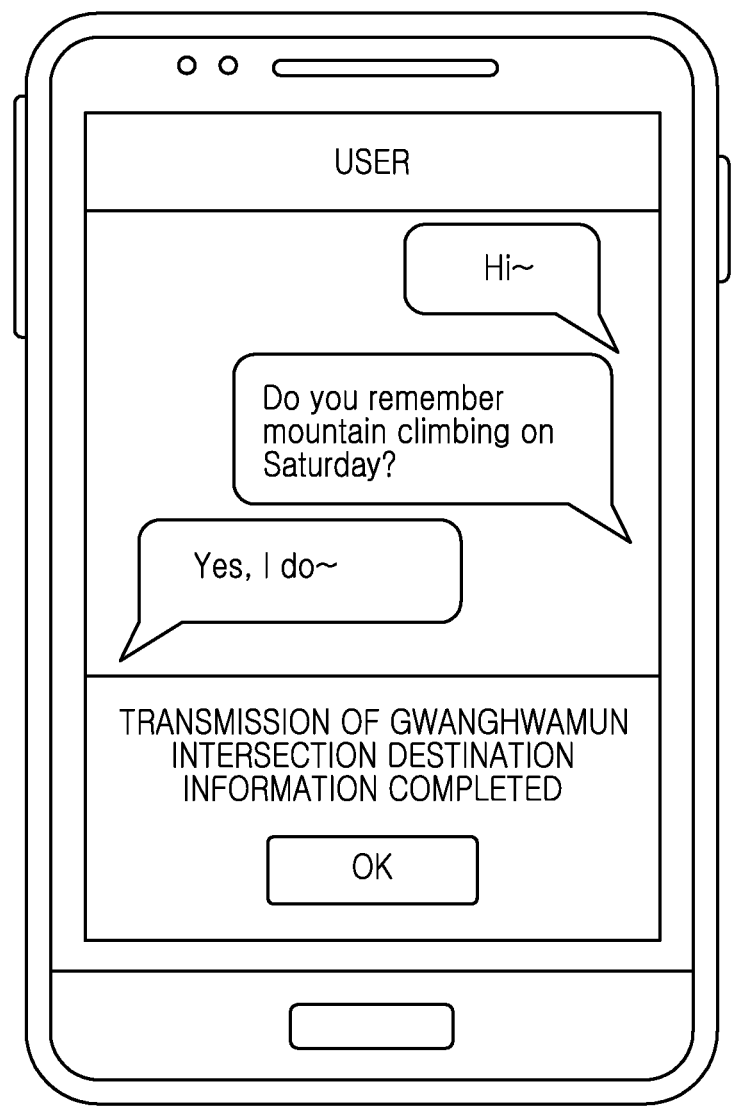

The electronic device 100 may transmit execution information of a map application via the messenger service as illustrated in FIGS. 21A and 21B.

FIGS. 21A and 21B illustrate screen configuration for transmitting position information using a messenger service in an electronic device according to an embodiment of the present invention.

In the case where selection of "map" is detected in the additional service list 720 illustrated in FIG. 7B, the electronic device 100 may recognize that it shares execution information of a map application. Accordingly, the electronic device 100 may display a map setting screen 2101 on the display unit 160 as illustrated in FIG. 21A. At this point, the map setting screen 2101 may include a destination item 2105.

In the case where an input of each item for application execution setting is detected via the input unit 170, the electronic device 100 may display input information for each setting item of the map setting screen 2101. For example, the electronic device 100 may display "Gwanghwamun intersection" which is destination information for a destination item depending on a user's input information as illustrated in FIG. 21A.

As described above, after displaying input information of each item for execution setting of the map application, in the case where an input of an "OK" button is detected in the map setting screen 2101, the electronic device 100 may recognize execution setting of the map application has been completed. Accordingly, the electronic device 100 may transmit execution information for displaying "Gwanghwamun intersection" in the map application to at least one counterpart electronic device via the messenger service. At this point, the electronic device 100 may transmit execution information of the map application in the same form as a message for the messenger service.

Additionally, after transmitting the execution information of the map application, the electronic device 100 may display a transmission completion message for "Gwanghwamun intersection" which is execution information of the map application on the display unit 160 as illustrated in FIG. 21B.

Figure 22A:
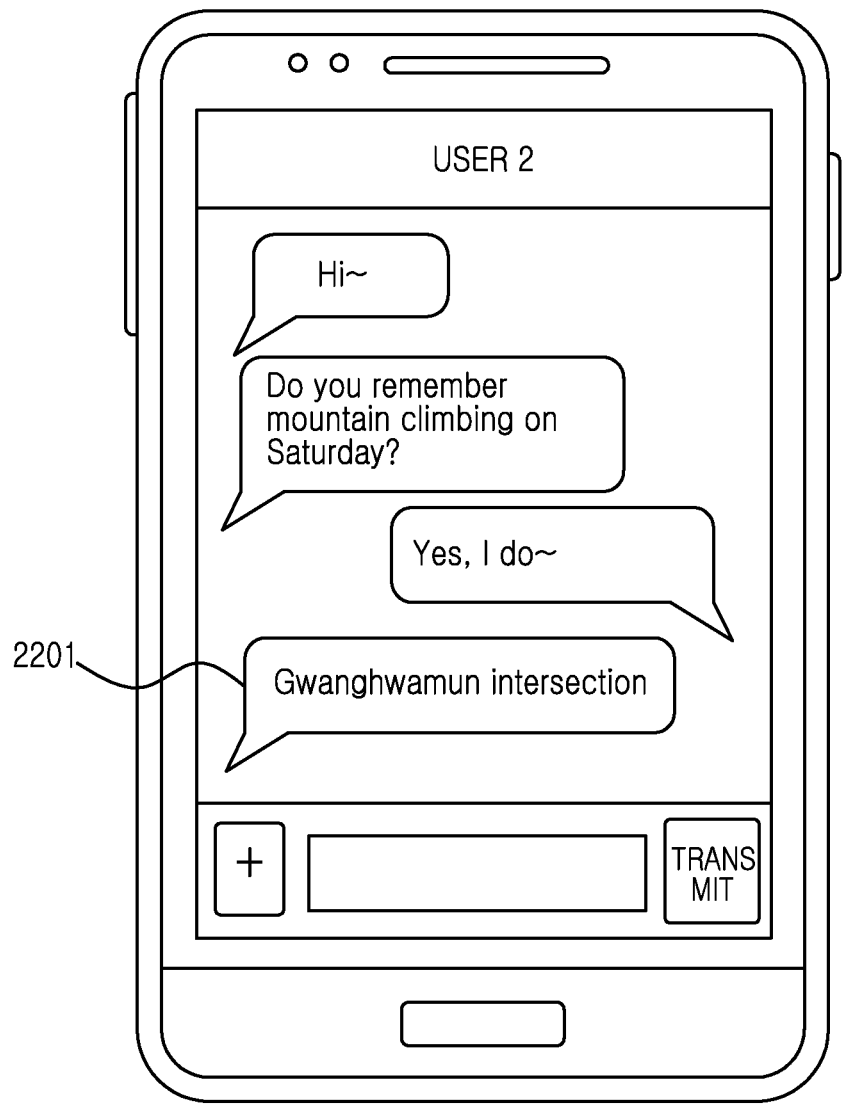
FIGS. 22A and 22B are views illustrating screen configuration for executing an application using a messenger service in an electronic device according to an embodiment of the present invention.
Figure 22B:
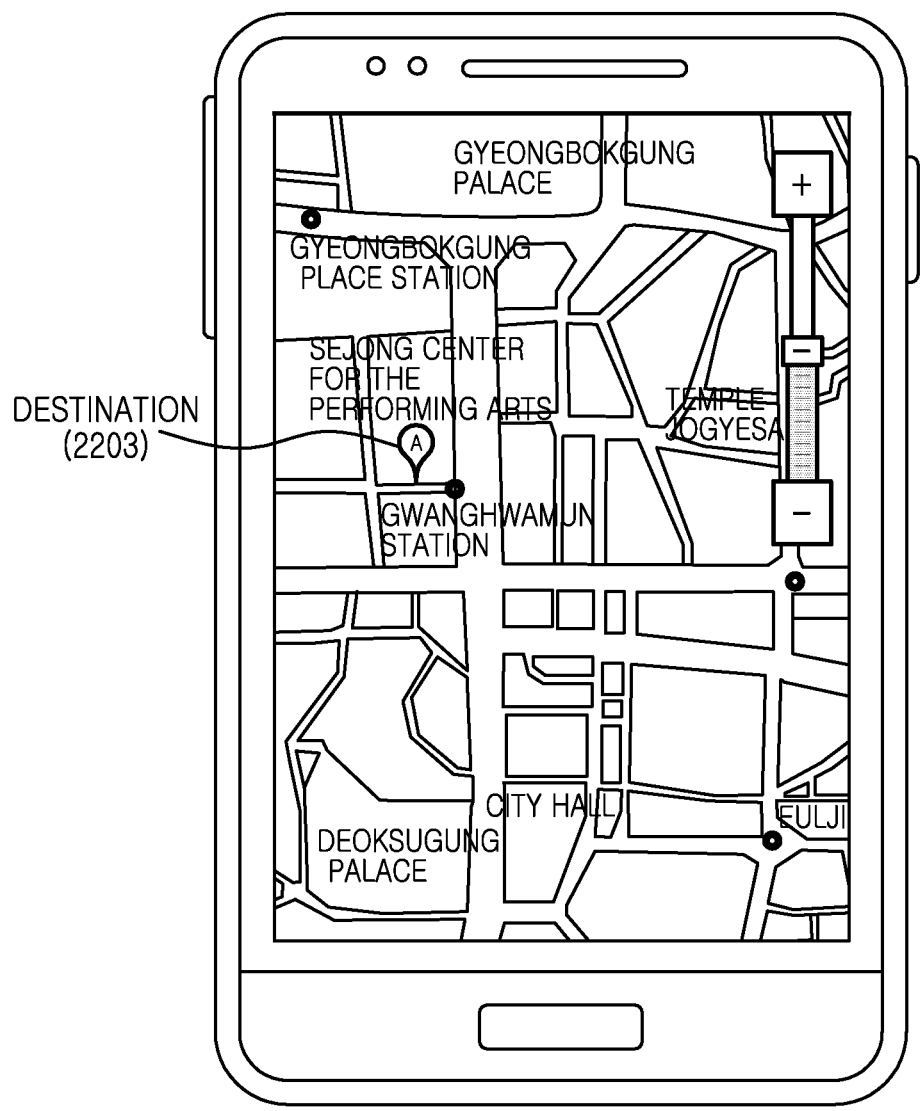

As described above, in the case where the electronic device transmits the execution information of the map application, a counterpart electronic device 100 may execute the map application as illustrated in FIGS. 22A and 22B.

FIGS. 22A and 22B illustrate screen configuration for executing an application using a messenger service in an electronic device according to an embodiment of the present invention.

In case of providing the messenger service, the electronic device 100 may display the messenger service screen on the display unit 160 to display a message transmitted/received to/from at least one counterpart electronic device as illustrated in FIG. 22A. At this point, the electronic device 100 may display the messenger service screen such that a message written by a user of the electronic device and a message received from a counterpart electronic device are displayed as illustrated in FIG. 22A.

In case of receiving application execution information from a counterpart electronic device via the messenger service, the electronic device 100 may display "Gwanghwamun intersection" which is the application execution information on the display unit 160. For example, the electronic device 100 may display "Gwanghwamun intersection" on the display unit 160 in the same form as a message provided from a counterpart electronic device for the messenger service as illustrated in FIG. 22A (2201). For another example, the electronic device 100 may display "Gwanghwamun intersection" on the display unit 160 using a popup window. More particularly, the electronic device displays, either in the messenger service directly or in a popup window, the text corresponding to the destination item 2105.

In the case where "Gwanghwamun intersection" displayed on the display unit 160 is selected by a user, the electronic device 100 may execute the map application to display a map of a region including "Gwanghwamun intersection" as illustrated in FIG. 22B (2203). Additionally, the electronic device 100 may set "Gwanghwamun intersection" as a destination to provide a navigation service.

Figure 23A:
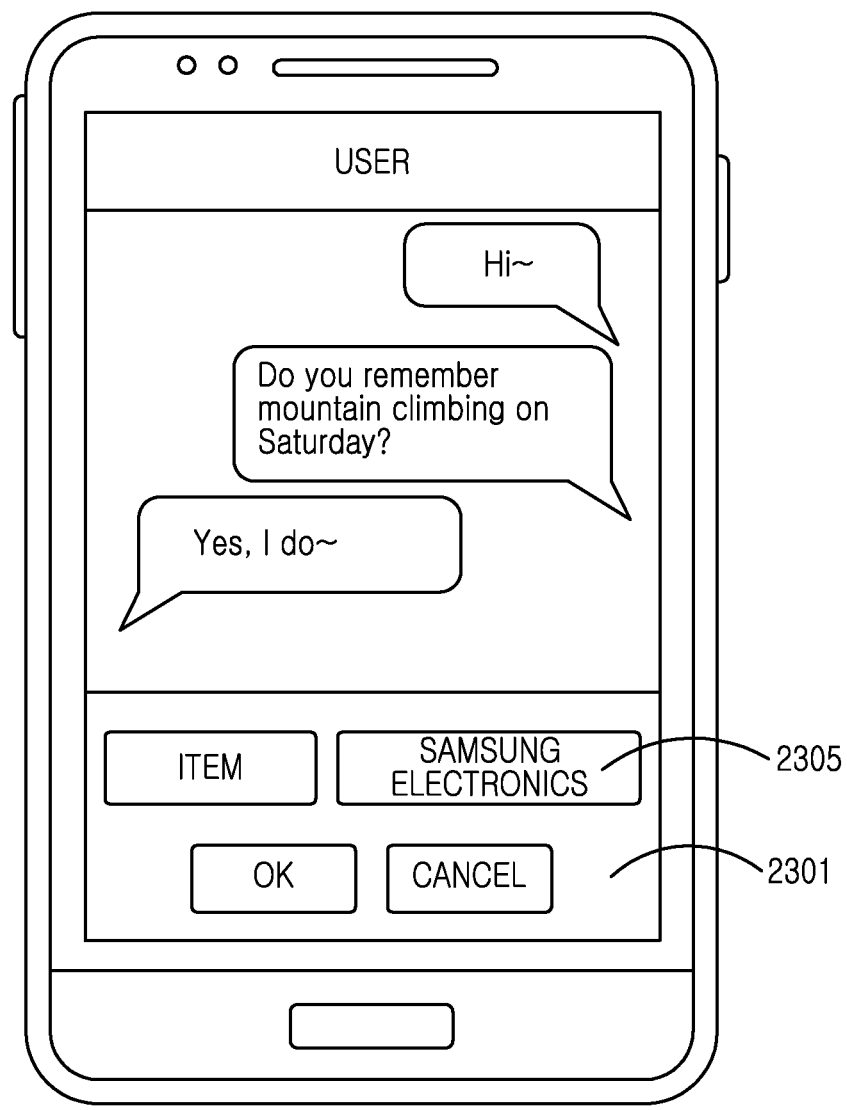
FIGS. 23A and 23B are views illustrating screen configuration for transmitting stock information using a messenger service in an electronic device according to an embodiment of the present invention.
Figure 23B:
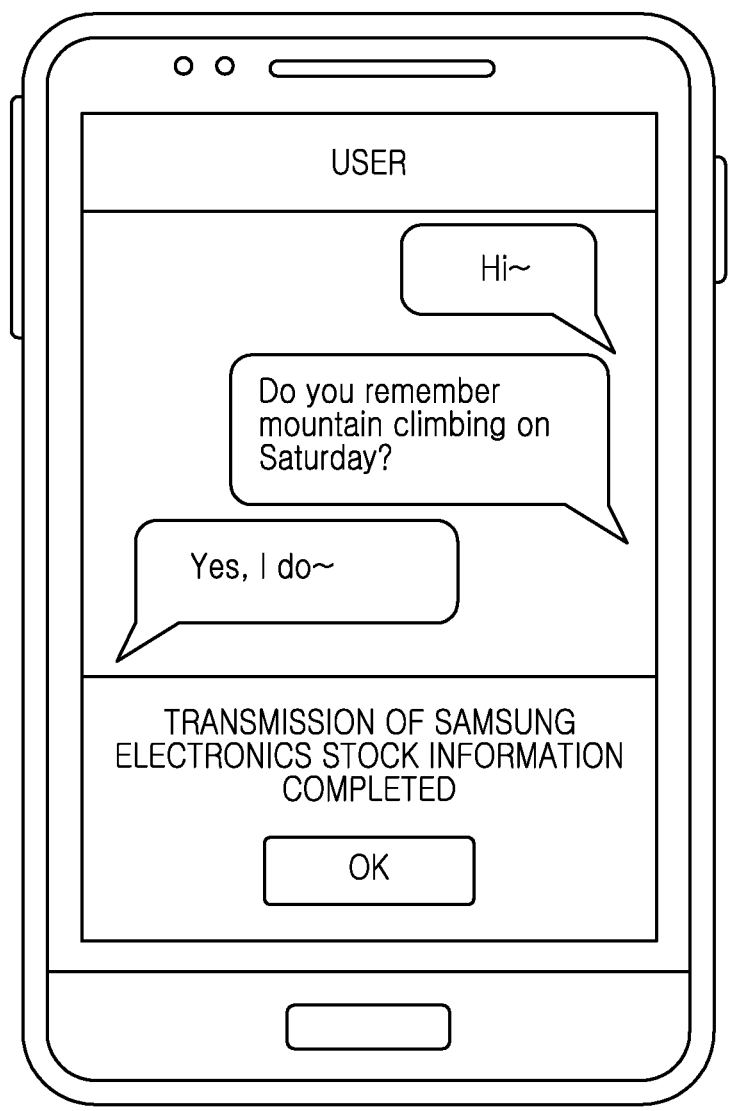

The electronic device 100 may transmit execution information of a stock application via the messenger service as illustrated in FIGS. 23A and 23B.

FIGS. 23A and 23B illustrate screen configuration for transmitting stock information using a messenger service in an electronic device according to an embodiment of the present invention.

In the case where selection of "stock" is detected from the additional service list illustrated in FIG. 7B, the electronic device 100 may share execution information of a stock application. Accordingly, the electronic device 100 may display a stock setting screen 2301 on the display unit 160 as illustrated in FIG. 23A. At this point, the stock setting screen 2301 may include a stock item 2305.

In the case where an input of each item for application execution setting is detected via the input unit 170, the electronic device 100 may display input information for each setting item of the stock setting screen 2301. For example, the electronic device 100 may display "Samsung electronics" for the stock item 2305 depending on a user's input information as illustrated in FIG. 23A.

As described above, after displaying input information of each item for stock application execution setting, in the case where an input of an "OK" button is detected in the stock setting screen 2301, the electronic device 100 may recognize execution setting of the stock application has been completed. Accordingly, the electronic device 100 may transmit execution information for representing "Samsung electronics stock information" in the stock application to at least one counterpart electronic device via the messenger service. At this point, the electronic device 100 may transmit execution information of the stock application in the same form as a message for the messenger service.

Additionally, after transmitting the execution information of the stock application, the electronic device 100 may display a transmission completion message for "Samsung electronics stock information" which is the execution information of the stock application on the display unit 160 as illustrated in FIG. 23B.

Figure 24A:
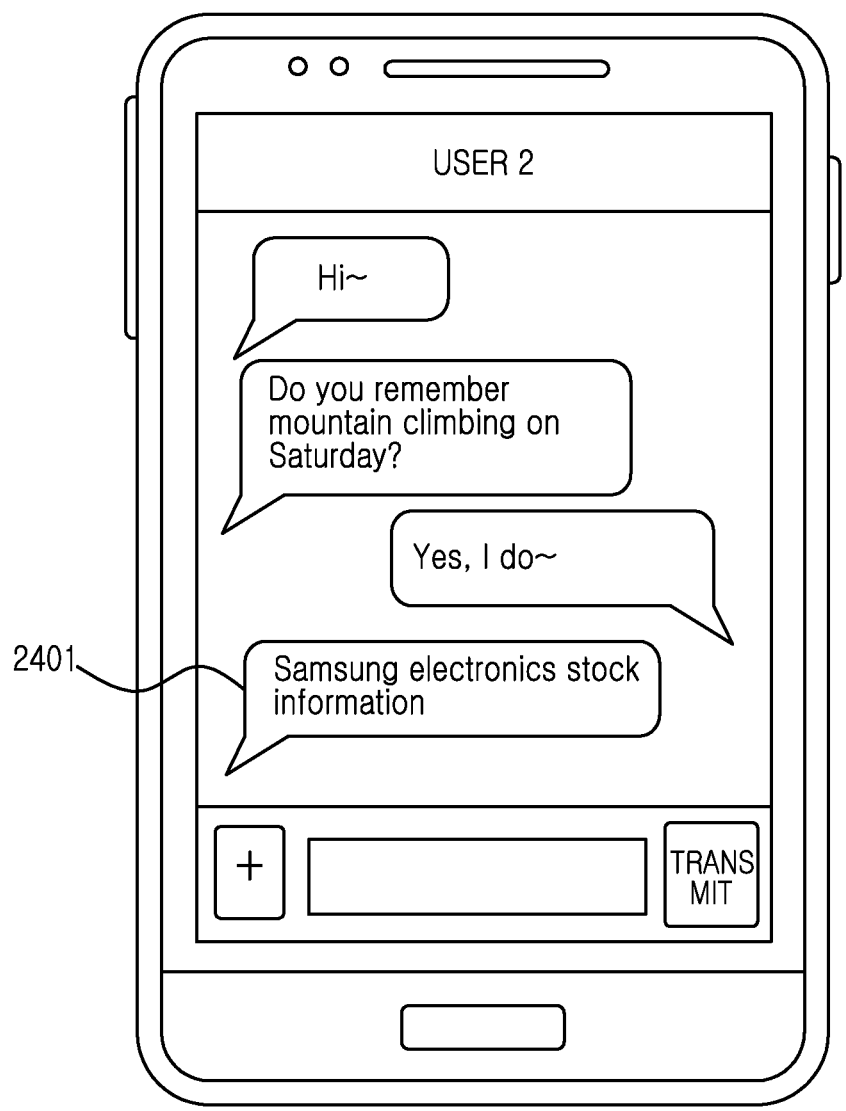
FIGS. 24A and 24B are views illustrating screen configuration for executing a stock application using a messenger service in an electronic device according to an embodiment of the present invention.
Figure 24B:
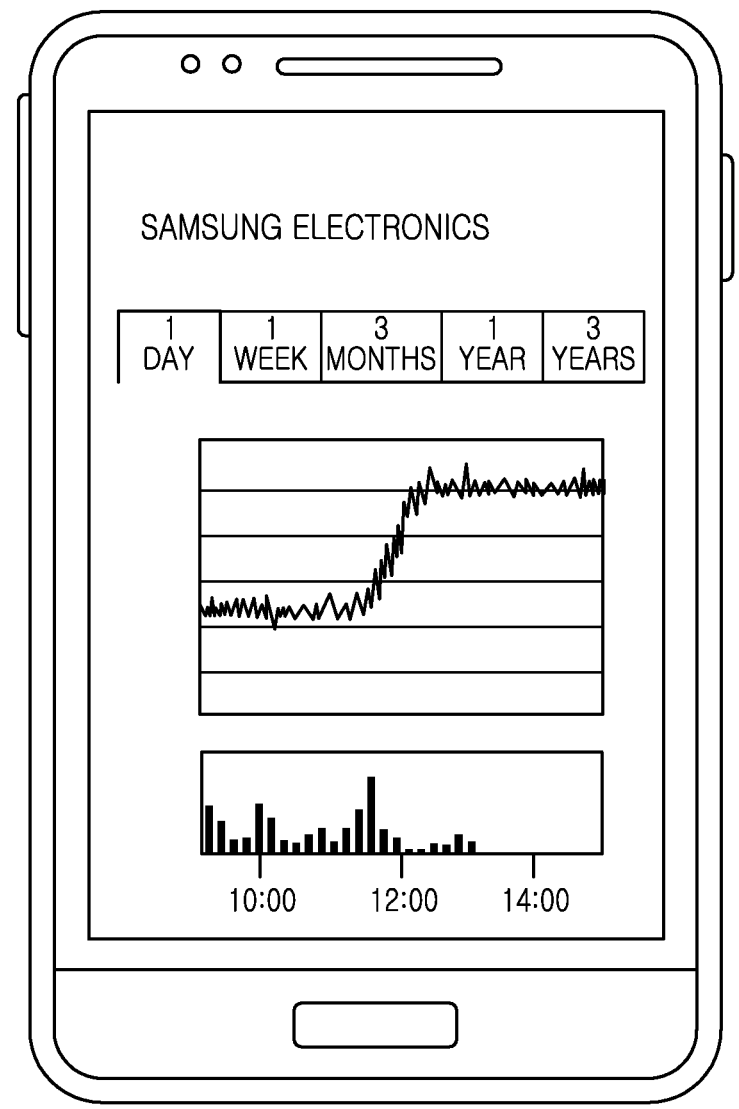

As described above, in the case where the electronic device has transmitted the execution information of the stock application, a counterpart electronic device 100 may execute the stock application as illustrated in FIGS. 24A and 24B.

FIGS. 24A and 24B illustrate screen configuration for executing a stock application using a messenger service in an electronic device according to an embodiment of the present invention.

In case of providing the messenger service, the electronic device 100 may display the messenger service screen on the display unit 160 to display a message transmitted/received to/from at least one counterpart electronic device as illustrated in FIG. 24A. At this point, the electronic device 100 may display the messenger service screen such that a message written by a user of the electronic device and a message received from a counterpart electronic device are discriminated as illustrated in FIG. 22A. This is very similar to the operations described above for the other functionality of the invention.

In case of receiving application execution information from a counterpart electronic device via the messenger service, the electronic device 100 may display "Samsung electronics stock information" which is the execution information of the application on the display unit 160. For example, the electronic device 100 may display "Samsung electronics stock information" on the display unit 160 in the same form as a message provided from the counterpart electronic device for the messenger service as illustrated in FIG. 24A. In another example, the electronic device 100 may display "Samsung electronics stock information" on the display unit 160 using a popup window.

In the case where "Samsung electronics stock information" displayed on the display unit 160 is selected by a user, the electronic device 100 may execute the stock application to display "Samsung electronics stock information" as illustrated in FIG. 24B. In another example, in the case where "Samsung electronics stock information" displayed on the display unit 160 is selected by a user, the electronic device 100 may execute an Internet application for a stock server access. After that, the electronic device 100 may access a stock server according to a service path included in application execution information to display "Samsung electronics stock information". According to a further embodiment, rather than have the electronic device 100 retrieve the information, the counterpart device, i.e., the device sending the application execution information, can embed the information in the application execution information.

Figure 25A:
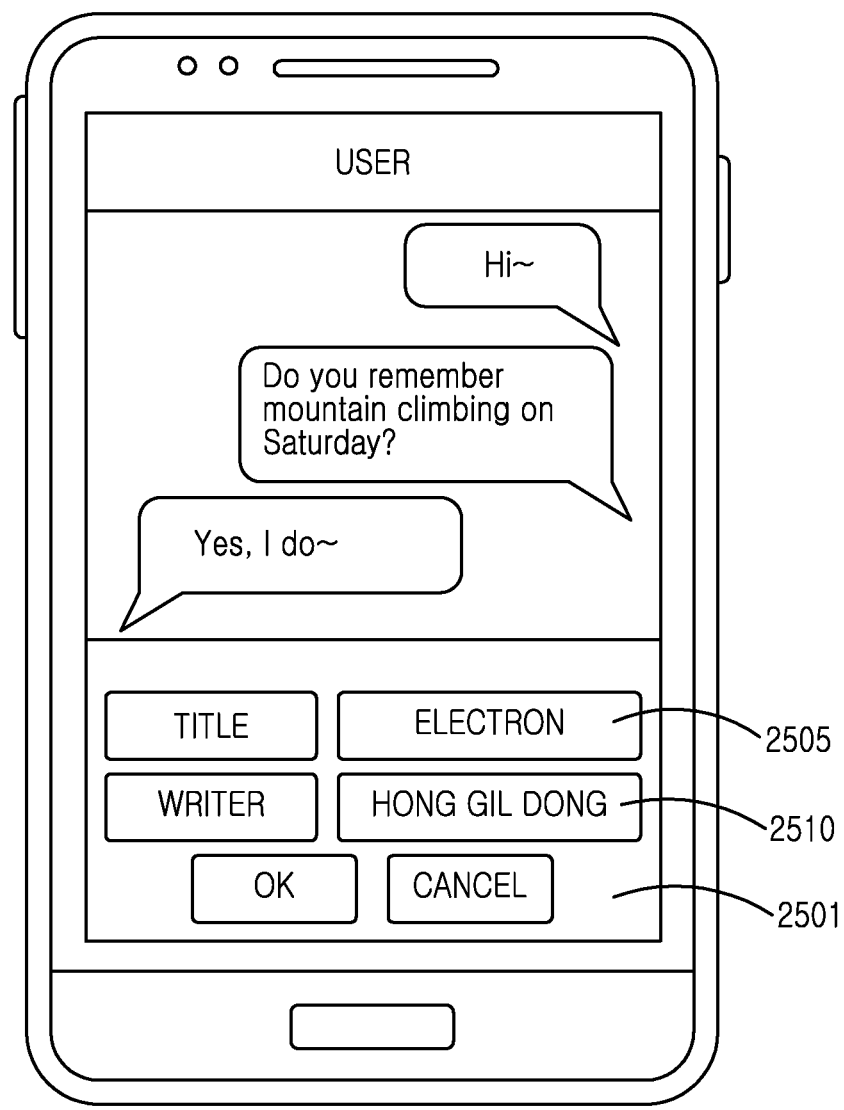
FIGS. 25A and 25B are views illustrating screen configuration for transmitting book information using a messenger service in an electronic device according to an embodiment of the present invention.
Figure 25B:
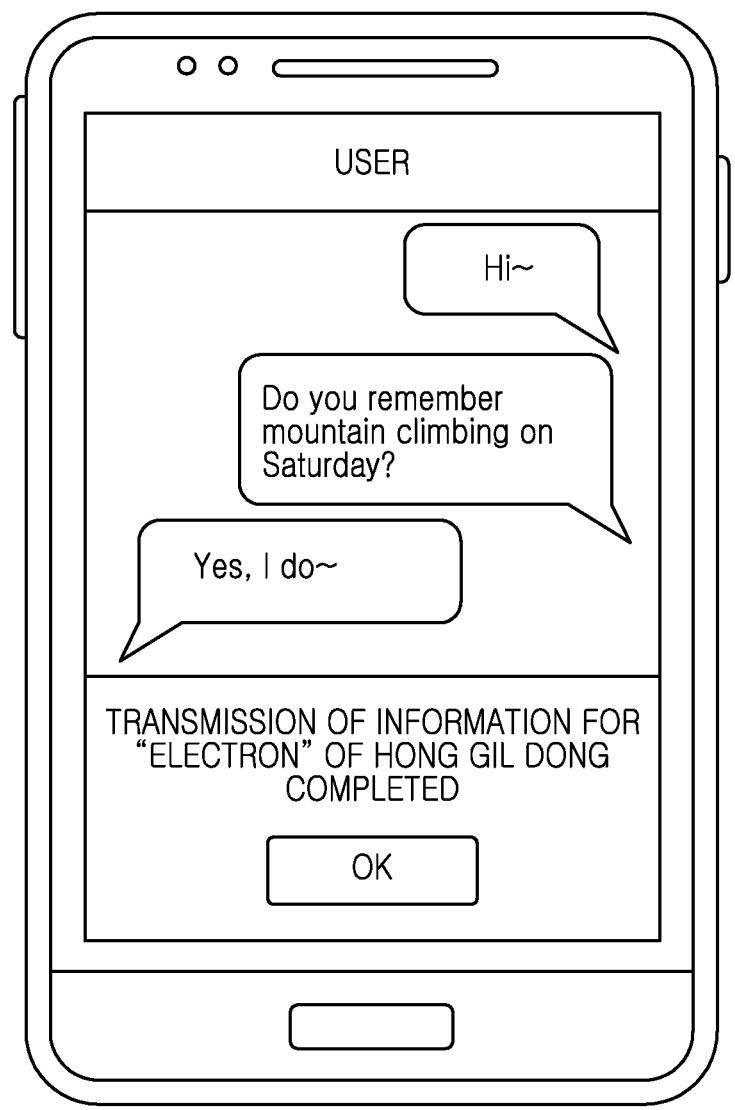

The electronic device 100 may transmit execution information of a book store application via the messenger service as illustrated in FIGS. 25A and 25B.

FIGS. 25A and 25B illustrate screen configuration for transmitting book information using a messenger service in an electronic device according to an embodiment of the present invention.

In the case where selection of "book" is detected in the additional service list 720 illustrated in FIG. 7B, the electronic device 100 may share execution information of the book store application. Accordingly, the electronic device 100 may display a book setting screen 2501 on the display unit 160 as illustrated in FIG. 25A. At this point, the book setting screen 2501 may include a title item 2505 and a writer or author item 2510.

In the case where an input of each item for application execution setting is detected via the input unit 170, the electronic device 100 may display input information for each setting item of the book setting screen 2501. For example, the electronic device 100 may display "electron" which is a book title for a title item and display "Hong Gil Dong" which is writer information for a writer item according to a user's input information as illustrated in FIG. 25A.

Similar to what is described above, after displaying input information of each item for execution setting of the book store application, in the case where an input of an "OK" button is detected in the book setting screen, the electronic device 100 may recognize execution setting of the book store application has been completed. Accordingly, the electronic device 100 may transmit execution information for displaying information of a book "electron by Hong Gil Dong" in the book store application to at least one counterpart electronic device via the messenger service. At this point, the electronic device 100 may transmit execution information of the book store application in the same form as a message for the messenger service.

Additionally, after transmitting the execution information of the book store application, the electronic device 100 may display a transmission completion message for "electron by Hong Gil Dong" which is the execution information of the book store application on the display unit 160.

Figure 26A:
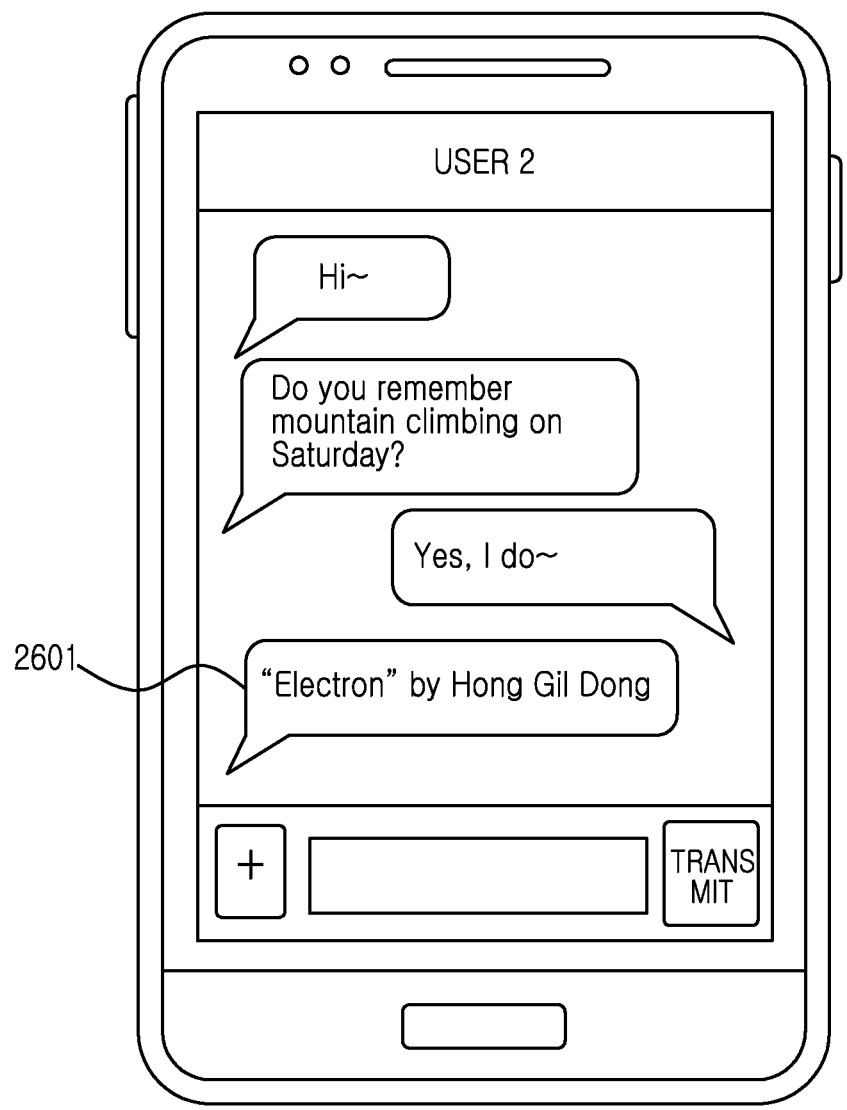
FIGS. 26A and 26B are views illustrating screen configuration for executing a book application using a messenger service in an electronic device according to an embodiment of the present invention.
Figure 26B:
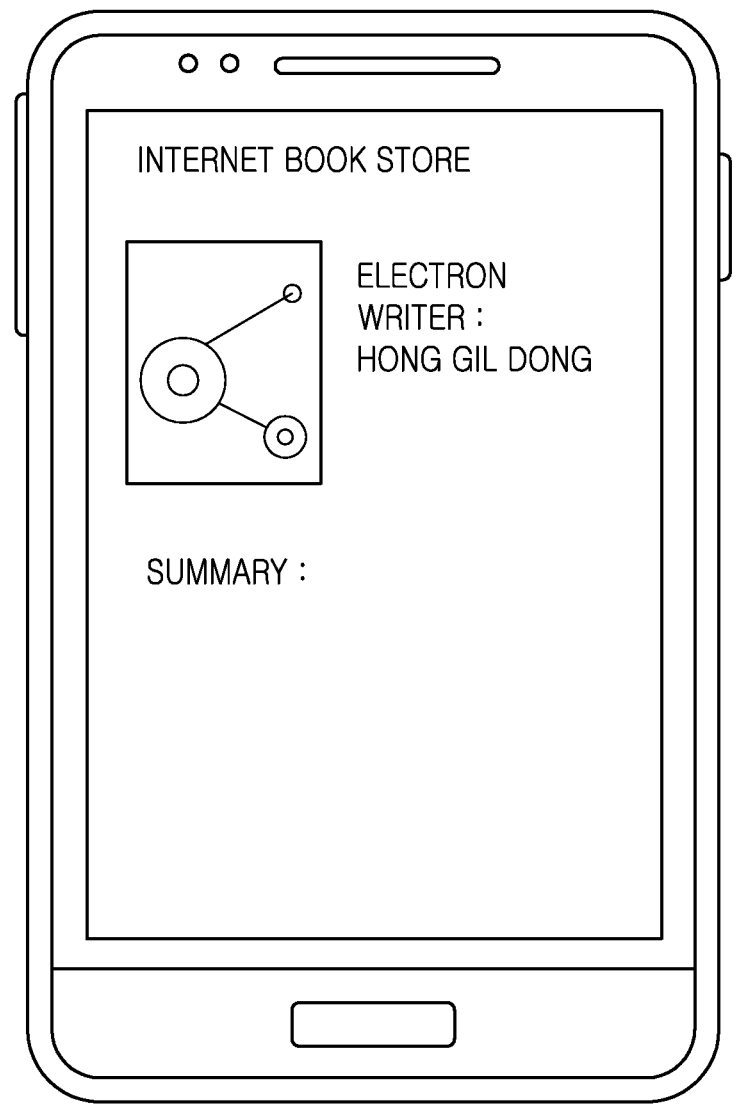

As described above, in the case where the electronic device transmits the execution information of the book store application, a counterpart electronic device 100 may execute the book store application as illustrated in FIGS. 26A and 26B.

FIGS. 26A and 26B illustrate screen configuration for executing a book application using a messenger service in an electronic device according to an embodiment of the present invention.

In case of providing the messenger service, the electronic device 100 may display the messenger service screen on the display unit 160 to display a message transmitted/received to/from at least one counterpart electronic device as illustrated in FIG. 26A. At this point, the electronic device 100 may display the messenger service screen such that a message written by a user of the electronic device and a message received from a counterpart electronic device are discriminated as illustrated in FIG. 26A.

In case of receiving application execution information from a counterpart electronic device via the messenger service, the electronic device 100 may display "electron by Hong Gil Dong" which is the application execution information on the display unit 160. For example, the electronic device 100 may display "electron by Hong Gil Dong" on the display unit 160 in the same form as a message provided from the counterpart electronic device for the messenger service as illustrated in FIG. 26A. In another example, the electronic device 100 may display "electron by Hong Gil Dong" on the display unit 160 using a popup window.

In the case where "electron by Hong Gil Dong" displayed on the display unit 160 is selected by a user, the electronic device 100 may execute the book store application to display information about the book "electron by Hong Gil Dong" as illustrated in FIG. 26B. In another example, in the case where "electron by Hong Gil Dong" displayed on the display unit 160 is selected by a user, the electronic device 100 may execute an Internet application for a book store server access. After that, the electronic device 100 may access the book store server according to a service path included in the application execution information to display information for the book "electron by Hong Gil Dong".

Figure 27A:
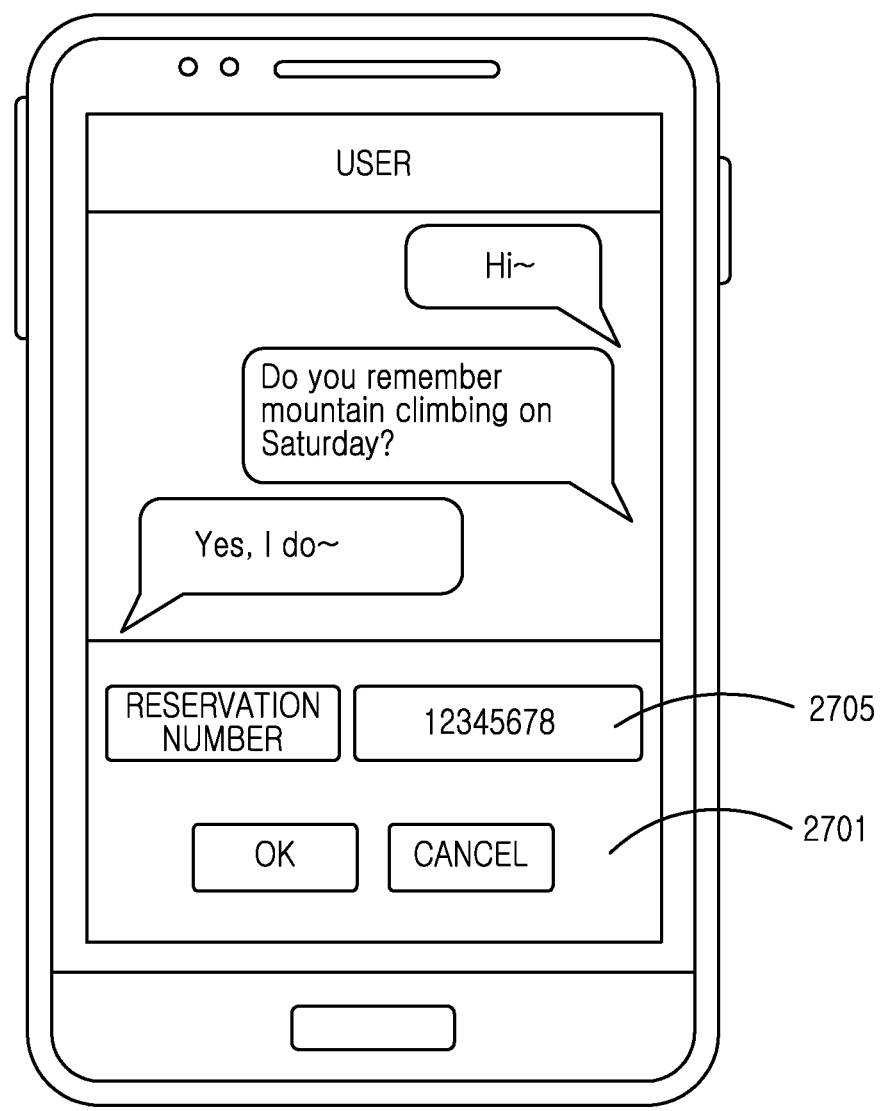
FIGS. 27A and 27B are views illustrating screen configuration for transmitting airline reservation information using a messenger service in an electronic device according to an embodiment of the present invention.
Figure 27B:
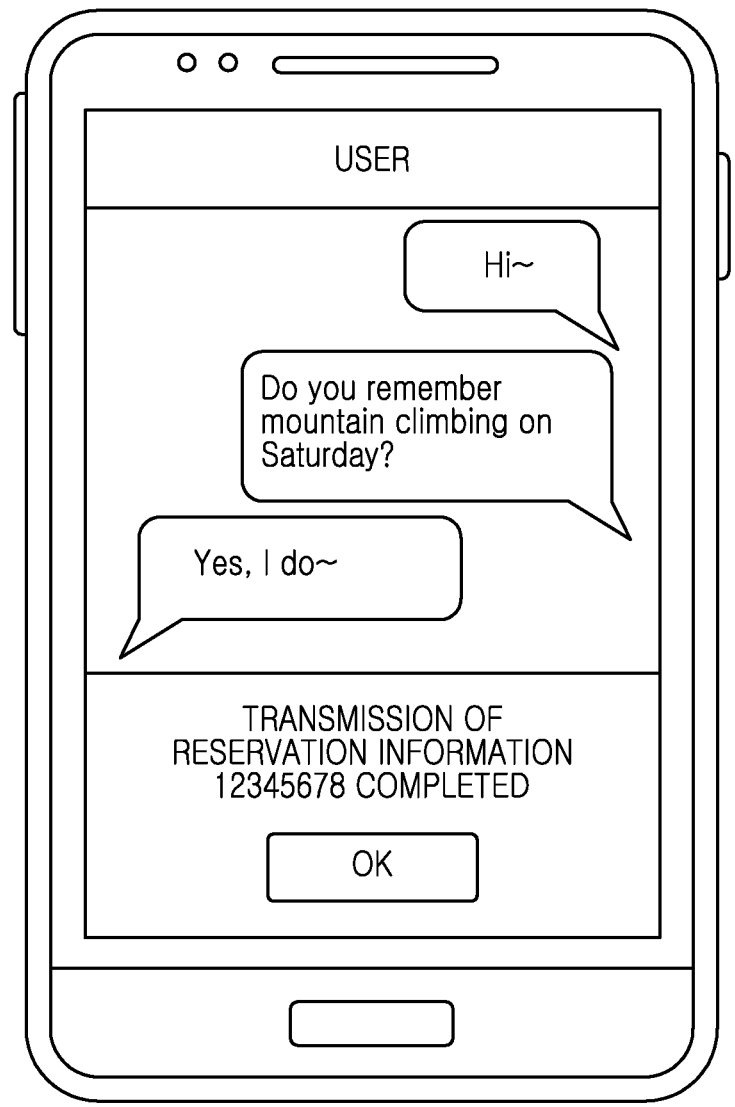

The electronic device 100 may also transmit execution information of airline reservation application via the messenger service as illustrated in FIGS. 27A and 27B.

FIGS. 27A and 27B illustrate screen configuration for transmitting airline reservation information using a messenger service in an electronic device according to an embodiment of the present invention.

In the case where selection of "airline reservation" is detected from the additional service list 702 illustrated in FIG. 7B, the electronic device 100 may share execution information of an airline reservation application. Accordingly, the electronic device 100 may display an airline reservation screen 2701 on the display unit 160 as illustrated in FIG. 27A. At this point, the airline reservation screen 2701 may include a reservation number item 2705. The reservation screen 2701 may also contain other data corresponding to an airline reservation, such as date and time, departure airport, arrival airport, for each leg and/or direction of travel.

In the case where an input of each item for application execution setting is detected via the input unit 170, the electronic device 100 may display input information for each setting item of the airline reservation screen 2701. For example, the electronic device 100 may display an airline reservation number of "12345678" for the airline reservation item 2705 according to a user's input information as illustrated in FIG. 27A.

As described above, after displaying input information of each item for execution setting of the airline reservation application, in the case where an input of an "OK" button is detected in an airline reservation screen, the electronic device 100 may recognize the execution setting of the airline reservation application has been completed. Accordingly, the electronic device 100 may transmit execution information for displaying reservation information of the reservation number "12345678" in the airline reservation application to at least one counterpart electronic device via the messenger service. At this point, the electronic device 100 may transmit execution information of the airline reservation application in the same form as a message for the messenger service.

Additionally, after transmitting the execution information of the airline reservation application, the electronic device 100 may display a transmission completion message for "12345678 reservation information" which is the execution information of the airline reservation application on the display unit 160 as illustrated in FIG. 27B.

Figure 28A:
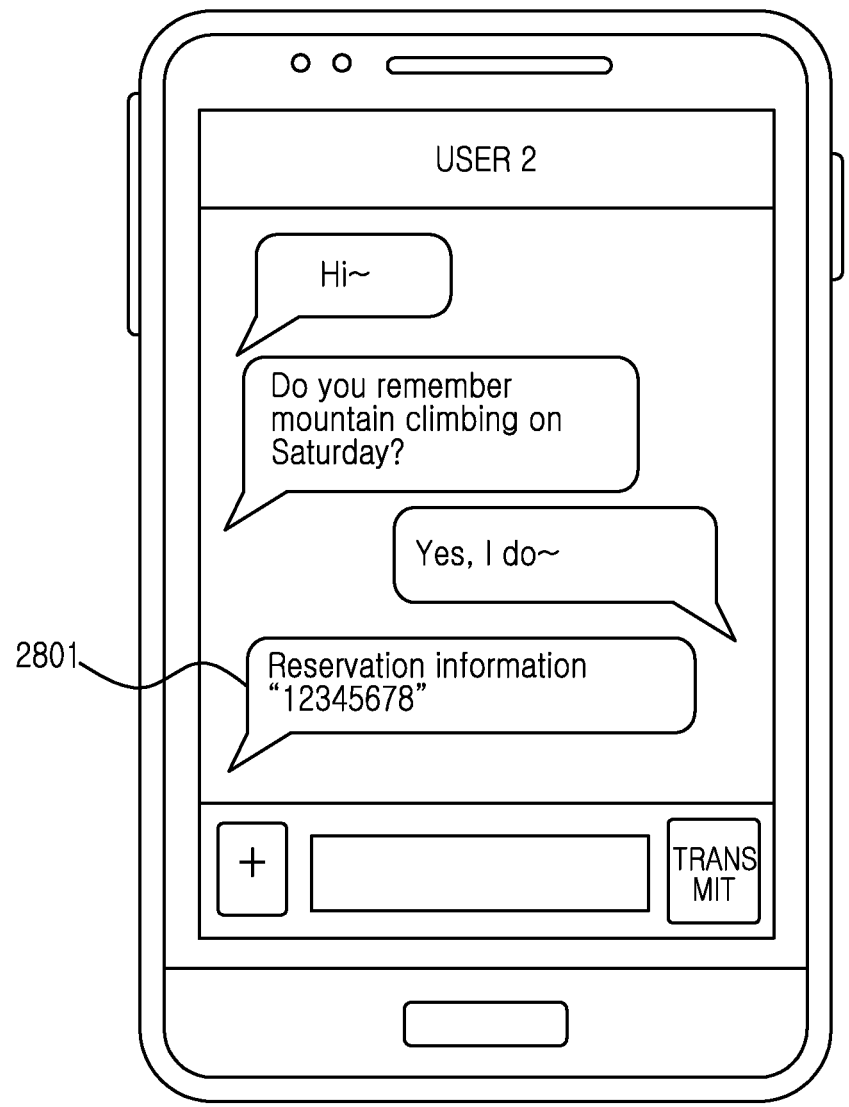
FIGS. 28A and 28B are views illustrating screen configuration for executing an airline reservation application using a messenger service in an electronic device according to an embodiment of the present invention.
Figure 28B:

As described above, in the case where the electronic device has transmitted execution information for the airline reservation application, a counterpart electronic device 100 may execute the airline reservation application as illustrated in FIGS. 28A and 28B.

FIGS. 28A and 28B illustrate screen configuration for executing an airline reservation application using a messenger service in an electronic device according to an embodiment of the present invention.

In case of providing the messenger service, the electronic device 100 may display the messenger service screen on the display unit 160 to display a message transmitted/received to/from at least one counterpart electronic device as illustrated in FIG. 28A. At this point, the electronic device 100 may display the messenger service screen such that a message written by a user of the electronic device and a message received from a counterpart electronic device are discriminated as illustrated in FIG. 28A.

In case of receiving application execution information from a counterpart electronic device via the messenger service, the electronic device 100 may display "12345678 reservation information" which is application execution information on the display unit 160. For example, the electronic device 100 may display "12345678 reservation information" in the same form as a message provided from the counterpart electronic device for the messenger service as illustrated in FIG. 28A (2801). For another example, the electronic device 100 may display "12345678 reservation information" on the display unit 160 using a popup window.

In the case where "12345678 reservation information" on the display unit 160 is selected by a user, the electronic device 100 may execute an airline reservation application to display "12345678 reservation information" as illustrated in FIG. 28B. In another example, in the case where "12345678 reservation information" on the display unit 160 is selected by a user, the electronic device 100 may execute an Internet application for an airline company server access. After that, the electronic device 100 may access an airline company server according to a service path included in application execution information to display "12345678 reservation information".

Figure 29A:
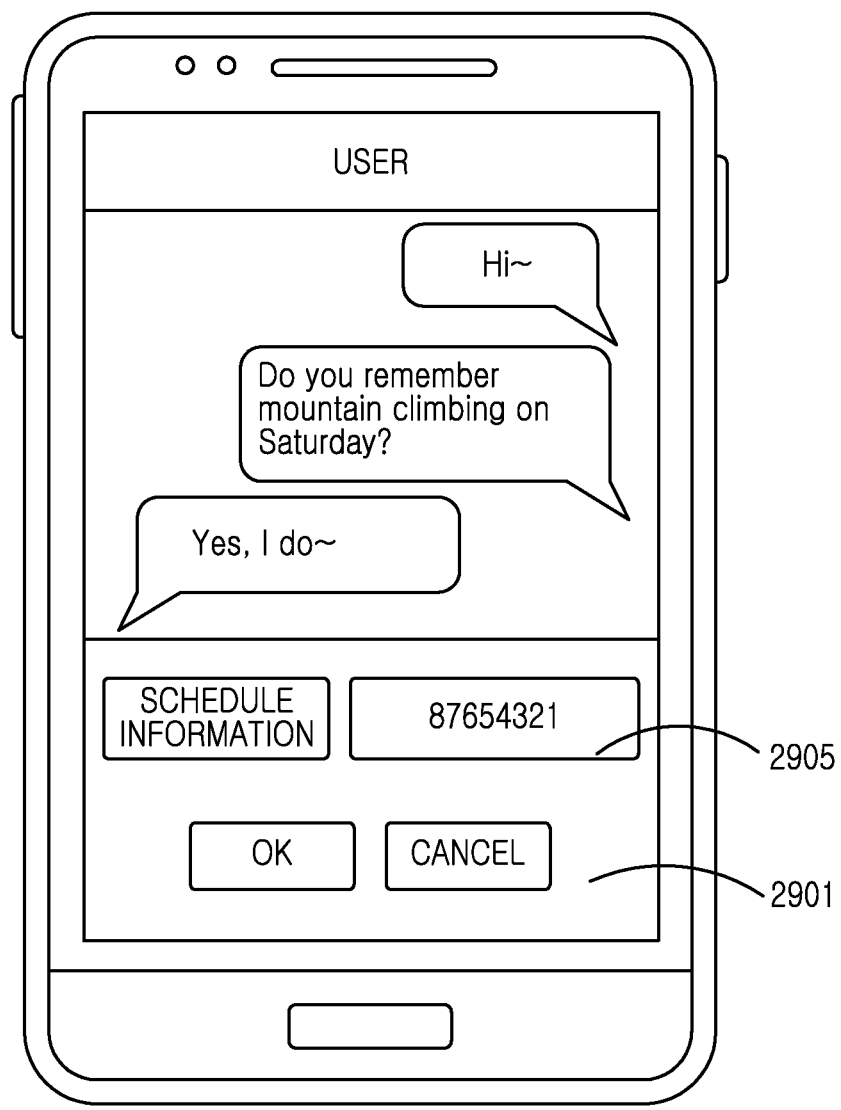
FIGS. 29A and 29B are views illustrating screen configuration for transmitting travel schedule information using a messenger service in an electronic device according to an embodiment of the present invention.
Figure 29B:
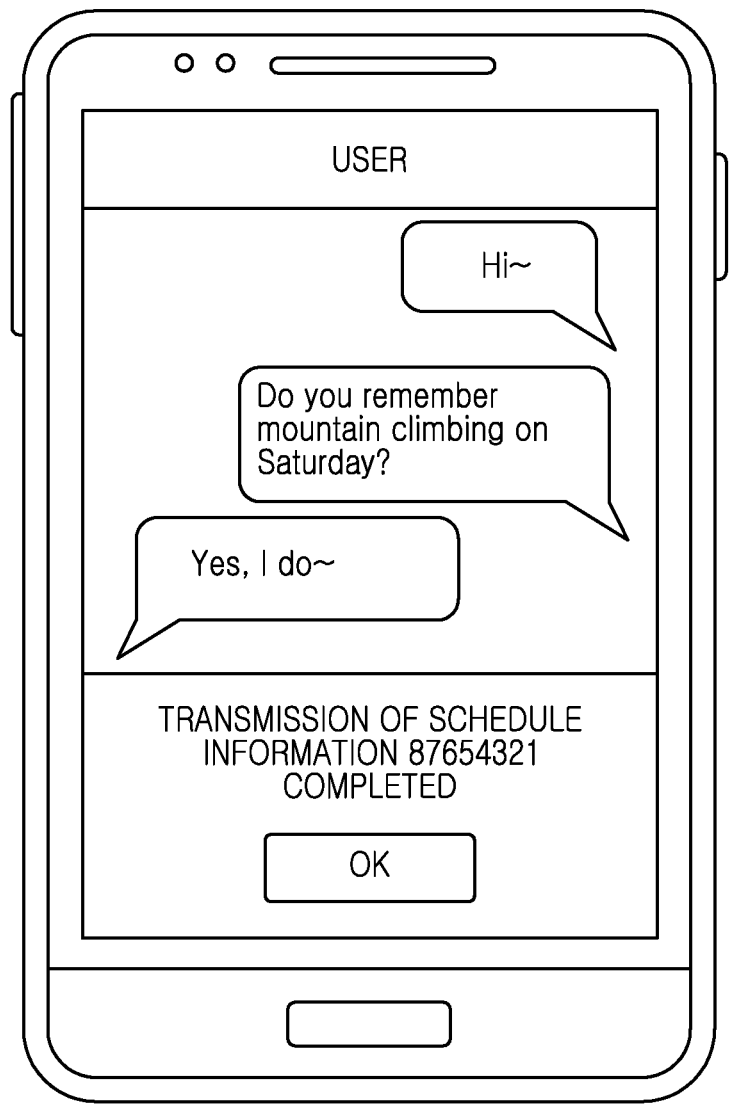

The electronic device 100 may transmit the execution information of a travel agency application via the messenger service as illustrated in FIGS. 29A and 29B.

FIGS. 29A and 29B illustrate screen configuration for transmitting travel schedule information using a messenger service in an electronic device according to an embodiment of the present invention.

In the case where selection of "travel" is detected in the additional service list 720 illustrated in FIG. 7B, the electronic device 100 may share execution information of a travel reservation application. Accordingly, the electronic device 100 may display a travel reservation screen 2901 on the display unit 160 as illustrated in FIG. 29A. At this point, the travel reservation screen may include a schedule number item 2905.

In the case where an input of each item for application execution setting is detected via the input unit 170, the electronic device 100 may display the input information for each setting item of the travel reservation screen. For example, the electronic device 100 may display a travel schedule number of "87654321" for a travel reservation item depending on a user's input information as illustrated in FIG. 29A.

As described above, after displaying the input information of each item for execution setting of the travel reservation application, in the case where an input of an "OK" button is detected in the travel reservation screen, the electronic device 100 may recognize the execution setting of the travel reservation application has been completed. Accordingly, the electronic device 100 may transmit execution information for displaying travel schedule information of a schedule number "87654321" in the travel reservation application to at least one counterpart electronic device via the messenger service. At this point, the electronic device 100 may transmit the execution information of the travel reservation application in the same form as a message for the messenger service.

Additionally, after transmitting the execution information of the travel reservation application, the electronic device 100 may display a transmission completion message of "87654321 schedule information" which is execution information of the travel reservation information on the display unit 160 as illustrated in FIG. 29B.

Figure 30A:
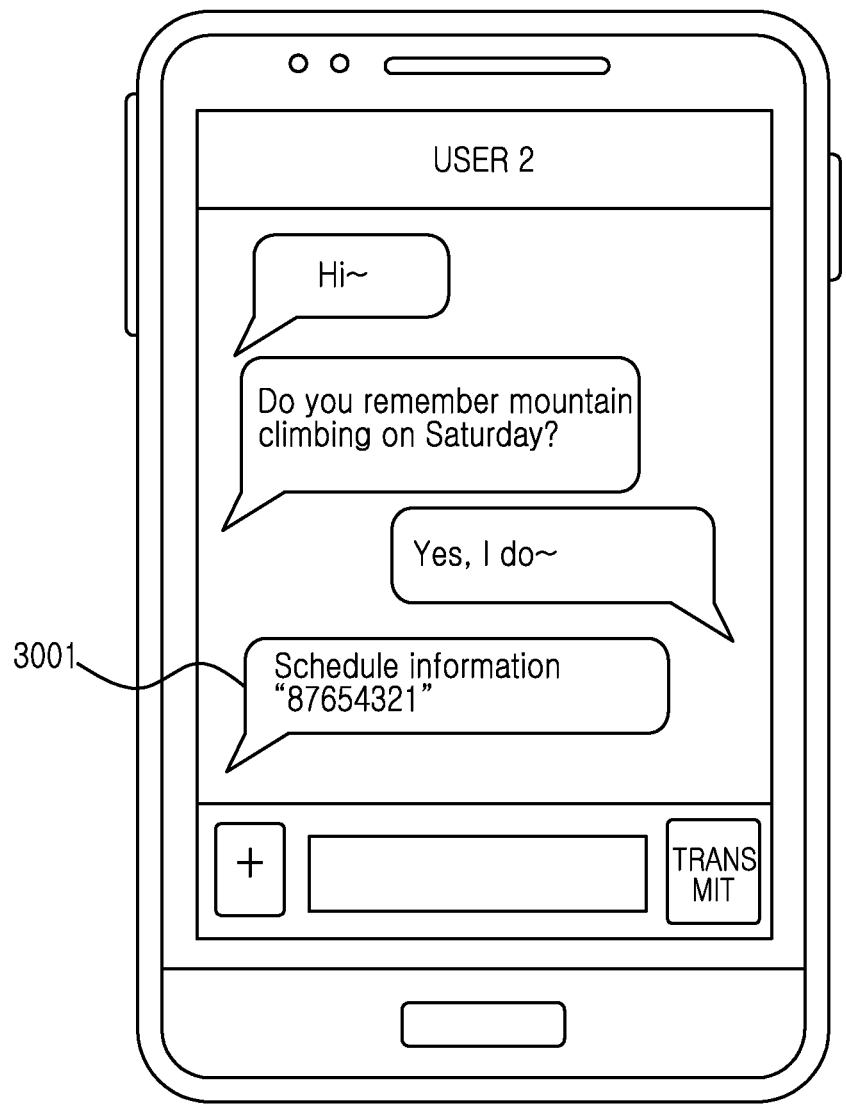
FIGS. 30A and 30B are views illustrating screen configuration for executing a travel reservation application using a messenger service in an electronic device according to an embodiment of the present invention.
Figure 30B:

As described above, in the case where the electronic device has transmitted the execution information of the travel reservation application, a counterpart electronic device 100 may execute the travel reservation application as illustrated in FIGS. 30A and 30B.

FIGS. 30A and 30B illustrate screen configuration for executing a travel reservation application using a messenger service in an electronic device according to an embodiment of the present invention.

In case of providing the messenger service, the electronic device 100 may display the messenger service screen on the display unit 160 to display a message transmitted/received to/from at least one counterpart electronic device as illustrated in FIG. 30A. At this point, the electronic device 100 may display the messenger service screen such that a message written by a user of the electronic device and a message received from a counterpart electronic device are discriminated as illustrated in FIG. 30A.

In case of receiving application execution information from a counterpart electronic device via the messenger service, the electronic device 100 may display "87654321 schedule information" which is the application execution information on the display unit 160. For example, the electronic device 100 may display "87654321 schedule information" on the display unit 160 in the same form as a message provided from the counterpart electronic device for the messenger service as illustrated in FIG. 30A (3001). In another example, the electronic device 100 may display "87654321 schedule information" on the display unit 160 using a popup window.

In the case where "87654321 schedule information" displayed on the display unit 160 is selected by a user, the electronic device 100 may execute the travel reservation application to display "87654321 schedule information" as illustrated in FIG. 30B. In another example, in the case where "87654321 schedule information" displayed on the display unit 160 is selected by the user, the electronic device 100 may execute an Internet application for a travel agency server access. After that, the electronic device 100 may access a travel agency server according to a service path included in application execution information to display "87654321 schedule information".

In the above embodiment, the electronic device 100 may select a specific additional service list to transmit application execution information.

In another embodiment, the electronic device 100 may transmit the application execution information using an identify code for application identification.

Figure 31A:
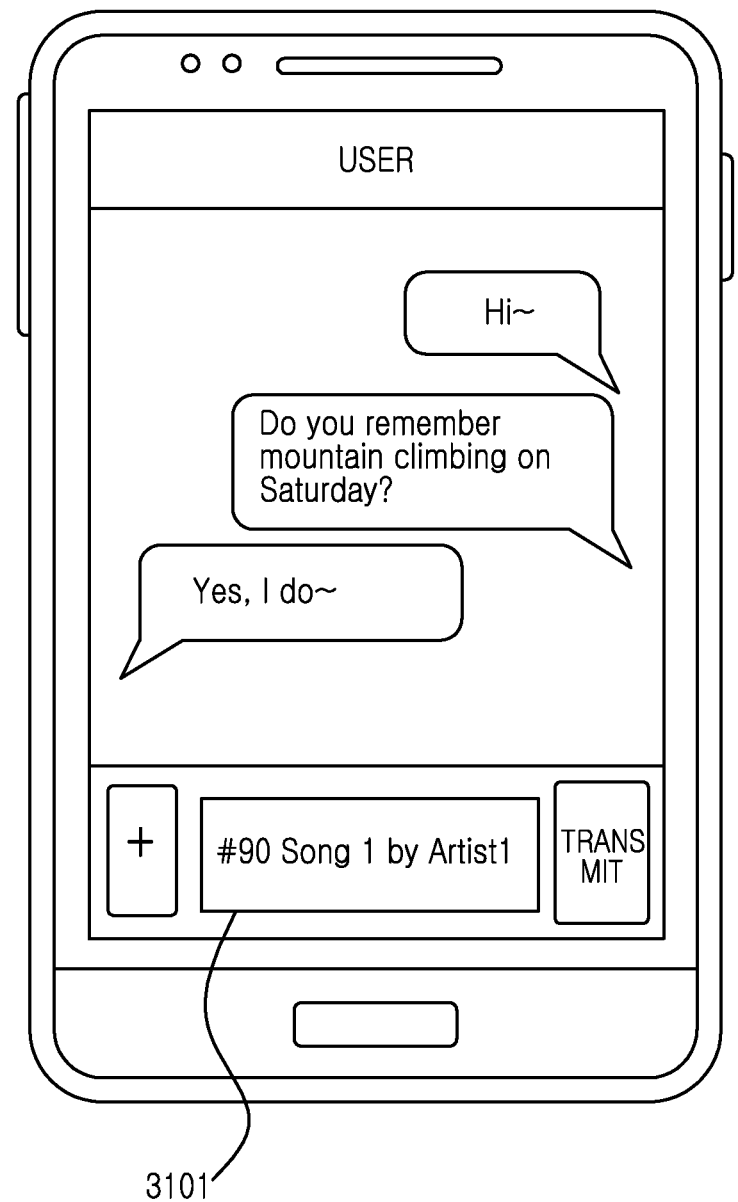
FIGS. 31A, 31B and 31C are views illustrating screen configuration for sharing music application execution information using a messenger service in an electronic device according to an embodiment of the present invention.
Figure 31B:
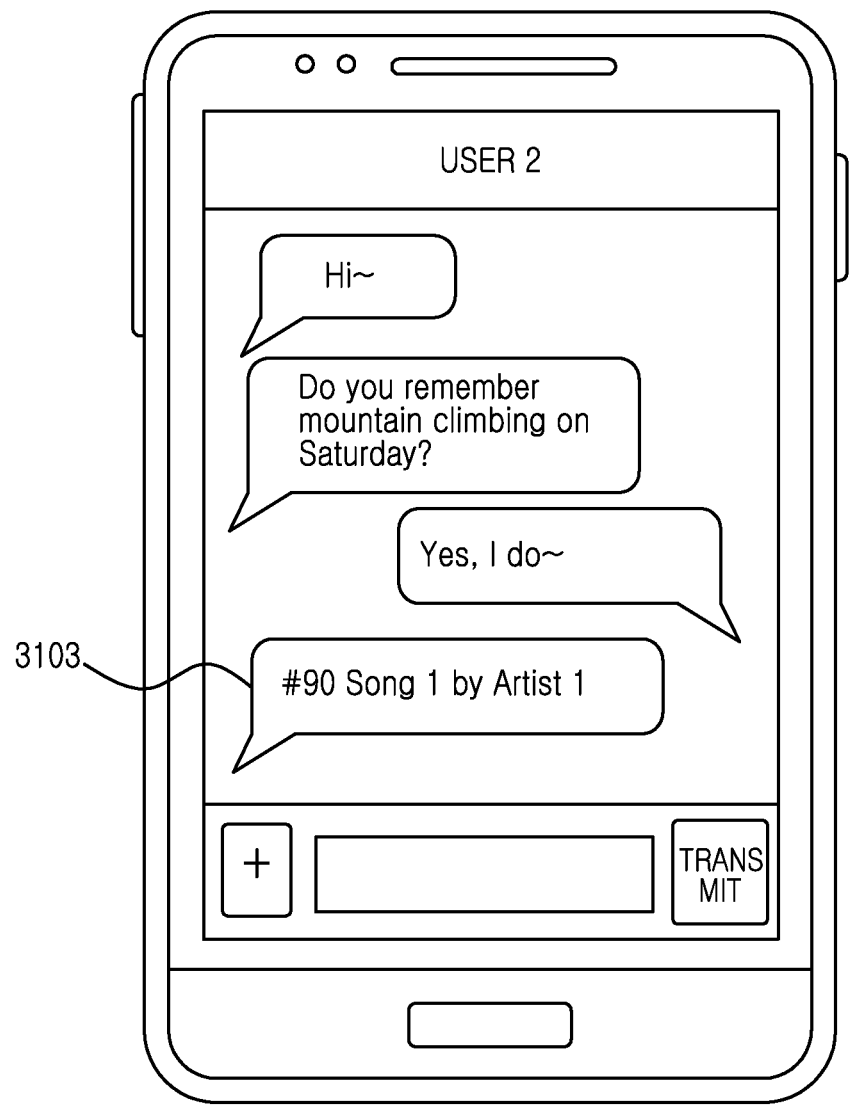
Figure 31C:
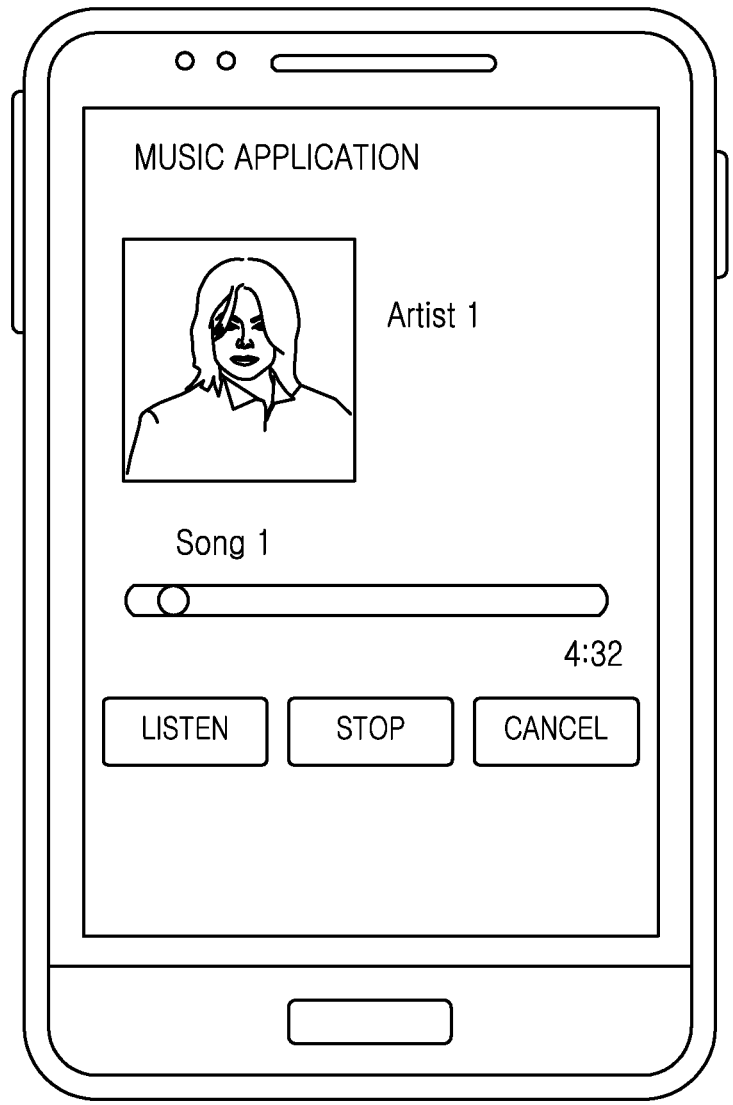

FIGS. 31A to 31C illustrate screen configuration for sharing music application execution information using a messenger service in an electronic device according to an embodiment of the present invention.

In case of providing the messenger service, the electronic device 100 may display the messenger service screen on the display unit 160 as illustrated in FIG. 31A.

In the case where an input of application execution information ("Song #1 by Artist #1") including an identify code (#90) of a music application is detected via the input unit 170 as illustrated in FIG. 31A, the electronic device 100 may display execution information of the music application on a message input region 3101.

In the case where an input of a "transmit" button is detected in the messenger service screen, the electronic device 100 may transmit execution information for reproducing "Song #1 by Artist #1" in the music application displayed on the message input region 3101 to at least one counterpart electronic device via the messenger service. At this point, the electronic device 100 may transmit execution information of the music application in the same form as a message for the messenger service.

As described above, in the case where the electronic device has transmitted the execution information of the music reproduce application, a counterpart electronic device 100 may execute the music application as illustrated in FIGS. 31B and 31C.

In the case where a counterpart electronic device has received a message including application identify information (#90) during the messenger service, the electronic device 100 may recognize it has received execution information of the music reproduce application according to "#90". At this point, the electronic device 100 may display "#90 Song #1 by Artist #1" which is the execution information of the music reproduce application on the display unit 160 in the same form as a message provided from an electronic device as illustrated in FIG. 31B (3103). In another example, the electronic device 100 may display "#90 Song #1 by Artist #1" on the display unit 160 using a popup window.

In the case where "Song #1 by Artist #1" displayed on the display unit 160 is selected by a user, the electronic device 100 may execute the music application to reproduce "Song #1 by Artist #1" as illustrated in FIG. 31C. In another example, in the case where "Song #1 by Artist #1" displayed on the display unit 160 is selected by a user, the electronic device 100 may access a music server according to a service path included in the application execution information to reproduce "Song #1 by Artist #1".

When the electronic device 100 of the invention is directed to access a server in order to download, e.g., music, books, travel information, etc., the particular server or website can be preset by the messenger service. For example, when an electronic device 100 according to the invention follows the service path included in the application execution information, the service path can be to a preselected digital or virtual storefront to purchase the media. By directing a user to a preset storefront, it is possible to drive purchases of media from the storefront, as set by the operating system.

As described above, the electronic device 100 may increase convenience allowing a user of the electronic device to use the messenger service by sharing application setting information, real-time data, application execution information, etc. using the messenger service.

The apparatuses and methods of the disclosure can be implemented in hardware, firmware or via executions of software or computer code that is stored on a non-transitory machine readable medium such as a CD ROM, a RAM, a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor" or "microprocessor", "unit" and "module" constitute hardware in the claimed invention under a broadest reasonable interpretation. Under the broadest reasonable interpretation, the appended claims constitute statutory subject matter in compliance with 35 U.S.C. §101 and none of the elements consist of software per se.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method of operating an electronic device, the hod comprising:
   providing a messenger service with at least one counterpart electronic device;
   determining application setting information during the messenger service, the application setting information comprising at least one instruction for setting a function of an application in the at least one counterpart electronic device and service path information; and transmitting the application setting information to the at least one counterpart electronic device using the messenger service,
wherein the service path information indicates information for accessing a server that stores data to execute the application.

2. The method of claim 1, further comprising:
identifying at least one sharing electronic device with which the application setting information is to be transmitted from among the at least one counterpart electronic device,
wherein transmitting the application setting information comprises:
transmitting the application setting information to the at least one sharing electronic device.

3. The method of claim 2, further comprising:
displaying information of the at least one sharing electronic device on a display unit of the electronic device.

4. A method of operating an electronic device, the method comprising:
providing a messenger service with at least one counterpart electronic device;
receiving application setting information from at least one counterpart electronic device through the messenger service, the application setting information comprising at least one instruction for setting a function of an application in the electronic device and service path information, and
setting the function of the application according to the received application setting information during the messenger service,
wherein the service path information indicates information for accessing a server that stores data to execute the application.

5. A method of operating an electronic device, the method comprising:
providing a messenger service with at least one counterpart electronic device;
determining application execution information during the messenger service, the application executing information comprising at least one instruction for executing an application in the at least one counterpart electronic device and service path information; and
transmitting the application execution information to the at least one or more counterpart electronic device using the messenger service,
wherein the service path information indicates information for accessing a server that stores data to execute the application.

6. The method of claim 5, further comprising:
identifying at least one sharing electronic device with which the application execution information is to be transmitted from among the at least one counterpart electronic device,
wherein transmitting the application execution information comprises:
transmitting the application execution information to the at least one sharing electronic device.

7. The method of claim 6, further comprising:
displaying information of the at least one sharing electronic device on a display unit of the electronic device.

8. A method for operating an electronic device, the method comprising:
communicatively connecting the electronic device via a messenger service with at least one counterpart electronic device;

receiving application execution information from at least one counterpart electronic device through the messenger service, the application execution information comprising at least one instruction for executing an application in the electronic device and service path information; and
executing the application according to the application execution information,
wherein the service path information indicates information for accessing a server that stores data to execute the application.

9. The method of claim 8, wherein executing the application comprises:
accessing a server according to the service path information included in the application execution information; and
receiving service information depending on the application execution information from the server.

10. An electronic device comprising:
a communication unit; and
at least one processor,
wherein the processor is configured to control to provide a messenger service with at least one counterpart electronic device, to determine application setting information during the messenger service, and to transmit the application setting information and service path information to the at least one counterpart electronic device using the messenger service,
wherein the application setting information comprises at least one instruction for setting a function of an application in the at least one counterpart electronic device, and
wherein the service path information indicates information for accessing a server that stores data to execute the application.

11. The electronic device of claim 10, wherein the processor is configured to identify at least one sharing electronic device with which the application setting information is to be shared from the at least one counterpart electronic device, and to transmit the application setting information to the at least one sharing electronic device using a background system during the messenger service.

12. The electronic device of claim 11, further comprising: a display unit,
wherein the display unit is configured to display whether the application setting information is shared with the one or more counterpart electronic devices.

13. An electronic device comprising:
a communication unit; and
at least one processor,
wherein the processor is configured to control to provide a messenger service with at least one counterpart electronic device, to receive application setting information and service path information through the messenger service, and to set a function of an application according to the received application setting information during the messenger service,
wherein the application setting information comprises at least one instruction for setting a function of the application in the at least one counterpart electronic device, and
wherein the service path information indicates information for accessing a server that stores data to execute the application.

14. An electronic device comprising:
a communication unit; and
at least one processor, wherein the processor is configured to control to provide a messenger service with at least one counterpart electronic device, to determine application execution information during the messenger service, and to transmit the application execution information to one or more second electronic devices using the messenger service, and wherein the application executing information comprises at least one instruction for executing an application in the at least one counterpart electronic device and service path information, and the service path information indicates information for accessing a server that stores data to execute the application.

15. The electronic device of claim 14, wherein the processor is configured to determine at least one sharing electronic device with which the application execution information is to be transmitted from among the at least one counterpart electronic device, and to control to transmit the application execution information to the at least one sharing electronic device using the messenger service.

16. The electronic device of claim 15, further comprising: a display unit,
wherein the display unit is configured to display whether the application execution information is shared with the at least one counterpart electronic device.

17. An electronic device comprising:

a communication unit; and at least one processor, wherein the processor is configured to control to provide a messenger service with at least one counterpart electronic device, to receive application execution information through the messenger service, and to execute an application according to the application execution information, and wherein the application executing information comprises at least one instruction for executing the application in the at least one counterpart electronic device and service path information, and the service path information indicates information for accessing a server that stores data to execute the application.

18. The electronic device of claim 17, wherein the processor is configured to control to access a service server according to the service path information included in the application execution information, and to receive service information depending on the application execution information from the service server.

* * * * *